United States Patent
Yang

(10) Patent No.: US 7,625,310 B2
(45) Date of Patent: *Dec. 1, 2009

(54) SPLIT SERIAL-PARALLEL HYBRID DUAL-POWER DRIVE SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 11 days.

This patent is subject to a terminal disclaimer.

(21) Appl. No.: 11/950,610

(22) Filed: Dec. 5, 2007

(65) Prior Publication Data
US 2008/0076627 A1 Mar. 27, 2008

Related U.S. Application Data

(62) Division of application No. 10/975,525, filed on Oct. 29, 2004, now Pat. No. 7,377,876.

(51) Int. Cl.
*B60K 1/02* (2006.01)
(52) U.S. Cl. .......................................... 477/3
(58) Field of Classification Search ............. 477/3, 477/5
See application file for complete search history.

(56) References Cited

U.S. PATENT DOCUMENTS

| 5,301,764 | A | 4/1994 | Gardner |
| 6,549,840 | B1 * | 4/2003 | Mikami et al. ............... 701/69 |
| 6,770,005 | B2 * | 8/2004 | Aikawa et al. ................ 475/5 |
| 6,942,054 | B2 * | 9/2005 | Kim ........................... 180/243 |
| 6,964,311 | B2 | 11/2005 | Yang et al. |
| 6,971,461 | B2 | 12/2005 | Yamamoto et al. |
| 7,004,018 | B2 | 2/2006 | Kadota et al. |
| 7,028,796 | B2 * | 4/2006 | Kim ....................... 180/65.225 |
| 7,240,748 | B2 * | 7/2007 | Kira et al. ................ 180/65.25 |
| 7,377,876 | B2 * | 5/2008 | Yang ............................. 477/3 |
| 2005/0161268 | A1 | 7/2005 | Yang |
| 2006/0016630 | A1 | 1/2006 | Yang |

* cited by examiner

*Primary Examiner*—Dirk Wright
(74) *Attorney, Agent, or Firm*—Rabin & Berdo, P.C.

(57) ABSTRACT

A split serial-parallel hybrid dual-power drive system, comprised of two or more than two separation drive systems allowing independent operation to respectively drive the load, or all loads driven individually are incorporated in a common frame to drive land, surface, underwater transportation means or aircraft, industrial machines and equipment or any other load drive by rotational kinetic energy.

8 Claims, 48 Drawing Sheets

SPLIT SERIAL-PARALLEL HYBRID DUAL-POWER DRIVE SYSTEM

CROSS-REFERENCE TO RELATED APPLICATION

This is a division of U.S. application Ser. No. 10/975,525, filed Oct. 29, 2004, now U.S. Pat. No. 7,377,876 the entire disclosure of which is incorporated herein by reference.

BACKGROUND OF THE INVENTION (a) Field of the Invention

The present invention is related to a split serial-parallel hybrid dual-power drive system, and more particularly to one used to drive land, maritime, underwater or aerospace transportation means, or industrial machines and equipment or any other load driven by rotational kinetic energy.

The split serial-parallel hybrid dual-power drive system is comprised of two or more than two separation drive systems allowing independent operation to respectively drive the load, or all loads driven individually are incorporated in a common frame.

In the separation drive system of the dual-power drive system, the first drive system and a second drive system are provided. The first drive system is equipped with an active power source, a first electrical unit essentially functioning as a generator, and an optional second electrical unit essentially functioning as a motor, and a clutch set to control the transmission status of the rotational kinetic energy; and the second drive system is adapted with another second dynamo-electric unit essentially functioning as a motor to serve as the rotational power source for the second drive system.

An optional clutch set is provided to control the transmission or cut-off of the rotational kinetic energy between two independent drive systems.

By means of the regulation of a control system or by manual operation, the status of transmission between the active rotational power source and the first dynamo-electric unit of the separation serial-parallel hybrid drive system indicates a coupled status; and the active rotational kinetic energy source drives the first dynamo-electric unit to output electric power to further drive the second dynamo-electric unit to operate as a motor to provide functions related to a series hybrid power train; or alternatively, through the control and operation of the clutch, the rotational kinetic energy from the active rotational power source outputs rotational kinetic energy to drive either or both of the loads of the first drive system and the second drive system; or the active rotational power source is incorporated to both of the first and the second dynamo-electric units, and an optional rechargeable device to provide functions related to a parallel hybrid power train. Accordingly, the present invention relates to an innovative dual-power drive system by providing more operation functions.

(b) Description of the Prior Art

Traditional transportation means on land, maritime or airborne is usually related to a single acting power train. To meet energy saving and pollution control criteria significant efforts have been devoted to the development of dual-power drive system in recent years. Among these efforts, the development of a power train combining the rotational kinetic energy outputted from engine and that from electricity driven motor has made quite an impressive progress. The hybrid dual-power system of the prior art includes:

1. Serial hybrid power drive system: a generator is driven by an engine to further drive a motor to produce rotational kinetic energy to drive a load, this system has reported flaws of wild variation in system efficiency under various loading condition; greater demand on electrical power capacity, requiring larger installation space, heavier and higher cost due to that both of the motor and the generator have to carry all the power consumption.

2. Rechargeable serial drive system: Under normal loading, an engine drives a generator to further drive a motor to output rotational kinetic energy for driving a load. Under light loading condition, electric energy from the generator is partially flow into a rechargeable energy storage device for storage. While the engine stops running, the electrical energy inside storage device will output to the motor for producing the rotational kinetic energy to drive the load, this approach brings higher energy efficiency and less pollution; and under heavy loading, electrical energy from the engine-driven-generator and from the rechargeable energy storage device are transferred to the motor which output rotational kinetic energy for driving the load.

3. Parallel hybrid power train: Under normal loading, rotational kinetic energy outputted from an engine directly drive the load; Under light loading, the motor driven by the engine is switched into the generator mode for charging the rechargeable device or supply power to other load, or if the engine stops running, the rechargeable device drives the motor to output rotational kinetic energy to drive the load for higher energy efficiency and less pollution. Under heavy loading, the rotational kinetic energy outputted from the engine and that from the motor driven by the rechargeable device jointly drive the load. However, the flaw of the system is that it requires the installation of a rechargeable device with sufficient electrical capacity.

SUMMARY OF THE INVENTION

The primary purpose of the present invention is to provide to split serial-parallel hybrid dual-power drive system comprised of two or more than two separation drive units to drive their respective loads, or all loads are incorporated into a common frame. An optional clutch is adapted to control transmission or cut-off of the rotational kinetic energy between independent drive units. The system of the present invention executes specific serial hybrid power train or parallel hybrid power train functions by manual control or by a control system.

DETAILED DESCRIPTION OF THE PREFERRED EMBODIMENTS

Figure 1:
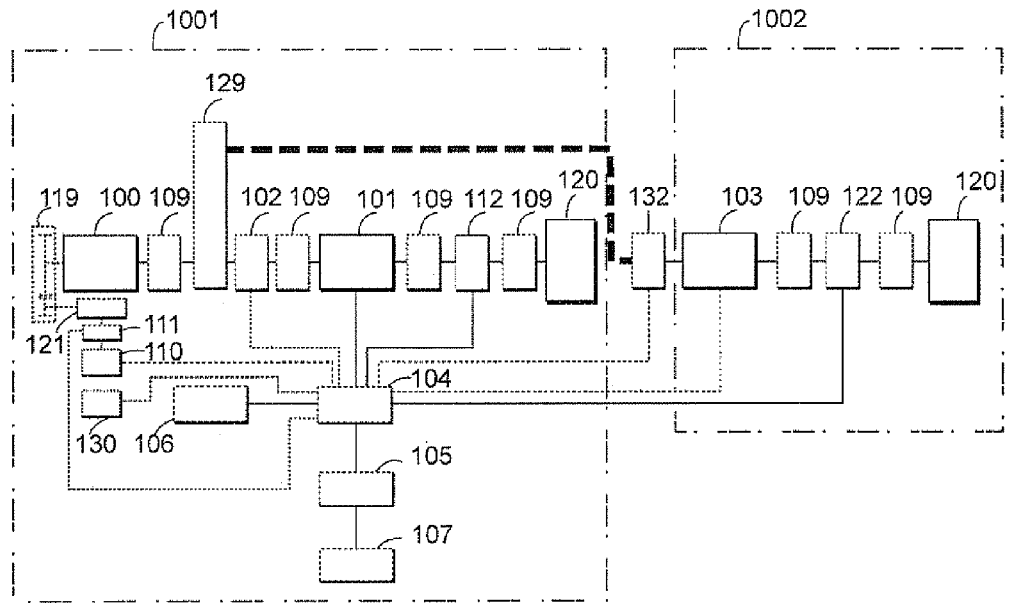
FIG. 1 is a system block diagram of the present invention.

The present invention related to a split serial-parallel hybrid dual-power drive system for the operation of a separation serial hybrid power train or a parallel hybrid power train includes an active rotational power source which frequently implemented by an internal combustion engine; a first drive system comprised of a first dynamo-electric unit essentially functioning as a generator, an optional second dynamo-electric unit, and a clutch; a second drive system comprised of a second dynamo-electric unit essentially functioning as a motor; and a clutch to control the transmission status of the rotational kinetic energy between the first and the second drive systems. When the system is controlled to operate in the mode of a serial hybrid power train, the rotational kinetic energy from the engine drives the first dynamo-electric unit in the first drive system to operate as a generator and the clutch between the first and the second dynamo-electric units is disengaged. The power output from the first dynamo-electric unit drives the second dynamo-electric units of the first or the second drive system to operate as a motor for providing rotational kinetic energy to drive the load.

Under normal loading, the rotational kinetic energy output from the engine drives only the first drive system through the transmission, or drives only the second drive system through the control by the clutch, or drives the loads of the first and the second drive systems at the same time through the control by the clutch.

Depending on the operation requirement, an optional rechargeable energy storage device may be or may not be installed as part of the split serial-parallel hybrid dual-power drive system. If the rechargeable device is provided, the primary operation functions of the system includes that the power from the rechargeable device drives the first dynamo-electric unit in the first drive system to operate as a motor, or drives the second dynamo-electric unit in the second drive system to operate as a motor for providing the rotational kinetic energy to drive the load.

Under light loading, the rotational kinetic energy from the engine directly drive the load, the first dynamo-electric unit in the first drive system with any or all of the second dynamo-electric unit of the first or the second drive system commonly operates as a generator to output power to recharge the rechargeable device or to the other load that consumes electrical power.

Under normal loading, the rotational kinetic energy from the engine drives only the load of first drive system, or drives only the load of second drive system or drives the loads of the first and the second drive systems at the same time.

Under heavy loading, the power from the rechargeable device drives the first dynamo-electric unit in the first drive system with any or all of the second dynamo-electric unit of the first or the second drive system operates as a motor to jointly drive the load with the power from the engine to provide the operation of the parallel hybrid power train.

The basic system of the present invention includes the active rotational power source, frequently implemented by an internal combustion engine used to produce rotational kinetic energy to directly drive the load or, via the optional controllable clutch, or a transmission unit of multi-speed or continuously variable transmission function, or inverse shift function, or idling function or torque conversion function; while the rotational kinetic energy from the active rotational power source drives the first dynamo-electric unit to operate as a generator to complete the configuration of the first drive system.

Power generated by the first dynamo-electric unit drives the second dynamo-electric unit adapted to the first or the second drive system to operate as a motor for driving the load or providing power to other load that consumes electrical power.

The second dynamo-electric unit of the first drive system is an optionally adapted item which assisting drive the load of first drive system, the necessity of second dynamo-electrical unit installation depends on system requirement.

The second drive system is comprised by second dynamo-electric unit as the power source to drive the load directly or through an optional transmission unit. An optional transmission or a clutch may be installed between the second drive system and the active rotational power source to control the transmit or disengagement of rotational kinetic between the second drive system and the active rotational power sources. An optional transmission unit or clutch may be installed at between a rotational part of the second dynamo-electric unit of the second drive system or a rotational mechanism driven by the second drive system, and a rotational part of the first or the second dynamo-electric unit in the first drive system or the rotational mechanism driven by the first drive system to control whether operation of coupled transmission of the rotational kinetic energy or separation operation without coupled transmission between the first and the second drive systems is required.

Under light loading, the operation of the split serial-parallel hybrid dual-power drive system could be controlled to perform serial or parallel hybrid power transmission. In the parallel transmission mode, the power from the active rotational power source may transmit to the load of first drive system for driving, or disengage from the load of first drive system.

Under the operation of serial hybrid power transmission, the active rotational power source may be regulated to coupled transmission or disengaged from the load driven by the first drive system by demand. In the status of disengaged from coupled transmission, the clutch disposed between the first and the second drive systems is disengaged while the engine as the active rotational power source provides the function of outputting the rotational kinetic energy subject to the control by manual or through a control system to drive the first dynamo-electric unit to operate as a generator, thus to further drive the second dynamo-electric unit in the first or the second drive system to operate as a motor to drive the load.

Under normal or a heavy loading, the system could be configured to parallel hybrid power transmission mode, the rotational kinetic energy from the engine to drive either or both loads of the first and the second drive systems. If an optional rechargeable device is installed, it could be incorporated to provide electrical energy to the first dynamo-electrical unit of the first drive system or to the second dynamo-electric unit in the first or the second drive system functioning as a motor with the power of engine to jointly drive the load during start-up or acceleration or other heavy loading situation; or directly drive the load under light loading or urban driving mode.

If an engine is implemented as the active rotational power source, the split serial-parallel hybrid dual-power drive system of the present invention essentially provides the following functions:

The rotational kinetic energy from the engine transmit through the transmission unit to drive the load of the first drive system, or to drive the load of second drive system, or the loads of both systems; and When the system operates under serial hybrid power transmission mode, the rotational kinetic energy from the engine drives the load of the first drive system comprised of the transmission unit, the optional clutch, and the transmission unit with functions of multi-speed or continuously variable transmission, inverse, or idling shift, or torque conversion. With the rotational kinetic energy from the engine, the first dynamo-electric unit in the first drive system operates as a generator to drive the second dynamo-electric unit in the first or the second drive system to operate as a motor to drive the loads of first or second drive system or other loads demanding electrical power.

Under light loading, the split serial-parallel hybrid dual-power drive system could be manipulated to provide serial or parallel hybrid power transmission. Under parallel hybrid power transmission mode, the active rotational power source and the load of the first drive system may coupled in transmission state for load driving, or disengaged from the load of first drive system, splitting from the driving power of engine.

When the system operating in serial transmission mode, the clutch between the first and the second drive systems is disengaged, and the active rotational power source may coupled with or disengaged from the load of the first drive system. Meanwhile, the engine serving as the active rotational power source subject to the control by manual or by a control system drives the first dynamo-electric unit to operate as a generator drive the second dynamo-electric unit in the first or the second drive system to operate as a motor for driving the load.

When the system operating in the parallel power transmission mode, rotational kinetic energy from the engine drive the load directly or simultaneously drive the first dynamo-electric unit in the first drive system which operate as a generator to drive the second dynamo-electric units of the first or the second drive system to function as a motor for respectively load driving, or the power generated from the first dynamo-electric unit to drive any other electrical powered load.

If an optional rechargeable device is adapted with the system, the operating functions of the parallel hybrid power transmission include:

Power supplied from the rechargeable device drives the first dynamo-electric unit in the first drive system and any or all the second dynamo-electric unit in the first or the second drive system; or drives any dynamo-electric unit to operate as a motor for driving the load; or the first or the second dynamo-electric unit operates as a motor to output the rotational power jointly drive the load with power from the engine; or Power supplied form the rechargeable device drives the first dynamo-electric unit in the first drive system and any or all of the second dynamo-electric unit in the first or the second drive system to operate as the motor for driving the load;

Kinetics from the engine drive the first dynamo-electric unit in the first drive system and any or all of the second dynamo-electric unit in the first or the second drive system to operate as a generator to recharge the rechargeable device or supply power to other electrical loading;

The load inversely drives the dynamo-electric unit in the first drive system and any or all the second dynamo-electric unit in the first or the second drive system to operate as a generator of power regeneration to recharge the rechargeable device or supply power to other electrical loading;

The mechanical damp of the engine functions as a brake drives, or together with the rechargeable device when provided, the dynamo-electric unit in the first drive system and any or all the second dynamo-electric unit in the first or the second drive system to operate as a generator of power regeneration to recharge the rechargeable device or supply power to other load that consumes power; and The rechargeable device drives the dynamo-electric unit in the first drive system and any or all of the second dynamo-electric unit in the first or the second drive system to operate as an engine starting motor or to drive other mechanical loading.

Pressurized mixture of air and the fuel, or natural gas or other gases whether in the form of liquid fuel such as gasoline, diesel oil or other fuels including hydrogen currently in development fed to the internal combustion engine is given a brake specific fuel consumption depending on the load torque and rpm. For higher operating efficiency, whether the separation serial-parallel dual-power system operating in the serial or parallel hybrid power transmission mode, fuel saving and pollution reduction could be accomplished by setting the engine operation in optimal rpm range and operating conditions of higher energy efficiency. Both of the rpm range and optimal operation conditions to be set for the engine are maintained by the system operating under serial or parallel hybrid power transmission mode, the engine drives the first dynamo-electric unit to operate as a generator, and drives the second dynamo-electric unit to operate as a motor so to control the engine running within an rpm range of lower fuel consumption with a higher power output to operating inside the optimal brake specific fuel consumption region. When the optional rechargeable device is adapted to the system, the engine drives the first dynamo-electric unit in the first drive system to operate as a generator to recharge the rechargeable device, or the power from the rechargeable device and that from the first dynamo-electric unit in the first drive system jointly drive the second dynamo-electric unit in the first or the second drive system to operate as a motor to drive the load. The engine is controlled to run within specific range of rpm and operating conditions with higher energy efficiency. That is, when the system operates as a serial or parallel hybrid power transmission modes under light loading, the rotational kinetic energy from the engine drive the first dynamo-electric unit in the first drive system and any or all of the second dynamo-electric unit in the first or the second drive system to operate as a generator for charging the rechargeable device or supply power to other electrical loading.

By providing all or any part of those functions described above, the present invention refined the drawback of lower efficiency and higher pollution of the engine running at lower power output and lower rpm.

FIG. 1 shows a system block diagram of the present invention in a systematic configuration of the active rotational power source, the first and the second dynamo-electric units, an operational clutch and an optional transmission unit.

The split serial-parallel hybrid dual-power drive system illustrated in FIG. 1 is essentially comprised of sub units or device such as active rotational power source, dynamo-electrical units, transmission unit, transmission speed regulating unit, clutch, drive control unit, central control unit, rechargeable device, or auxiliary rechargeable device, or power driven load, each element of present system described above with its specific function as follows:

The active rotational power source 100: comprised of one or multiple internal combustion engine, external combustion engine, turbine engine, or any other physical effect generating rotational kinetic energy power source. The rotary part of the active rotational source may directly coupled to the first dynamo-electric unit 101, or coupled to the rotary part of the first dynamo-electric unit 101 through an optional transmission unit 109, a transmission unit 129, or a clutch 102.

The first dynamo-electric unit 101: comprised of one or multiple rotary electrical machine providing functions as a generator, or one or multiple AC, brushless, brush, synchronous, or asynchronous rotary electrical machine that can be switched between the operation as a generator or a motor. When the second dynamo-electric unit 103 is adapted to the first drive system 1001, the rotary part of the first dynamo-electric unit 101 is coupled to the second dynamo-electric unit 103 through the clutch 112 or a differential gear set or a planetary gear set; or through the clutch 112 and an optional transmission unit 109.

The second dynamo-electric unit 103: comprised of one or multiple rotational motor providing functions of a rotary electrical machine, or one or multiple AC, brushless, brush, synchronous, or asynchronous rotary electrical machine that can switched between the operation as a generator or a motor for providing power source to the second drive system 1002; the output terminal of the rotation part of the second dynamo-electric unit 103 directly output the rotational kinetic energy to drive the load or through the clutch 122 or the optional transmission unit 109; if an optional clutch 132 is adapted to the system, the input end of the second dynamo-electric unit 103 is either directly or through the transmission unit, or the differential transmission unit 109 coupled to the clutch 132.

The clutch 102: relates to a transmission unit operating by manual, mechanical force, eccentric force, pneumatic, or hydraulic force, or electromagnetic controlled clutch, or single way clutch, or torque adjustable coupler, or any other transmission device that engage or disengage the mechanical rotational kinetic energy. The clutch 102 is directly coupled or through the transmission unit 129 to coupled between the rotary part of the active rotational power source 100 and the first dynamo-electrical unit 101. Depending on requirement, one or multiple or none clutch 102 may be provided.

The clutch 112: an optional item relates to a transmission operating by manual, mechanical force, eccentric force, pneumatic, or hydraulic flow force, or electromagnetic controlled clutch, or single way clutch, or torque adjustable coupler, or any other transmission device that engage or disengage the mechanical rotational kinetic energy. The clutch 112 is coupled between the rotary part of the second dynamo-electric unit 103 and the output terminal of the active rotational power source 100, or between the second dynamo-electric unit 103 and the first dynamo-electric unit 101.

The clutch 122: an optional item relates to a transmission operating by manual, mechanical force, eccentric force, pneumatic, or hydraulic flow force, or electromagnetic controlled clutch, or single way clutch, or torque adjustable coupler, or any other transmission device that engage or disengage the mechanical rotational kinetic energy. The clutch 122 is coupled to where between the input end of the load 120 and the rotary part of the second dynamo-electric unit 103. One or multiple clutch 122 may be provided by demand. The function of the clutch 122 may be replaced with the idling function of the transmission device 109 or a torque adjustable coupler connected to the input end of the load 120.

The Clutch 132: an optional item relates to a transmission operating by manual, mechanical force, eccentric force, pneumatic, or hydraulic flow force, or electromagnetic controlled clutch, or single way clutch, or torque adjustable coupler, or any other transmission device that engage or disengage the mechanical rotational kinetic energy. The clutch 132 is coupled to where between the transmission unit 129 which connected to the rotary part of the active rotational power source 100 and the rotary part of the second dynamo-electrical unit 103 of the second drive system 1002; or alternatively coupled between the rotary mechanism of a power train that produces or transmits the active rotational kinetic energy in the first drive system 1001 and the rotary mechanism that produces or transmits the active rotational function in the second drive system 1002 to control the transmission of rotational kinetic energy between the first and the second drive systems 1001, 1002 to be transmitted or disengaged; while multiple second drive systems 1002 are adapted to the system, the clutch 132 is set for regulating the transmission or disconnect the rotational kinetic energy among the multiple second drive systems 1002. One or multiple or no clutch 132 may be provided by demand.

The transmission unit 129: comprise of an automatic, semi-automatic or manual multiple-speed or continuously variable transmission device or one at a fixed speed ratio, or a differential gear set, or a rotational gear set, a fluid torque coupler, or a belt continuously variable transmission (CVT) or any other transmission of the prior art that is provided with idling and reverse gear functions to be optionally coupled to the rotation part of the active rotational power source 100; with the output terminal of the transmission unit 120 to be either directly or through the transmission unit 109 or the clutch 102 drive the first dynamo-electrical unit 101, or the load 120 of the first drive system 1001; or is coupled to the input end of the clutch 132. The transmission unit 129 may or may not be provided by requirement, and may be replaced with a planet gear set 801, or a rotational gear set 1030, or a dual acting dynamo-electric unit 1040.

The transmission unit 109: an optional item comprised of an automatic, semi-automatic or manual multiple-speed or continuously variable transmission device or one at a fixed speed ratio, or a differential gear set, or a rotational gear set, a fluid torque coupler, or a belt continuously variable transmission (CVT) or any other transmission of the prior art that as required is coupled to where between the rotary part of the active rotational power source 100 and the clutch 102, or at where between the clutch 102 and the rotary part of the first dynamo-electric unit 101, or at where between the rotary parts respectively between the first dynamo-electrical unit 101, and the clutch 112, or at where between the rotary parts respectively of the clutch 112 and the second dynamo-electrical unit 103, or at where between the rotary parts respectively between the second dynamo-electrical unit 103 and the clutch 122, or at where between the rotary parts respectively of the clutch 122 and the load 120. The transmission unit 109 may or may not be installed depending on requirement.

The drive control unit 104: an optional device comprised of an electro-mechanical or solid-state circuit provided for controlling the system operation under serial hybrid power transmission mode. While the first dynamo-electric unit 101 in the first drive system 1001 operating as a generator, the drive control unit 104 controls the power output to drive the second dynamo-electric unit 103 of the first or the second drive system 1001, 1002, and/or recharge the rechargeable device 106; or controls the power from the rechargeable device 106 to drive the first and the second dynamo-electric units 101, 103 each operating as a motor, or any of those dynamo-electrical units referred above for its operation variables such as driving voltage, amperage, polarity (in case of DC), frequency and phase (in case of AC) thus its rotating direction, rpm, torque and malfunction prevention. Alternatively, when the first dynamo-electric unit 101 in the first drive system 1001 and the second dynamo-electric unit 103 in the first or the second drive system 1001 or 1002, or any part of those dynamo-electric units therein is inversely driven to operate as a generator, the drive control unit 104 is applied to regulate the recharging power transferred to the rechargeable device 106 or power supplied to other electrical loading for the dynamo-electric unit to operate for breaking function by regenerated power.

The central control unit 105: an optional item comprised of solid-status or electro-mechanical device, or chip and related working software; processing the commanding signal from control interface 107 to control the split serial-parallel hybrid dual-power transmission system to operating in optimal fuel consumption and pollutant control, i.e., to regulating the system to operating in optimal brake specific fuel consumption region under either serial or parallel hybrid power transmission mode by having the engine to operate in a specific range of rpm which consumes less fuel yet yields higher power efficiency. The central control unit 105 sending command signals to the drive control unit 104 to control the operation of relative functions among the first dynamo-electric unit 101 in the first drive system 1001, the second dynamo-electric unit 103 in the first or the second drive system 1001 or 1002, and the rechargeable device 106, and controls the feedback monitoring and interaction among various units in the system.

The rechargeable device 106: an optional item implemented by various types of rechargeable batteries, super capacitors, or any other rechargeable device.

The control interface 107: an optional item comprised of solid-state, or electro-mechanical device, or chip, and related working software to receive inputs by manual or by control signals to control the operation of the split serial-parallel dual-power system.

The auxiliary rechargeable device 110: comprised of various types of rechargeable batteries, super capacitors, or flywheel storage, or any other rechargeable device with its power controlled by a startup switch 111 to drive a startup motor 121 adapted to the engine serving as the active rotational power source 100 thus to directly or through the transmission device 119, or to supply power to its peripheral equipment or any other electrical power driven load 130. The auxiliary rechargeable device 110, the startup switch 111 and the startup motor 121 are all optional items.

The power driven load 130: an optional item provided as a peripheral load driven by the first dynamo-electric unit 101 or the second dynamo-electric unit 103 operating as a generator, or by the rechargeable device 106, or the auxiliary rechargeable device 110 to output the rotational kinetic energy to drive land or surface transportation means or aircraft, and industrial equipment that requires to receive the input of rotational mechanical kinetics.

Given with an engine as the active rotational power source, the split serial-parallel hybrid dual-power drive system provides partial or all of the following functions:

The rotational kinetic energy from the engine power drives all or partial of the load 120 adapted to the first drive system 1001 and/or the load 120 adapted to the second drive system 1002.

When the system is operating in serial hybrid power transmission mode, the engine is regulated to run from lower rpm up to higher rpm, or at a desired rpm to drive the first dynamo-electric unit 101 in the first drive system 1001 to function as a generator. If the system is not equipped with the rechargeable device 106, the power generated from the first dynamo-electric unit 101 drives the second dynamo-electric unit 103 in the first drive system 1001 or the second drive system 1002 to operate as a motor for generating the rotational kinetic energy to drive the load 120. If the rechargeable device 106 is provided and under light loading, the power generated by the first dynamo-electric unit 101 in the first drive system 1001 drives the second dynamo-electric unit 103 in the first drive system 1001 or the second drive system 1002 and recharging the rechargeable device 106 simultaneously; under heavy loading, the power generated by the first dynamo-electric unit 101 in the first drive system 1001 and power from the rechargeable device 106 jointly drive the second dynamo-electric unit 103 adapted to the first drive system 1001 or to the second drive system 1002 for generating the rotational kinetic energy to drive the load 120 and simultaneously governing the engine to run at desired rpm which yields higher energy efficiency for fuel consumption and pollution reduction. The definition of desired rpm mentioned above generally refers to the rpm range to achieve the optimal brake specific fuel consumption wherein the engine runs with lower fuel consumption but higher output power no matter the system is operating in a serial or parallel hybrid power transmission mode. When the rechargeable device 106 is provided, the power generated by the first dynamo-electric unit 101 driven by the engine recharges the rechargeable device 106; or the power from the rechargeable device 106 and that from the first dynamo-electric unit 101 jointly drive the second dynamo-electric unit 103 to operate as a motor to drive the load 120 for maintaining the engine to run at a desired rpm which yields higher energy efficiency. The definition of the desired rpm generally refers to the rpm range to achieve the optimal brake specific fuel consumption region wherein the engine runs at lower fuel consumption with relatively higher output power whether the system is operating in a serial or parallel hybrid power transmission mode.

When the optional rechargeable device 106 is provided and the system operating under parallel hybrid power transmission mode, the power from the rechargeable device 106 drives the first dynamo-electric unit 101 in the first drive system 1001 and/or the second dynamo-electric unit 103 in the first drive system 1001 or in the second drive system 1002 to operate as a motor to jointly drive the load 120 with the engine. Under light loading condition, besides driving the load 120, the rotational kinetic energy from the engine simultaneously drive the first dynamo-electric unit 101, and the second dynamo-electrical unit 103 in the first drive system 1001 or in the second drive system 1002 or any part of the second dynamo-electrical unit 103 therein to recharge the rechargeable device 106 or supply power to other electrical power driven load 130. Under heavy loading, the power from the rechargeable device 106 drives the first dynamo-electric unit 101 in the first drive system 1001 and the second dynamo-electric unit 103 in the first drive system 1001 or in the second drive system 1002 or any part of the second dynamo-electric unit 103 therein for jointly driving the load with those rotational kinetic energy output from the engine.

The power form the rechargeable device 106 drives the first dynamo-electric unit 101 in the first drive system 1001, and the second dynamo-electric unit 103 in the first drive system 1001 or in the second drive system 1002 or any part of the second dynamo-electric unit 103 therein to operate as a generator for driving the load 120.

The first dynamo-electric unit 101 in the first drive system 1001, and the second dynamo-electric unit 103 in the first drive system 1001 or in the second drive system 1002 or any or part of the second dynamo-electric unit 103 therein is driven by the engine to operate as a generator for power regeneration to recharge the rechargeable device 106 or supply power to any other electrical loading 130.

The first dynamo-electric unit 101 in the first drive system 1001, and the second dynamo-electric unit 103 in the first drive system 1001 or in the second drive system 1002 or any part of the second dynamo-electric unit 103 therein is reversely driven by the load 120 to operate as a generator for power regeneration to recharge the rechargeable device 106 or supply power to any other electrical load 130.

When the rechargeable device 106 is provided, the mechanical damping of the engine provides braking function, and the first dynamo-electric unit 101 in the first drive system 1001, and the second dynamo-electric unit 103 in the first drive system 1001 or in the second drive system 1002 or any part of the second dynamo-electric unit 103 therein operates as a generator to recharge the rechargeable device 106 or supply power to any other electrical-driven load 130.

The rechargeable device 106 drives the first dynamo-electric unit 101 in the first drive system 1001, and the second dynamo-electric unit 103 in the first drive system 1001 or in the second drive system 1002 or any part of the second dynamo-electric unit 103 therein to operate as a motor for engine starting up.

The clutch 132 is controlled to engage for transmitting the rotational kinetic energy between the transmission unit 129 and the second drive system 1002 coupled to the active rotational power source 100, or transmitting the rotational kinetic energy between the first drive system 1001 and the second drive system 1002, or transmitting the rotational kinetic energy between or among multiple second drive systems; and to cut off the transmission of rotational kinetic energy when disengaged.

FIGS. 2 through 39 are preferred embodiments of the present invention based on those sub systems and functions, and those preferred embodiment do not limit any other applications on the same principles. To simplify the description, the continuously variable transmission unit 109, the auxiliary rechargeable device 110, the startup switch 111, the startup motor 121, the central control unit 105, and the control interface 107 as illustrated in FIG. 1 are omitted while the engine functions as the active rotational power source 100 with the first dynamo-electric unit 101, the second dynamo-electric unit 103, clutches 102, 112, 122, and 132, the drive control unit 104 and the optional rechargeable device 106, the power drive load 130 are retained in those preferred embodiments illustrated in FIGS. 2 through 39 to drive the load 120.

FIGS. 2 through 51 are preferred embodiment of various drive systems based on the system as illustrated in FIG. 1 with each individual preferred embodiment provides all or partial of the following operating functions:

System Function 1: the optional rechargeable device 106 is not provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator which further drives the second dynamo-electric unit 103 in the first drive system 1001 to operate as a motor for driving the load 120.

System Function 2: the optional rechargeable device 106 is not provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator which further drives the second dynamo-electric unit 103 in the second drive system 1002 to operate as a motor for driving the load 120.

System Function 3: the optional rechargeable device 106 is not provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator which further drives the second dynamo-electric unit 103 each provided in the first drive system 1001 and in the second drive system 1002 at the same time to operate as a motor for driving the load 120.

System Function 4: the optional rechargeable device 106 is provided in the system and the system operates in serial hybrid power transmission mode. Whether the rotational kinetic energy form the active rotational drives the load 120 through the first drive system 1001 or not, the system could be regulated by manual control, or by the control system comprised of the central control unit 105 and the drive control unit 104 to control the rotational kinetic energy from the active rotational power source 100 which further recharge the rechargeable device 106 or supply power to any other electrical power driven load 130 (including any externally connected unspecified load) and to drive the second dynamo-electric unit 103 in the first drive system 1001 (including any subunit such as the pilot drive unit 1000) to operate as a motor for driving the load 120.

System Function 5: the optional rechargeable device 106 is provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator which further recharge the rechargeable device 106 or supply power to any other electrical power driven load 130 (including any externally connected unspecified load) and to drive the second dynamo-electric unit 103 in the second drive system 1002 to operate as a motor for driving the load 120.

System Function 6: the optional rechargeable device 106 is provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator to further recharge the rechargeable device 106 or supply power to any other electrical power driven load 130 (including any externally connected unspecified load) and to drive the second dynamo-electric unit 103 each in the first drive system 1001, and in the second drive system 1002 to operate as a motor for driving the load 120.

System Function 7: the optional rechargeable device 106 is provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator and that power from the rechargeable device 106 to jointly drive the second dynamo-electric unit 103 in the first drive system 1001 (including any subunit such as the pilot drive unit 1000) to operate as a motor for driving the load 120.

System Function 8: the optional rechargeable device 106 is provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator, with the power from the rechargeable device 106 to jointly drive the second dynamo-electric unit 103 in the second drive system 1002 to operate as a motor for driving the load 120.

System Function 9: the optional rechargeable device 106 is provided in the system and the system operates in serial hybrid power transmission mode. Whether the rotational kinetic energy from the active rotational drives the load 120 through the first drive system 1001 or not, the system could be regulated by manual control, or by the control system comprised of the central control unit 105 and the drive control unit 104 to control the rotational kinetic energy from the active rotational power source 100 to drive the first dynamo-electric unit 101 to operate as a generator and with the power from the rechargeable device 106 to jointly drive the second dynamo-electric unit 103 each in the first drive system 1001 and in the second drive system 1002 to operate as a motor for driving the load 120.

System Function 10: the rotational kinetic energy from the engine serves as the active rotational power source 100 drives the load 120 of the first drive system 1001.

System Function 11: the rotational kinetic energy from the engine serves as the active rotational power source 100 drives the load 120 of the second drive system 1002.

System Function 12: the rotational kinetic energy from the engine serves as the active rotational power source 100 simultaneously drives the load 120 of the first drive system 1001 and the load 120 of the second drive system 1002.

System Function 13: the rotational kinetic energy from the engine serves as the active rotational power source 100 drives the load 120 of the first drive system 1001, and simultaneously drives the first dynamo-electric unit 101 to operate as a generator to recharge the rechargeable device 106 or supply power to any other electrical power driven load 130 (including any externally connected unspecified load).

System Function 14: the rotational kinetic energy from the engine serves as the active rotational power source 100 drives the load 120 of the first drive system 1001, and simultaneously drives the second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 15: the rotational kinetic energy from the engine serves as the active rotational power source 100 drives the load 120 of the first drive system 1001, and drives the first dynamo-electric unit 101 to operate as a generator and simultaneously drives the second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 16: the rotational kinetic energy from the engine serves as the active rotational power source 100 drives the load 120 of the second drive system 1002, and simultaneously drives the first dynamo-electric unit 101 to operate as a generator to recharge the rechargeable device 106 or supply power to any other electrical power driven load 130 (including any externally connected unspecified load).

System Function 17: the rotational kinetic energy from the engine serves as the active rotational power source 100 drives the load 120 of the second drive system 1002, and simultaneously drives the second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 18: the rotational kinetic energy from the engine serves as the active rotational power source 100 drives the load 120 of the second drive system 1002, and drives the first dynamo-electric unit 101 to operate as a generator and simultaneously drives second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 19: the rotational kinetic energy from the engine serves as the active rotational power source 100 drives the load 120 of the first drive system 1001, and simultaneously drives the load 120 of the second drive system 1002; the active rotational power source 100 also drives the first dynamo-electric unit 101 to operate as a generator to recharge the rechargeable device 106 or supply power to any other electrical power driven load 130 (including any externally connected unspecified load).

System Function 20: the rotational kinetic energy from the engine serves as the active rotational power source 100 drives the load 120 of the first drive system 1001, and simultaneously drives the load 120 of the second drive system 1002; the active rotational power source 100 also simultaneously drives the second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 21: the rotational kinetic energy from the engine serves as the active rotational power source 100 drives the load 120 of the first drive system 1001, and simultaneously drives the load 120 of the second drive system 1002; the active rotational power source 100 also simultaneously drives the first dynamo-electric unit 101 to operate as a generator and the second dynamo-electric unit 103 in the first drive system 1001 or in the second drive system 1002 to operate as a generator to recharge the rechargeable device 106 or supply power to any other electrical power driven load 130 (including any externally connected unspecified load).

System Function 22: the power from the rechargeable device 106 drives the second dynamo-electric unit 103 in the first drive system 1001 or in the second drive system 1002 to operate as a motor, or simultaneously drives both of the second dynamo-electric units 103 in the first and the second drive systems 1001, 1002 to further drive the load 120 of the first drive system 1001.

System Function 23: the power from the rechargeable device 106 drives the second dynamo-electric unit 103 in the first drive system 1001 or in the second drive system 1002 to operate as a motor, or simultaneously drives both of the second dynamo-electric units 103 in the first and the second drive systems 1001, 1002 to further drive the load 120 of the second drive system 1002.

System Function 24: the power from the rechargeable device 106 drives the second dynamo-electric unit 103 in the first drive system 1001 or in the second drive system 1002 to operate as a motor, or simultaneously drives both of the second dynamo-electric units 103 in the first and the second drive systems 1001, 1002 to further drive both loads 120 respectively of the first and the second drive system 1001, 1002.

System Function 25: the power from the rechargeable device 106 drives the first dynamo-electric unit 101 to operate as a motor for driving the load 120 of the first drive system 1001.

System Function 26: the power from the rechargeable device 106 drives the first dynamo-electric unit 101 to operate as a motor for driving the load 120 of the second drive system 1002.

System Function 27: the power from the rechargeable device 106 drives the first dynamo-electric unit 101 to operate as a motor for driving both loads 120 respectively of the first and the second drive system 1001, 1002.

System Function 28: the power from the rechargeable device 106 drives the first dynamo-electric unit 101 to operate as a motor, or drives the second dynamo-electric unit 103 in the first drive system 1001 or in the second drive system 1002 to function as a motor, or simultaneously drives both of the first dynamo-electric unit 101 and the second dynamo-electric unit 103 to operate as a motor for driving the load 120 of the first drive system 1001.

System Function 29: the power from the rechargeable device 106 drives the first dynamo-electric unit 101 to operate as a motor, or drives the second dynamo-electric unit 103 in the first drive system 1001 or in the second drive system 1002 to function as a motor, or simultaneously drives both of the first dynamo-electric unit 101 and the second dynamo-electric unit 103 to operate as a motor for driving the load 120 of the second drive system 1002.

System Function 30: the power from the rechargeable device 106 drives the first dynamo-electric unit 101 to operate as a motor, or drives the second dynamo-electric unit 103 in the first drive system 1001 or in the second drive system 1002 to function as a motor, or simultaneously drives both of the first dynamo-electric unit 101 and the second dynamo-electric unit 103 to operate as a motor for driving both loads 120 respectively of the first drive system 1001 and the second drive system 1002.

System Function 31: the power from the rechargeable device 106 drives the second dynamo-electric unit 103 in the first drive system 1001 to operate as a motor for producing the rotational kinetic energy for jointly driving the load 120 of the first drive system 1001 with the power from the active rotational power source 100.

System Function 32: the power from the rechargeable device 106 drives the second dynamo-electric unit 103 in the second drive system 1002 to operate as a motor for producing the rotational kinetic energy for jointly driving the load 120 of the second drive system 1002 with the power from the active rotational power source 100.

System Function 33: the power from the rechargeable device 106 drives the second dynamo-electric unit 103 in the first drive system 1001 and in the second drive system 1002 to function as a motor for jointly driving the load 120 of the first drive system 1001 and the second system 1002 with the rotational kinetic energy from the active rotational power source 100.

System Function 34: the power from the rechargeable device 106 drives the first dynamo-electric unit 101 to function as a motor for jointly driving the load 120 of the first drive system 1001 with the rotational kinetic energy from the active rotational power source 100.

System Function 35: the power from the rechargeable device 106 drives the first dynamo-electric unit 101 to function as a motor for producing the rotational kinetic energy for jointly driving the load 120 of the second drive system 1002 with the power from the active rotational power source 100.

System Function 36: the power from the rechargeable device 106 drives the first dynamo-electric unit 101 to function as a motor for jointly driving both loads 120 of the first drive system 1001 and the second drive system 1002 with the rotational kinetic energy from the active rotational power source 100.

System Function 37: the power from the rechargeable device 106 drives the first dynamo-electric unit 101 to function as a motor and simultaneously drives the second dynamo-electric unit 103 in the first drive system 1001 to operate as a motor for producing the rotational kinetic energy to jointly driving the load 120 of the first drive system 1001 with those from the active rotational power source 100.

System Function 38: the power from the rechargeable device 106 drives the first dynamo-electric unit 101 to function as a motor and simultaneously drives the second dynamo-electric unit 103 in the second drive system 1002 to operate as a motor for producing the rotational kinetic energy to jointly driving the load 120 of the second drive system 1002 with the power from the active rotational power source 100.

System Function 39: the power from the rechargeable device 106 drives the first dynamo-electric unit 101 to function as a motor and simultaneously drives the second dynamo-electric unit 103 in the first drive system 1001 or in the second drive system 1002 to operate as a motor for producing the rotational kinetic energy to jointly driving both loads 120 respectively of the first drive system 1001 and the second drive system 1002 with the power from the active rotational power source 100.

System Function 40: the load 120 of the first drive system 1001 reversely drives the first dynamo-electric unit 101 to operate as a generator to recharge the rechargeable device 106 or supply power to other electrical power driven load 130 (including any externally connected unspecified load) to provide the function of dynamic feedback electrical power regeneration from braking.

System Function 41: the load 120 of the second drive system 1002 reversely drives the first dynamo-electric unit 101 to operate as a generator to recharge the rechargeable device 106 or supply power to other electrical power driven load 130 (including any externally connected unspecified load) to provide the function of dynamic feedback electrical power regeneration from braking.

System Function 42: both loads 120 respectively of the first drive system 1001 and the second drive system 1002 reversely drives the first dynamo-electric unit 101 to operate as a generator to recharge the rechargeable device 106 or supply power to other electrical power driven load 130 (including any externally connected unspecified load) to provide the function of dynamic feedback electrical power regeneration from braking.

System Function 43: the load 120 of the first drive system 1001 reversely drives the second dynamo-electric unit 103 of the first drive system 1001 to operate as a generator to recharge the rechargeable device 106 or supply power to other electrical power driven load 130 (including any externally connected unspecified load) to provide the function of dynamic feedback electrical power regeneration from braking.

System Function 44: the load 120 of the second drive system 1002 reversely drives the second dynamo-electric unit 103 of the second drive system 1002 to operate as a generator to recharge the rechargeable device 106 or supply power to other electrical power driven load 130 (including any externally connected unspecified load) to provide the function of dynamic feedback electrical power regeneration from braking.

System Function 45: both loads 120 of the first drive system 1001 and the second drive system 1002 reversely drives the first dynamo-electric unit 101 to operate as a generator, and both of the second dynamo-electric units 103 in the first drive system 1001 and the second drive system 1002 to operate as a generator to recharge the rechargeable device 106 or supply power to other electrical power driven load 130 (including any externally connected unspecified load) to provide the function of dynamic feedback electrical power regeneration from braking.

System Function 46: the load 120 of the first drive system 1001 reversely drives the first dynamo-electric unit 101 to operate as a generator, and inversely draws the second dynamo-electric unit 103 in the first drive system 1001 to operate as a generator to recharge the rechargeable device 106 or supply power to other electrical power driven load 130 (including any externally connected unspecified load) to provide the function of dynamic feedback electrical power regeneration from braking.

System Function 47: the load 120 of the second drive system 1002 reversely drives the first dynamo-electric unit 101 to operate as a generator, and inversely draws the second dynamo-electric unit 103 in the second drive system 1002 to operate as a generator to recharge the rechargeable device 106 or supply power to other electrical power driven load 130 (including any externally connected unspecified load) to provide the function of dynamic feedback electrical power regeneration from braking.

System Function 48: both loads 120 respectively of the first drive system 1001 and the second drive system 1002 reversely drives the first dynamo-electric unit 101 to operate as a generator, and inversely draw both second dynamo-electric units 103 in the first drive system 1001 and the second drive system 1002 to operate as a generator to recharge the rechargeable device 106 or supply power to other electrical power driven load 130 (including any externally connected unspecified load) to provide the function of dynamic feedback electrical power regeneration from braking.

System Function 49: the mechanical damping of the engine deployed as the active rotational power source 100 serves as the brake for the load 120.

System Function 50: the mechanical damping of the engine deployed as the active rotational power source 100 serves as the brake for the load 120 of the first drive system 1001 simultaneously reverse drive the first dynamo-electric unit 101 to operate as a generator to recharge the rechargeable device 106 or supply power to other electrical power driven load 130 (including any externally connected unspecified load) to impose braking force on the load 120 via the damping for power regeneration.

System Function 51: the mechanical damp of the engine deployed as the active rotational power source 100 to execute braking on the load 120 of the second drive system 1002 simultaneously reverse drive the first dynamo-electric unit 101 to operate as a generator to recharge the rechargeable device 106 or supply power to other electrical power driven load 130 (including any externally connected unspecified load) to impose braking force on the load 120 of the second drive system 1002 by the damping for power regeneration.

System Function 52: the mechanical damping of the engine deployed as the active rotational power source 100 to impose breaking force on both loads 120 of the first drive system 1001 and the second drive system 1002 simultaneously reverse drive the first dynamo-electric unit 101 to operate as a generator to recharge the rechargeable device 106 or supply power to other electrical power driven load 130 (including any externally connected unspecified load) to impose braking force on both loads 120 of the first drive system 1001 and the second drive system 1002 by the damping for power regeneration.

System Function 53: the mechanical damping of the engine deployed as the active rotational power source 100 impose breaking force on the load 120 of the first drive system 1001 simultaneously reversely drive the second dynamo-electric unit 103 of the first drive system 1001 to operate as a generator to recharge the rechargeable device 106 or supply power to other electrical power driven load 130 (including any externally connected unspecified load) to impose braking force on the load 120 of the first drive system 1001 by the damping for power regeneration.

System Function 54: the mechanical damping of the engine deployed as the active rotational power source 100 impose breaking force on the load 120 of the second drive system 1002 simultaneously reversely drive the second dynamo-electric unit 103 of the second drive system 1002 to operate as a generator to recharge the rechargeable device 106 or supply power to other electrical power driven load 130 (including any externally connected unspecified load) to impose breaking force on the load 120 of the second drive system 1002 by the damping for power regeneration.

System Function 55: the mechanical damping of the engine deployed as the active rotational power source 100 to impose breaking force on both loads 120 of the first drive system 1001 and the second drive system 1002 simultaneously reversely drive both second dynamo-electric units 103 of the first drive system 1001 and the second drive system 1002 to operate as a generator to recharge the rechargeable device 106 or supply power to other electrical power driven load 130 (including any externally connected unspecified load) to impose breaking force on both loads 120 respectively of the first drive system 1001 and the second drive system 1002 by the damping for power regeneration.

System Function 56: the mechanical damping of the engine which deployed as the active rotational power source 100 to impose breaking force on the load 120 of the first drive system 1001 and simultaneously reversely drive the first dynamo-electric units 101 to operate as a generator and also reversely driving the second dynamo-electric unit 103 of the first drive system 1001 to operate as a generator to recharge the rechargeable device 106 or supply power to other electrical power driven load 130 (including any externally connected unspecified load) to impose the braking force on the load 120 of the first drive system 1001 by the damping for power regeneration.

System Function 57: the mechanical damping of the engine which deployed as the active rotational power source 100 to impose breaking force on the load 120 of the second drive system 1002 and simultaneously reversely drive the first dynamo-electric units 101 to operate as a generator and also reversely driving the second dynamo-electric unit 103 of the second drive system 1002 to operate as a generator to recharge the rechargeable device 106 or supply power to other electrical power driven load 130 (including any externally connected unspecified load) to impose breaking force on the load 120 of the second drive system 1002 by the damping for power regeneration.

System Function 58: the mechanical damping of the engine which deployed as the active rotational power source 100 to impose breaking force on both loads 120 of the first drive system 1001 and the second drive system 1002 and simultaneously reversely drive the first dynamo-electric units 101 to operate as a generator and also reversely driving the second dynamo-electric unit 103 of the second drive system 1002 to operate as a generator to recharge the rechargeable device 106 or supply power to other electrical power driven load 130 (including any externally connected unspecified load) to impose breaking force on both loads 120 of the first drive system 1001 and the second drive system 1002 by the damping for power regeneration.

System Function 59: if the starting motor 121 is adapted to the active rotational power source 100, the power from the rechargeable device 106 drives the starting motor 121 for engine starting up the engine which is deployed as the active rotational source 100.

System Function 60: the power from the rechargeable device 106 drives the first dynamo-electrical unit 101 to operate as a motor to start up the engine which serving as the active rotational source 100.

System Function 61: the power from the rechargeable device 106 drives the second dynamo-electrical unit 103 in the first drive system 1001 or in the second drive system 1002 to operate as a motor to start up the engine which serving as the active rotational source 100.

System Function 62: the power from the rechargeable device 106 drives the first dynamo-electrical unit 101 and simultaneously driving the second dynamo-electrical unit 103 in the first drive system 1001 or in the second drive system 1002 to operate as a motor to start up the engine serving as the active rotational power source 100.

System Function 63: the rotational kinetic energy from the engine serving as the active rotational power source 100 drives the first dynamo-electrical unit 101 to operate as a generator to recharge the rechargeable device 106 or supply power to any other electrical power driven load 130 (including any externally connected unspecified load).

System Function 64: the rotational kinetic energy from the engine deployed as the active rotational power source 100 drives the second dynamo-electrical unit 103 in the first drive system 1001 or in the second drive system 1002 to operate as a generator, or simultaneously drives both of the second dynamo-electrical units 103 to recharge the rechargeable device 106 or supply power to any other electrical power driven load 130 (including any externally connected unspecified load).

System Function 65: the rotational kinetic energy from the engine deployed as the active rotational power source 100 drives the first dynamo-electrical unit 101 to operate as a generator and simultaneously driving the second dynamo-electrical unit 103 in the first drive system 1001 or in the second drive system 1002 to operate as a generator, or simultaneously drives both of the first and the second dynamo-electrical units 101, 103 to recharge the rechargeable device 106 or supply power to any other electrical power driven load 130 (including any externally connected unspecified load).

System Function 66: the active rotational power source 100 drives the transmission unit 129 and the coupled clutch 1020 to drive the transmission unit 109 which provides the regulating capability of variable transmission, reversing or idling functions to constitute the pilot drive unit 1000 for driving the load 120.

System Function 67: the active rotational power source 100 drives the transmission unit 129 and the coupled clutch 1020 to drive the transmission unit 109 which provides the regulating capability of variable transmission, reversing or idling functions and multiple shafts which allow differential output to constitute the pilot drive unit 1000 for driving the load 120.

System Function 68: while rechargeable device 106 is not provided, the active rotational power source 100 drives the independent power generation unit 2000 which further drive the second dynamo-electrical unit 103 in the first drive system 1001, or drive the second dynamo-electrical unit 103 in the second drive system 1002, or simultaneously drive both of the second dynamo-electrical units 103 respectively of the first drive system 1001 and the second drive system 1002 to operate as a motor for generating the rotational kinetic energy to drive the load 120.

System Function 69: while rechargeable device 106 is provided, the active rotational power source 100 drives the independent power generation unit 2000 to further drive the second dynamo-electrical unit 103 in the first drive system 1001, or drive the second dynamo-electrical unit 103 in the second drive system 1002, or simultaneously drive both of the second dynamo-electrical units 103 respectively of the first drive system 1001 and the second drive system 1002 to operate as a motor for generating the rotational kinetic energy to drive the load 120, and recharge the rechargeable device 106 or to supply power to any other electrical power driven load 130 (including any externally connected unspecified load).

System Function 70: while rechargeable device 106 is provided, the active rotational power source 100 drives the independent power generation unit 2000 to further drive the second dynamo-electrical unit 103 in the first drive system 1001, or drive the second dynamo-electrical unit 103 in the second drive system 1002, or simultaneously drive both of the second dynamo-electrical units 103 respectively of the first drive system 1001 and the second drive system 1002 to operate as a motor for generating the rotational kinetic energy to drive the load 120.

System Function 71: while rechargeable device 106 is provided, the active rotational power source 100 drives the independent power generation unit 2000; power from the power generation unit 2000 and the rechargeable device 106 jointly drive the second dynamo-electrical unit 103 in the first drive system 1001, or jointly drive the second dynamo-electrical unit 103 in the second drive system 1002, or jointly drive both of the second dynamo-electrical units 103 simultaneously respectively of the first drive system 1001 and the second drive system 1002 to operate as a motor for generating the rotational kinetic energy to drive the load 120.

System Function 72: while rechargeable device 106 is provided, the active rotational power source 100 drives the independent power generation unit 2000 to recharge the rechargeable device 106 or to supply power to any other electrical power driven load 130 (including any externally connected unspecified load).

System Function 73: while rechargeable device 106 is provided, the independent power generation unit 2000 is reversely driven by the loading to recharge the rechargeable device 106 or to supply power to any other electrical power driven load 130 (including any externally connected unspecified load) to impose breaking force on load 120 by the damping for power regeneration.

System Function 74: while rechargeable device 106 is provided, and the power generation unit 2000 stops running, the power from the rechargeable device 106 drives the second dynamo-electrical unit 103 in the first drive system 1001, or drives the second dynamo-electrical unit 103 in the second drive system 1002, or simultaneously both second dynamo-electrical units 103 respectively of the first drive system 1001 and the second drive system 1002 to operate as a motor for generating the rotational kinetic energy to drive the load 120.

System Function 75: to permit the transmission of the rotational kinetic energy controlled by the clutch 132 between the first drive system 1001 and the second drive system 1002 while the clutch 132 is engaged.

System Function 76: to split the transmission of the rotational kinetic energy controlled by the clutch 132 between the first drive system 1001 and the second drive system 1002 while the clutch 132 is disengaged.

System Function 77: to execute the transmission of the rotational kinetic energy controlled by clutch 132 between the transmission unit 129 coupled to the active rotational power source 100 and the second drive system 1002 while the clutch 132 is engaged.

System Function 78: to split the transmission of the rotational kinetic energy controlled by clutch 132 between the transmission unit 129 coupled to the active rotational power source 100 and the second drive system 1002 while the clutch 132 is disengaged.

System Function 79: to execute the transmission of the rotational kinetic energy controlled by clutch 132 between (among) multiple second drive systems 1002 while the clutch 132 is engaged.

System Function 80: to split the transmission of the rotational kinetic energy controlled by clutch 132 between (among) multiple second drive systems 1002 while the clutch 132 is disengaged.

Those preferred embodiments of the system as illustrated in FIG. 1 and FIGS. 2 through 51 to provide any or all of the functions described in System Functions 1 through 80.

Figure 2:
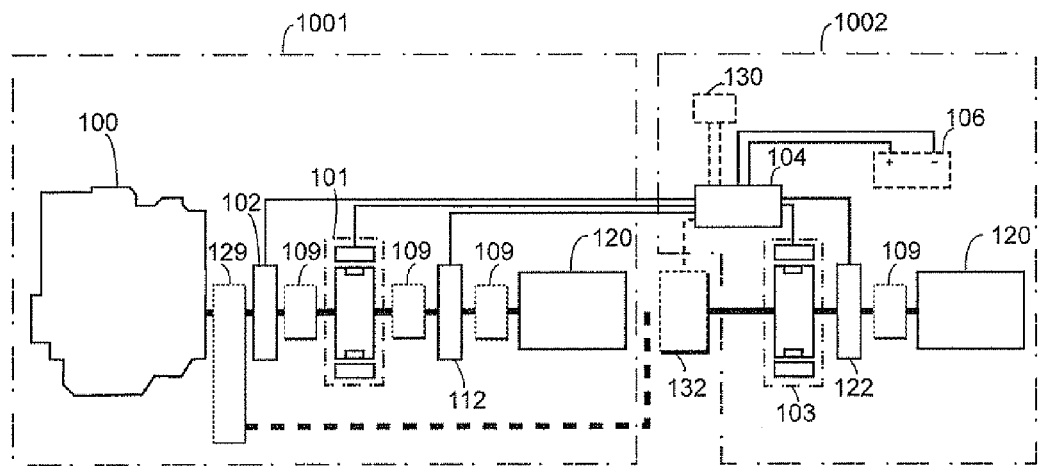
FIG. 2 is a block diagram of the first preferred embodiment of a split serial-parallel hybrid dual-power drive system.

FIG. 2 shows the block diagram of a first preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129 and the optional clutch 102 to drive the first dynamo-electrical unit 101 and to further drive the respective load 120 through the clutch 112 and the optional transmission unit 109. In the second drive system 1002, the second dynamo-electrical unit 103 served as the power source for the second drive system 1002 to drive the respective load 120 through the optional clutch 122 and the optional transmission unit 109 to comprise the second drive system 1002.

Accordingly, by regulating the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, or the rotary part of the first dynamo-electrical unit 101 driven by the first drive system 1001 is coupled to the input end of the clutch 132; meanwhile the output terminal of the clutch 132 is coupled to the rotary part of the second dynamo-electrical unit 103 serving as the power source for the second drive system 1002, or the output terminal of the clutch 122 coupled to, the output terminal of the optional transmission unit 109 coupled to, or the input terminal of the load 120 driven by the second drive system 1002 for the control of the transmission status of the rotational kinetic energy between the first drive system 1001 and the second drive system 1002.

Figure 3:
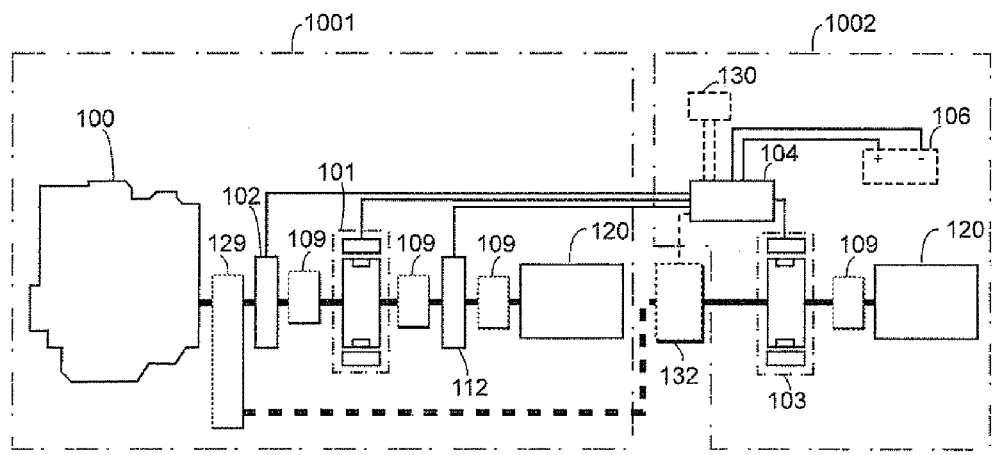
FIG. 3 is a block diagram of the second preferred embodiment of a split serial-parallel hybrid dual-power drive system.

FIG. 3 shows the block diagram of a second preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129 and the optional clutch 102 to drive the first dynamo-electrical unit 101 and to further drive the respective load 120 through the clutch 112 and the optional transmission unit 109. In the second drive system 1002, the second dynamo-electrical unit 103 served as the power source for the second drive system 1002 drives the respective load 120 through the optional transmission unit 109.

Accordingly, by regulating the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, or the rotary part of the first dynamo-electrical unit 101 driven by the first drive system 1001 is coupled to the input terminal of the clutch 132; meanwhile the output terminal of the clutch 132 is coupled to the rotary part of the second dynamo-electrical unit 103 serving as the power source for the second drive system 1002, the output terminal of the optional transmission unit 109 coupled to, or the input terminal of the load 120 driven by the second drive system 1002 for the control of the transmission status of the rotational kinetic energy between the first drive system 1001 and the second drive system 1002.

Figure 4:
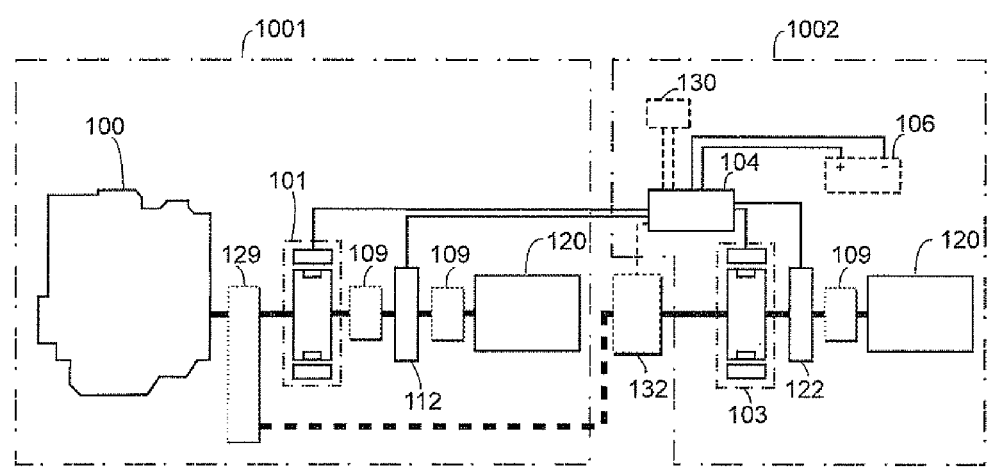
FIG. 4 is a block diagram of the third preferred embodiment of a split serial-parallel hybrid dual-power drive system.

FIG. 4 shows the block diagram of the third preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129 to drive the first dynamo-electrical unit 101 and to further drive the adapted load 120 through the clutch 112 and the optional transmission unit 109. In the second drive system 1002, the second dynamo-electrical unit 103 serving as the power source for the second drive system 1002 drives the adapted load 120 through the optional clutch 122 and optional transmission unit 109.

Accordingly, by regulating the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, or the rotary part of the first dynamo-electrical unit 101 driven by the first drive system 1001 is coupled to the input terminal of the clutch 132; meanwhile the output terminal of the clutch 132 is coupled to the rotary part of the second dynamo-electrical unit 103 serving as the power source for the second drive system 1002, the output terminal of the clutch 122 coupled to, the output terminal of the optional transmission unit 109 coupled to, or the input terminal of the load 120 driven by the second drive system 1002 for the control of the transmission status of the rotational kinetic energy between the first drive system 1001 and the second drive system 1002.

Figure 5:
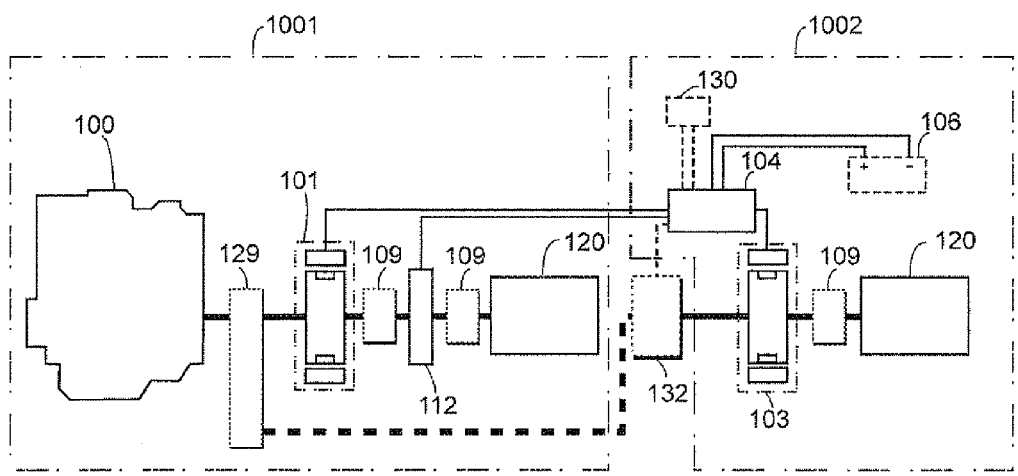
FIG. 5 is a block diagram of the fourth preferred embodiment of a split serial-parallel hybrid dual-power drive system.

FIG. 5 shows the block diagram of the fourth preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129 to drive the first dynamo-electrical unit 101 and to further drive the respective load 120 through the clutch 112 and the optional transmission unit 109. In the second drive system 1002, the second dynamo-electrical unit 103 serving as the power source for the second drive system 1002 drives the respective load 120 through optional transmission unit 109.

Accordingly, by regulating the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to the active rotational power source 100, or the rotary part of the first dynamo-electrical unit 101 driven by the first drive system 1001 is coupled to the input terminal of the clutch 132; meanwhile the output terminal of the clutch 132 is coupled to the rotary part of the second dynamo-electrical unit 103 serving as the power source for the second drive system 1002, or the output terminal of the optional transmission unit 109, or the input terminal of the load 120 driven by the second drive system 1002 for the control of the transmission status of the rotational kinetic energy between the first drive system 1001 and the second drive system 1002.

Figure 6:
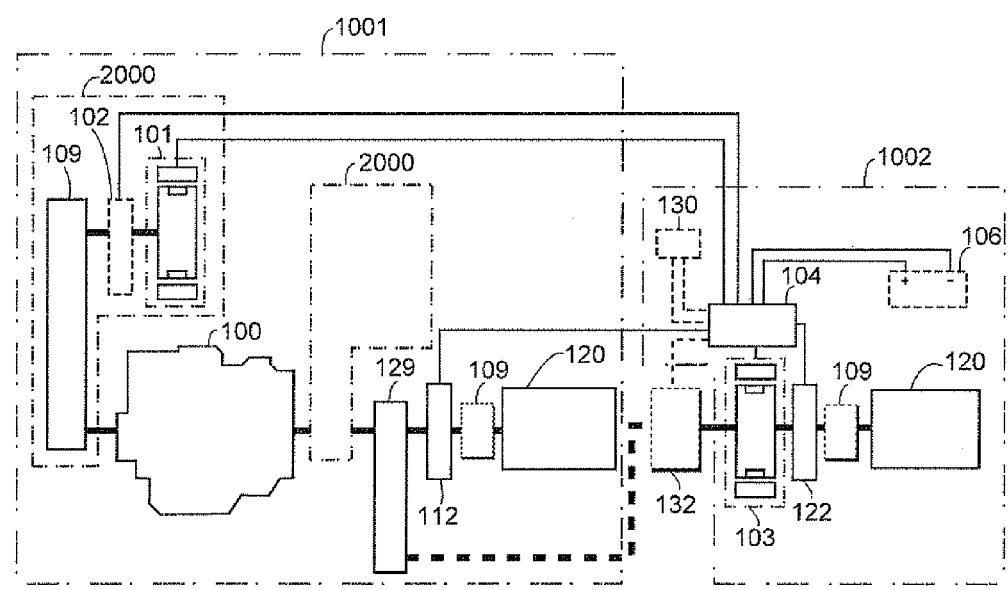
FIG. 6 is a block diagram of the fifth preferred embodiment of a split serial-parallel hybrid dual-power drive system.

FIG. 6 shows the block diagram of the fifth preferred embodiment of the split serial-parallel hybrid dual-power drive system of the present invention, essentially comprised of the first drive system 1001 and the second drive system 1002. An independent power generation unit 2000 is comprised of the optional transmission unit 109 and the optional clutch 102 provided either on the same side but not on the same shaft, not on the same side but on the same shaft, or neither on the same side nor on the same shaft of the output terminal of the load 120 driven by the active rotational power source to be coupled to the first dynamo-electrical unit 101; and the rotary part of the active rotational power source 100 is coupled to the optional transmission unit 129, the optional clutch 112 and the optional transmission 109 to drive the respective load 120 to comprise the first drive system 1001. In the second drive system 1002, the second dynamo-electrical unit 103 serving as the power source for the second drive system 1002 drives the adapted load 120 through the optional clutch 122 and optional transmission unit 109.

Accordingly, by regulating the operation of the first drive system 1001 and the second drive system 1002 constitutes the split serial-parallel hybrid dual-power drive system.

Furthermore, as required, the output terminal of the rotational kinetic energy of the active rotational power source 100, or the output terminal of the transmission unit 129 coupled to, or the rotary part to output the rotational kinetic energy of the clutch 112 coupled to, or the output terminal of the optional transmission unit 109 provided to, or the rotary part of the first dynamo-electrical unit 101 driven by the first drive system 1001 is coupled to the input end of the clutch 132; meanwhile the output terminal of the clutch 132 is coupled to the rotary part of the second dynamo-electrical unit 103 serving as the power source for the second drive system 1002, the output terminal of the clutch 122 coupled to, the output terminal of the optional transmission unit 109 provided to, or the input end of the load 120 driven by the second drive system 1002 for the control of the transmission status of the rotational kinetic energy between the first drive system 1001 and the second drive system 1002.

Figure 7:
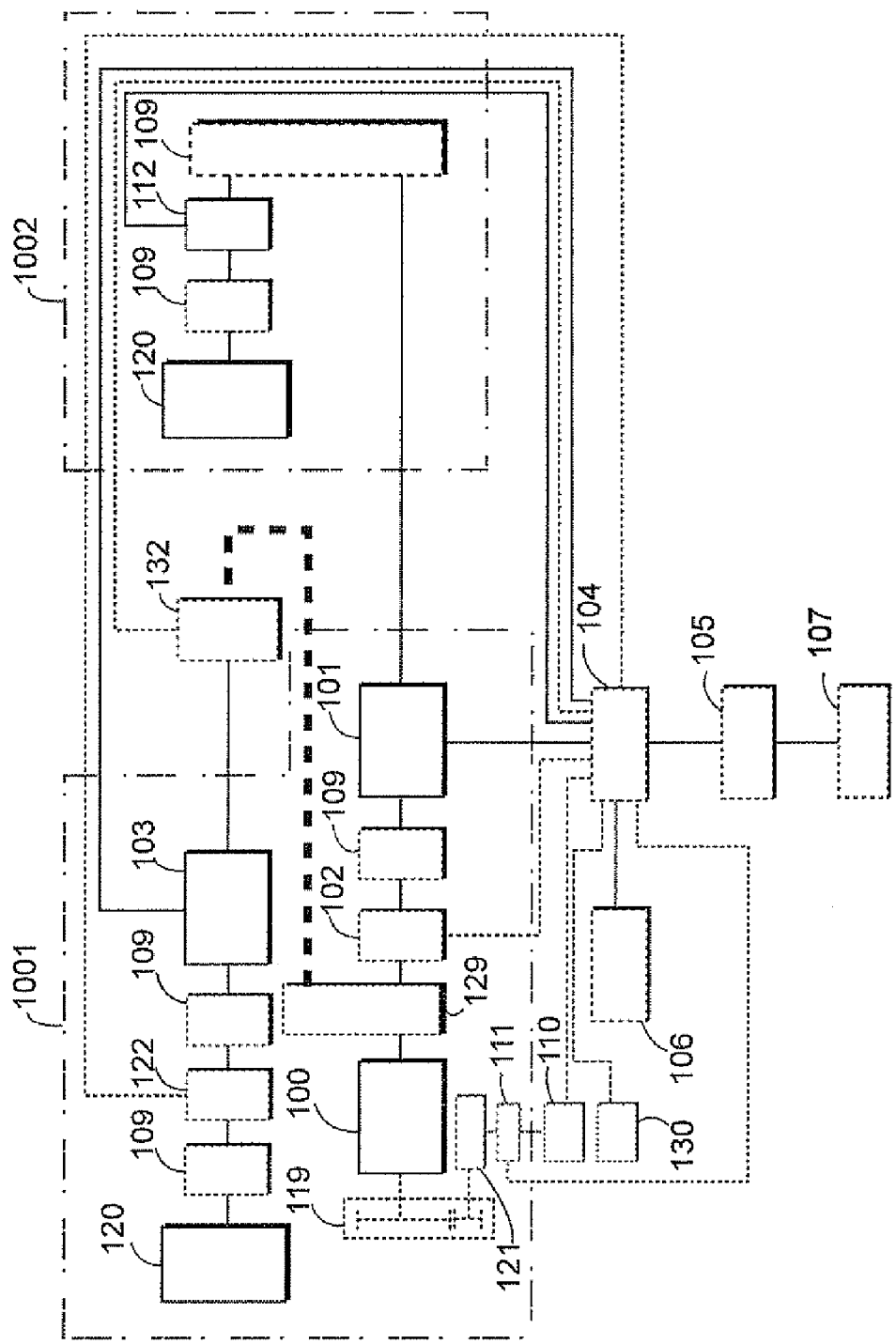
FIG. 7 is a block diagram of the sixth preferred embodiment of a split serial-parallel hybrid dual-power drive system.

FIG. 7 shows the block diagram of a sixth preferred embodiment of the split serial-parallel hybrid dual-power drive system of the present invention, essentially comprised of the first drive system 1001 and the second drive system 1002. In the first drive system 1001, the rotary part to output the rotational kinetic energy from the active rotational power source 100 is coupled to the optional transmission unit 129, the optional clutch 102, and the optional transmission unit 109 to drive the first dynamo-electrical unit 101 and to further drive the adapted load 120 through the non-coaxial-aligned transmission unit 129, the clutch 112, and the optional transmission unit 109. In the second drive system 1002, the second dynamo-electrical unit 103 serving as the power source for the second drive system 1002 drives the respective load 120 through the optional clutch 122 and optional transmission unit 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the output terminal of the transmission unit 129 coupled to, or the rotary part to output the rotational kinetic energy of the clutch 102 coupled to, the output terminal of the transmission unit 109 provided to, or the rotary part of the first dynamo-electrical unit 101 driven by the first drive system 1001 is coupled to the input end of the clutch 132; meanwhile the output terminal of the clutch 132 is coupled to the rotary part of the second dynamo-electrical unit 103 serving as the power source for the second drive system 1002, the output terminal of the clutch 122 coupled to, the output terminal of the optional transmission unit 109 provided to, or the input end of the load 120 driven by the second drive system 1002 for the control of the transmission status of the rotational kinetic energy between the first drive system 1001 and the second drive system 1002.

Figure 8:
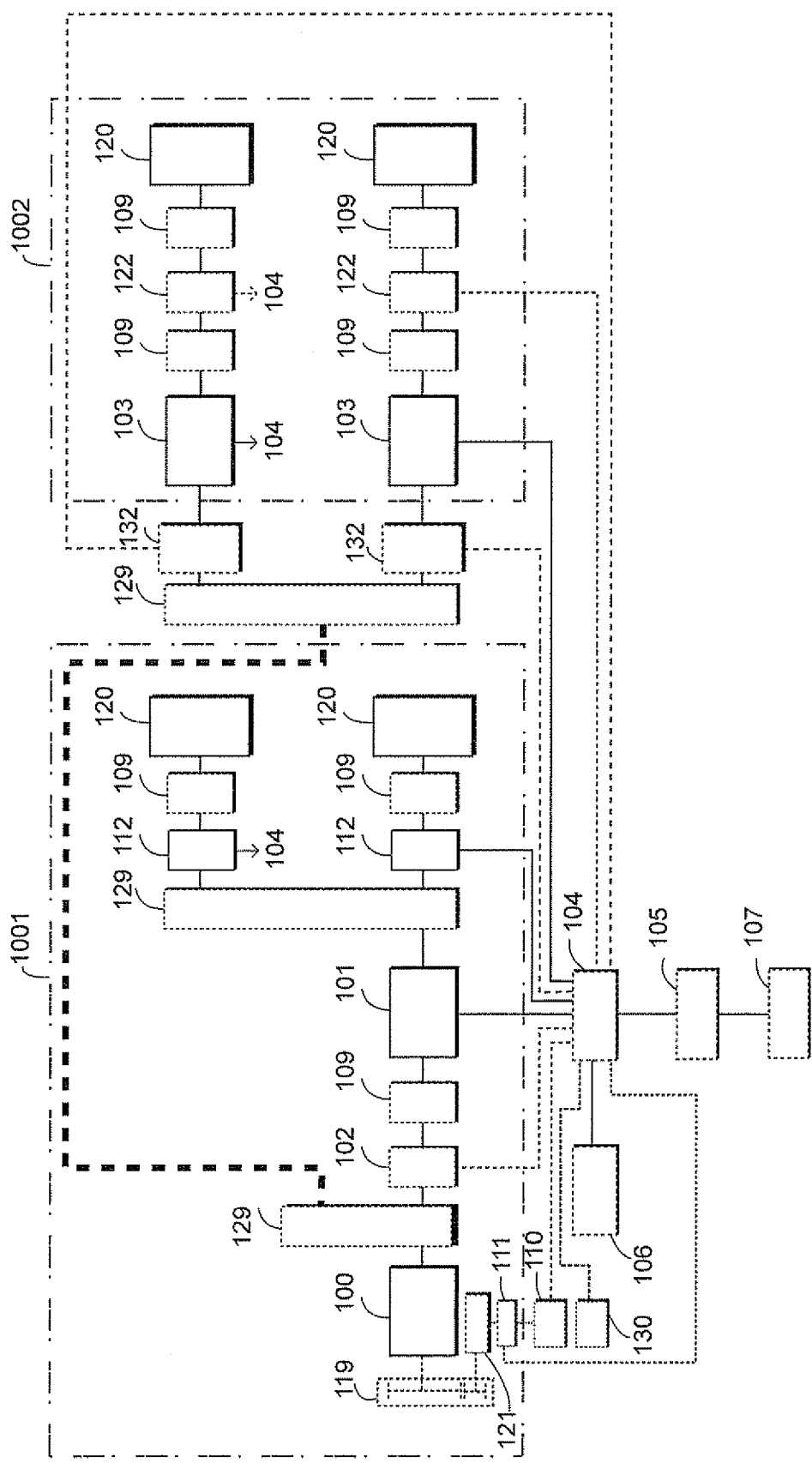
FIG. 8 is a block diagram of the seventh preferred embodiment of a split serial-parallel hybrid dual-power drive system.

FIG. 8 shows the block diagram of the seventh preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129, the optional clutch 102, and the transmission unit 109 to drive the first dynamo-electrical unit 101 and to further drive the each respective load 120 by the rotary part of the first dynamo-electrical unit 101 through the transmission unit 129 to transmit the rotational kinetic energy to two or multiple clutches 112 and transmission units 109 individually selected. Two or multiple second drive systems are comprised of multiple second dynamo-electrical unit 103 serving as the power source for the second drive system 1002, and multiple clutches 122 and multiple transmission units 109 individually selected to drive the adapted loads 120 respectively.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, the output terminal of the optional transmission unit 109 provided to, or the rotary part of the first dynamo-electrical unit 101 driven by the first drive system 1001 is coupled to the input end of the transmission unit 129 operating on multi-shaft transmission; the output terminals of those clutches 132 are respectively coupled to rotations parts of those multiple second dynamo-electrical units 103 serving as the power source of the second drive system 1002, or respectively coupled to output terminals of those clutches 122, or coupled to output terminals of those transmission units 109 individually selected, or to input terminals of those loads respectively driven by the second drive system 1002 for the control of the transmission status of the rotational kinetic energy between the first drive system 1001 and the second drive system 1002.

Figure 9:
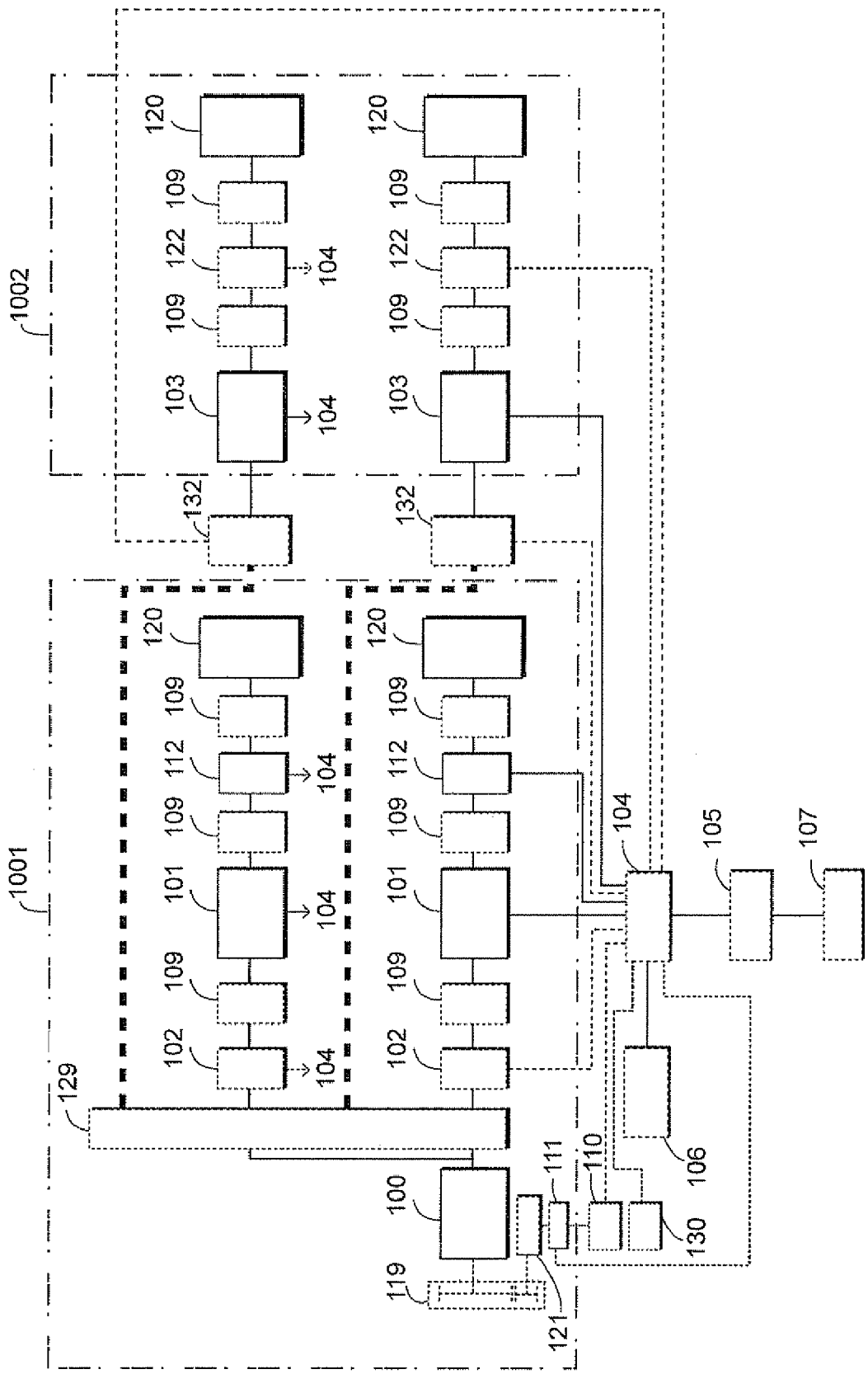
FIG. 9 is a block diagram of the eighth preferred embodiment of a split serial-parallel hybrid dual-power drive system.

FIG. 9 shows the block diagram of the eighth preferred embodiment of the split serial-parallel hybrid dual-power drive system of the present invention, essentially comprised of multiple first drive systems 1001 and multiple second drive systems 1002. In the first drive system 1001, the rotary part to output the rotational kinetic energy from the active rotational power source 100 is coupled to the optional transmission unit 129 provided with multiple output shafts respectively coupled to two or multiple optional clutches 102 and transmission units 109 to drive two or multiple first dynamo-electrical units 101, two or multiple clutches 112, and two or multiple transmission units 109 to respectively drive the adapted loads 120 through the respective clutch 112 and the optional transmission unit 109. In the second drive system 1002, tow or multiple second dynamo-electrical units 103 serving as the power source for the second drive system 1002 respectively drive multiple adapted load 120 through multiple optional clutches 122 and multiple optional transmission units 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, or the rotary part of individual output of the transmission unit 109 operating on multi-shaft transmission coupled to, or the rotary parts to output the rotational kinetic energy of the clutches 102 respectively coupled to, each output end of the optional transmission units 109, or each rotary part of the first dynamo-electrical units 101 driven by the first drive system 1001 is coupled to the input end of the clutch 132; meanwhile the output terminal of the clutch 132 is coupled to each rotary part of the second dynamo-electrical units 103 serving as the power source for the second drive system 1002, each output end of the clutches 122 coupled to, each output end of the optional transmission units 109 coupled to, or each input end of the loads 120 driven by the second drive system 1002 for the control of the transmission status of the rotational kinetic energy between the first drive system 1001 and the second drive system 1002.

Figure 10:
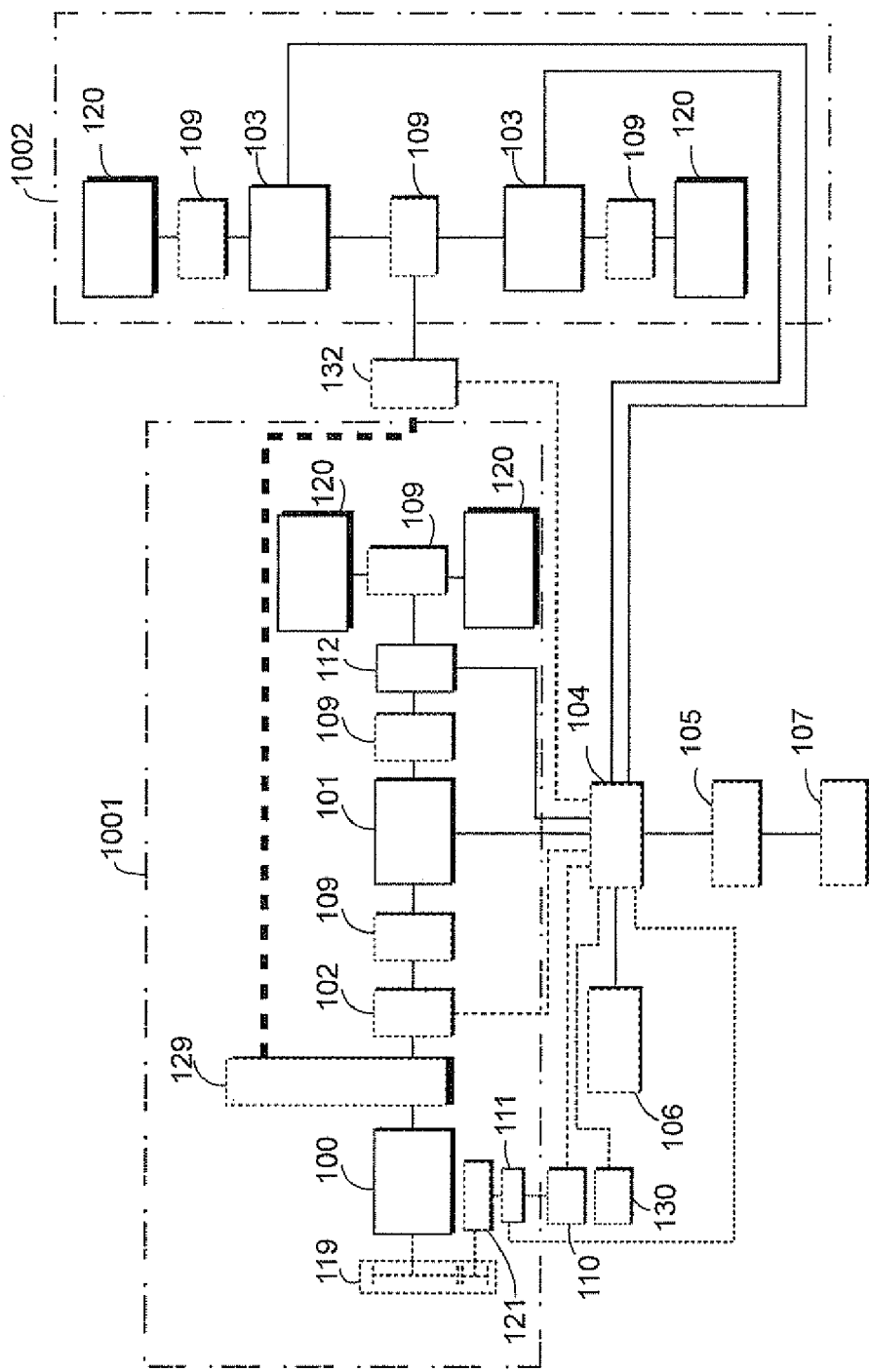
FIG. 10 is a block diagram of the ninth preferred embodiment of a split serial-parallel hybrid dual-power drive system.

FIG. 10 shows the block diagram of the ninth preferred embodiment of the split serial-parallel hybrid dual-power drive system of the present invention, essentially comprised of the first drive system 1001 and the second drive system 1002. In the first drive system 1001, the rotary part applied to output the rotational kinetic energy from the active rotational power source 100 is coupled to the optional transmission unit 129, the optional clutch 102, and the transmission unit 109 to drive the first dynamo-electrical unit 101 and to further drive those loads 120 adapted to both output terminals of the differential transmission unit 109 through the optional transmission unit 109, the clutch 112 and the differential transmission unit 109. In the second drive system 1002, two or multiple second dynamo-electrical units 103 serving as the power source for the second drive system 1002 respectively drive multiple adapted load 120 through each optional transmission units 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, the rotary part to output the rotational kinetic energy of the clutch 102 coupled to, the output terminal of the optional transmission unit 109 provided to, or the rotary part of the first dynamo-electrical unit 101 driven by the first drive system 1001 is coupled to the input end of the clutch 132; meanwhile the output terminal of the clutch 132 is coupled to the input end of the differential transmission unit 109. Both output ends of the differential transmission unit 109 are respectively coupled to both rotary parts of the second dynamo-electrical units 103 serving as the power source for the second drive system 1002 for the control of the transmission status of the rotational kinetic energy between the first drive system 1001 and the second drive system 1002.

Figure 11:
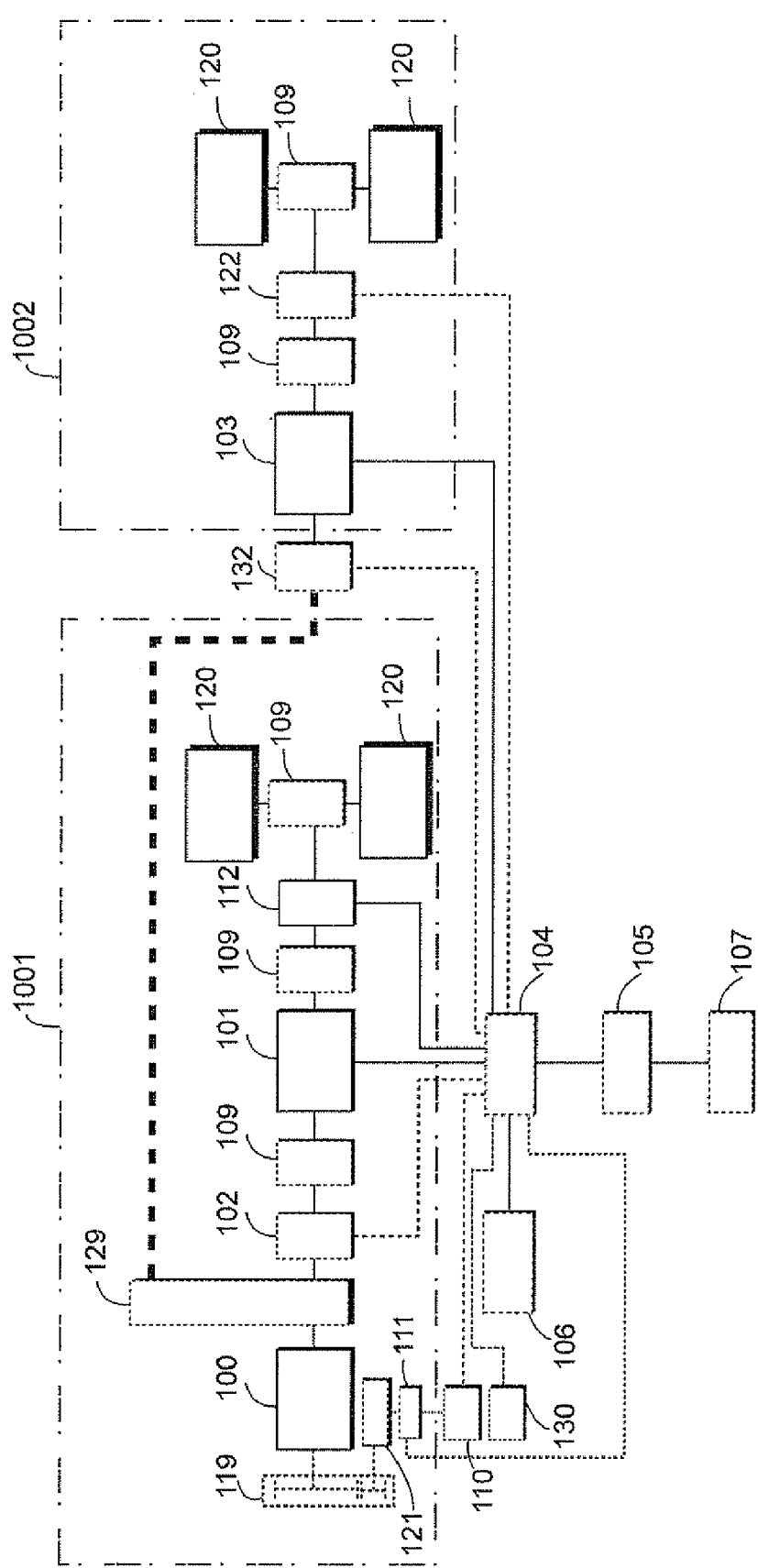
FIG. 11 is a block diagram of the tenth preferred embodiment of a split serial-parallel hybrid dual-power drive system.

FIG. 11 shows the block diagram of the tenth preferred embodiment of the split serial-parallel hybrid dual-power drive system of the present invention, essentially comprised of the first drive system 1001 and the second drive system 1002. In the first drive system 1001, the rotary part to output the rotational kinetic energy from the active rotational power source 100 is coupled to the optional transmission unit 129, the optional clutch 102, and the transmission unit 109 to drive the first dynamo-electrical unit 101 and the rotary part of the first dynamo-electrical unit 101 is coupled to the optional transmission unit 109 and the clutch 112 to drive two loads 120 respectively adapted to both output terminals of the differential transmission unit 109. In the second drive system 1002, multiple second dynamo-electrical units 103 serving as the power source for the second drive system 1002 respectively drive multiple loads 120 adapted to both output terminals of the differential transmission unit 109 through the optional transmission unit 109, the clutch 122, and the differential transmission unit 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, the input end of the optional transmission unit 109, or the rotary part of the first dynamo-electrical unit 101 driven by the first drive system 1001 is coupled to the input end of the clutch 132; meanwhile the output terminal of the clutch 132 is coupled to the rotary part of the second dynamo-electrical unit 103 serving as the power source for the second drive system 1002, or the output terminal of the optional transmission unit 109, the output terminal of the clutch 122 coupled to the second drive system 1002, or to the input end of the differential transmission unit 109 located at where between the clutch 122 and the driven load 120 for the control of the transmission status of the rotational kinetic energy between the first drive system 1001 and the second drive system 1002.

Figure 12:
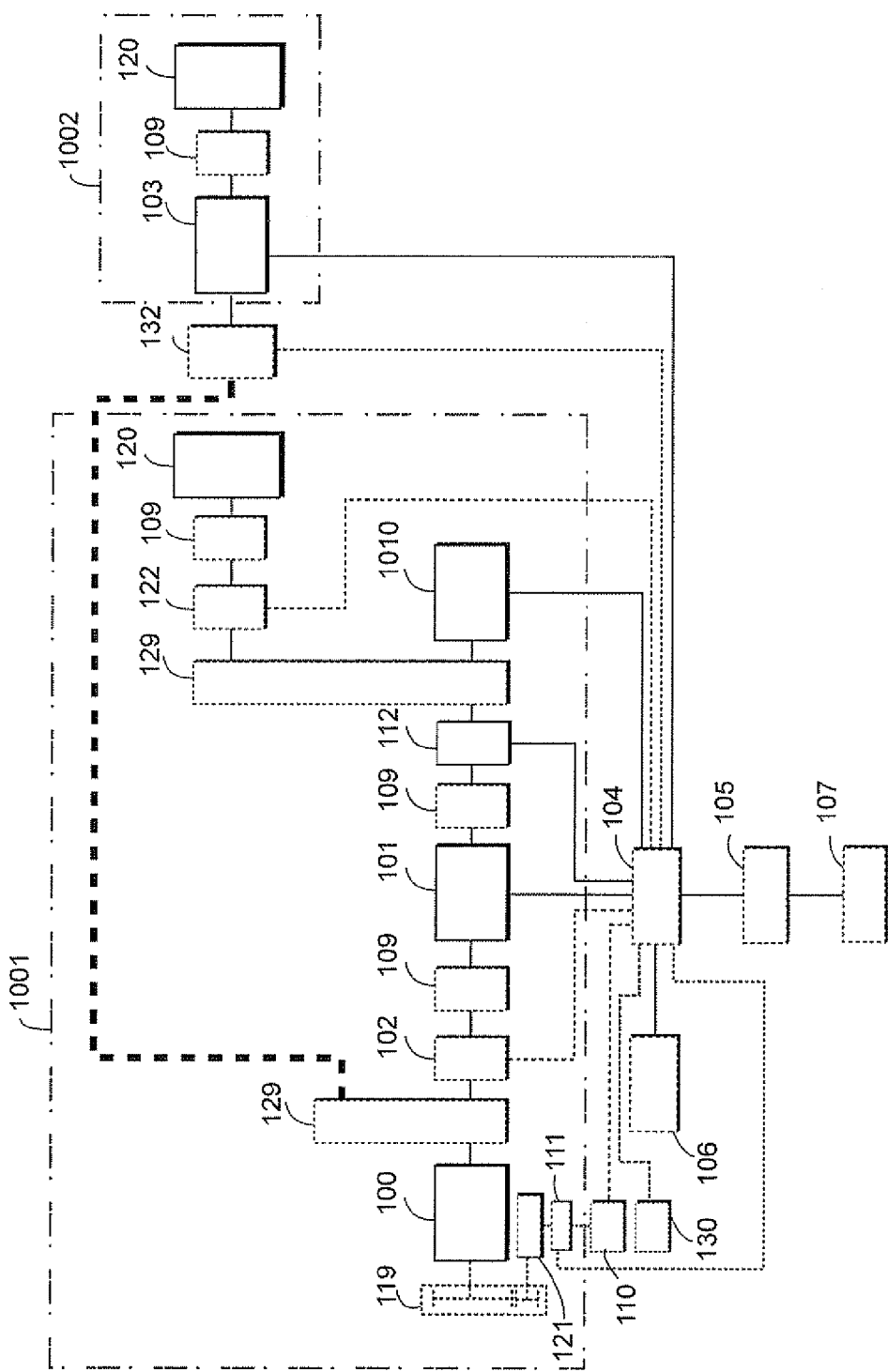
FIG. 12 is a block diagram of the eleventh preferred embodiment of a split serial-parallel hybrid dual-power drive system.

FIG. 12 shows the block diagram of the eleventh preferred embodiment of the split serial-parallel hybrid dual-power drive system of the present invention, essentially comprised of the first drive system 1001 and the second drive system 1002. In the first drive system 1001, the rotary part to output the rotational kinetic energy from the active rotational power source 100 is coupled to the optional transmission unit 129, the optional clutch 102, and the transmission unit 109 to drive the first dynamo-electrical unit 101 and the rotary part of the first dynamo-electrical unit 101 is coupled to the optional transmission unit 109 and the clutch 112, and further coupled to the optional transmission unit 129 provided with multiple input and output terminals. The transmission unit 129 provided with multiple input and output terminals is coupled to an auxiliary dynamo-electrical unit 1010 for the optional transmission unit 109 coupled through the clutch 122 to drive the adapted load 120. In the second drive system 1002, the second dynamo-electrical unit 103 serving as the power source for the second drive system 1002 drives the adapted load 120 through the operational transmission unit 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, the input end of the optional transmission unit 109 provided to or the rotary part of the first dynamo-electrical unit 101 driven by the first drive system 1001 is coupled to the input end of the clutch 132; meanwhile the output terminal of the clutch 132 is coupled to the rotary part of the second dynamo-electrical unit 103 serving as the power source for the second drive system 1002, or the output terminal of the optional transmission unit 109 provided to, or the input end of the load 120 driven by the second drive system 1002 for the control of the transmission status of the rotational kinetic energy between the first drive system 1001 and the second drive system 1002.

Figure 13:
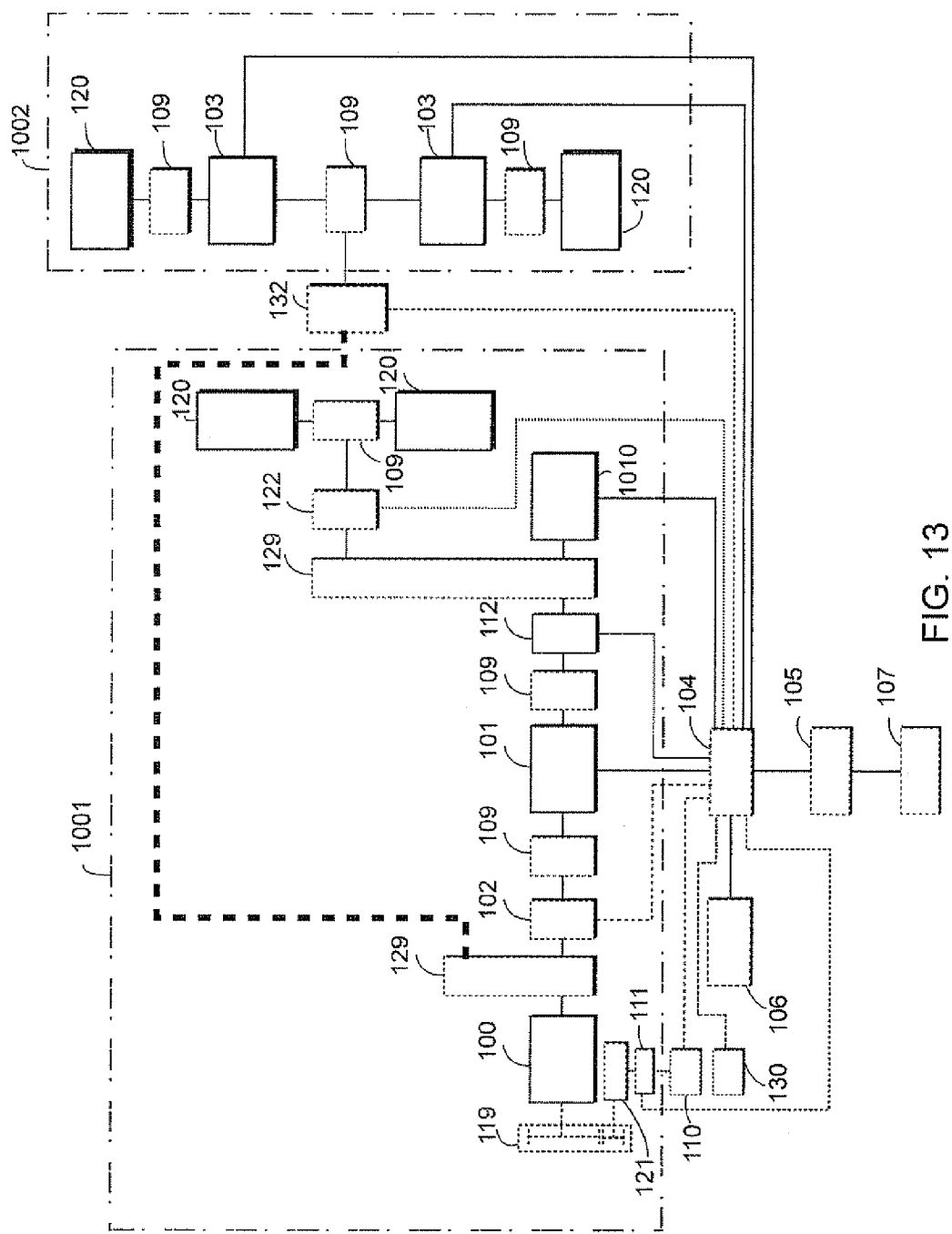
FIG. 13 is a block diagram of the twelfth preferred embodiment of a split serial-parallel hybrid dual-power drive system.

FIG. 13 shows the block diagram of the twelfth preferred embodiment of the split serial-parallel hybrid dual-power drive system of the present invention, essentially comprised of the first drive system 1001 and the second drive system 1002. In the first drive system 1001, the rotary part to output the rotational kinetic energy from the active rotational power source 100 is coupled to the optional transmission unit 129, the optional clutch 102, and the transmission unit 109 to drive the first dynamo-electrical unit 101 and the rotary part of the first dynamo-electrical unit 101 is coupled to the optional transmission unit 109 and the clutch 112, and further to the optional transmission unit 129 provided with multiple input and output terminals. The transmission unit 129 provided with multiple input and output terminals is coupled to the auxiliary dynamo-electrical unit 1010 for the differential transmission unit 109 coupled through the clutch 122, and both output terminals of the differential transmission unit 109 drive their respectively adapted loads 120. In the second drive system 1002, two or multiple second dynamo-electrical unit 103 serving as the power source for the second drive system 1002 drives the respectively adapted loads 120 through the respective operational transmission units 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 102 coupled to, the input end of the optional transmission unit 109 provided to or the rotary part of the first dynamo-electrical unit 101 driven by the first drive system 1001 is coupled to the input end of the clutch 132; meanwhile the output terminal of the clutch 132 is coupled to the input end of the differential transmission unit 109, and both output ends of the differential transmission unit 109 are respectively coupled to both rotary parts of the second dynamo-electrical units 103 serving as the power source for the second drive system 1002 for the control of the transmission status of the rotational kinetic energy between the first drive system 1001 and the second drive system 1002.

Figure 14:
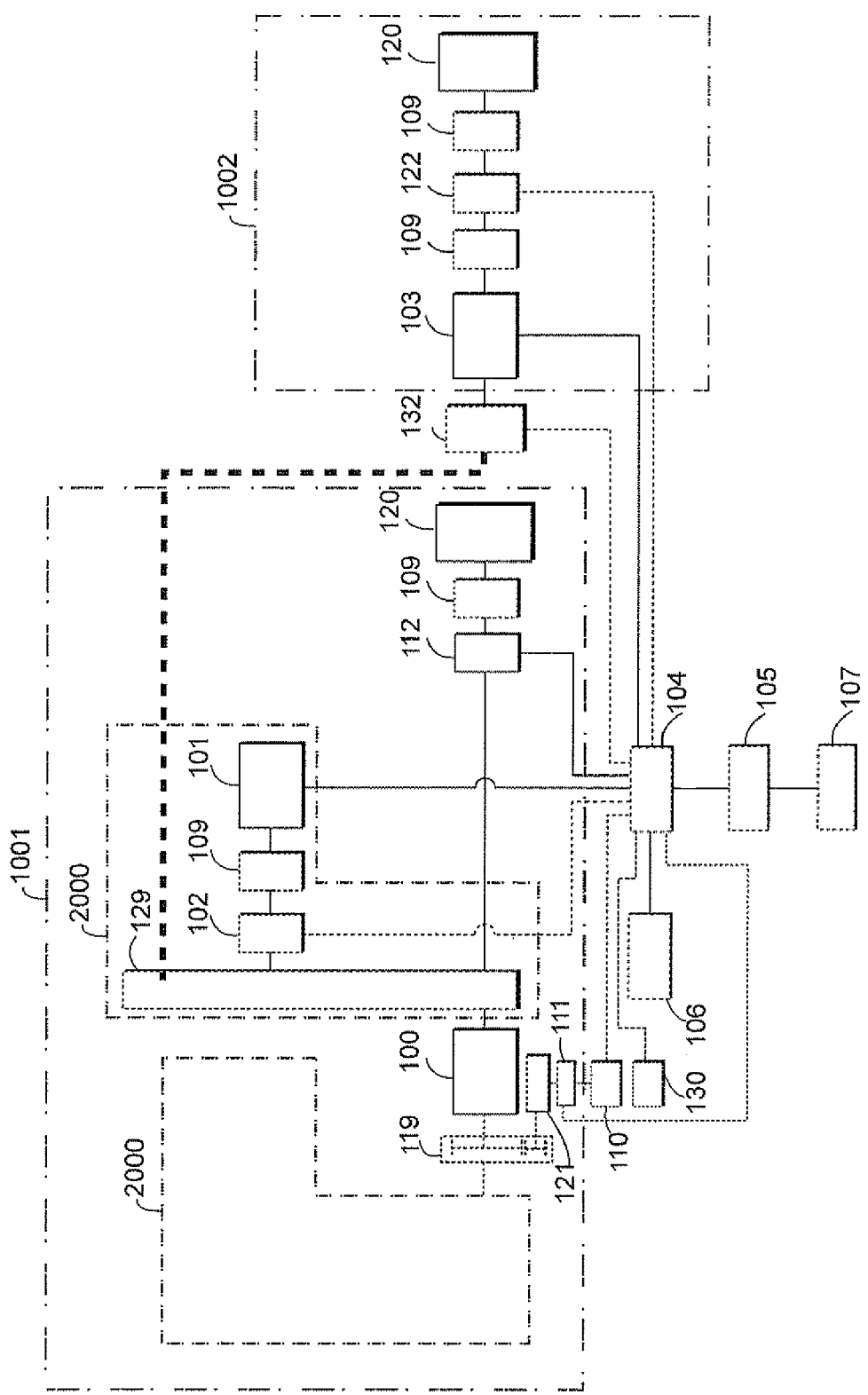
FIG. 14 is a block diagram of the thirteenth preferred embodiment of a split serial-parallel hybrid dual-power drive system.

FIG. 14 shows the block diagram of the thirteenth preferred embodiment of the split serial-parallel hybrid dual-power drive system of the present invention, essentially comprised of the first drive system 1001 and the second drive system 1002. In the first drive system 1001, the power generation unit 2000 is comprised of making the output terminal of the rotational kinetic energy of the active rotational power source 100 in the configuration of multiple output terminals either on the same side but not on the same shaft, not on the same side but on the same shaft, or neither on the same side nor on the same shaft for coupling with the optional transmission unit 129 and the optional clutch 102 to further couple to the first dynamo-electrical unit 101; and one of the multiple output terminals of the rotational kinetic energy from the active rotational power source 100 is coupled to the optional transmission unit 129, the optional clutch 112 and the optional transmission unit 109 to drive the adapted load 120 with the power generation unit 2000 to jointly constitute the first drive system 1001. In the second drive system, the second dynamo-electrical unit 103 serving as the power source for the second drive system 1002 drives the adapted load 120 through the optional clutch 122 and the optional transmission unit 109.

Accordingly, the control of the operation of the first drive system 1001 and the second drive system 1002 constitutes the split serial-parallel hybrid dual-power drive system.

Furthermore, as required, the output terminal of the rotational kinetic energy of the active rotational power source 100, the output terminal of the transmission unit 129 coupled to, the rotary part to output the rotational kinetic energy of the clutch 112 coupled to, the output terminal of the optional transmission unit 109 provided to the first drive system 1001, or the input end of the driven load 120 is coupled to the input end of the clutch 132; meanwhile the output terminal of the clutch 132 is coupled to the rotary part of the second dynamo-electrical unit 103 serving as the power source for the second drive system 1002, or the output terminal of the clutch 122 coupled to, or the output terminal of the optional transmission unit 109 provided to, or the input end of the load 120 driven by the second drive system 1002 for the control of the transmission status of the rotational kinetic energy between the first drive system 1001 and the second drive system 1002.

Figure 15:
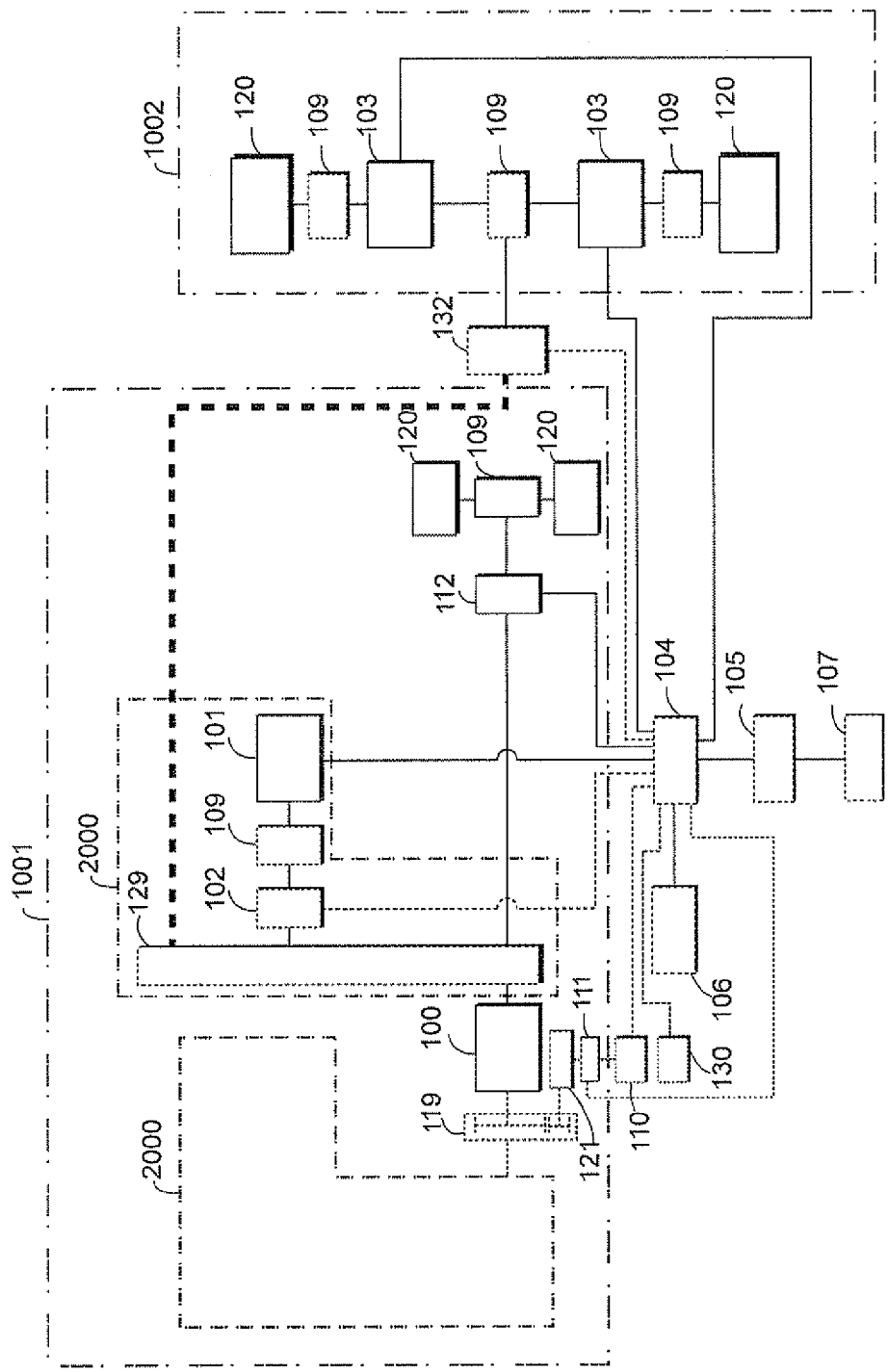
FIG. 15 is a block diagram of the fourteenth preferred embodiment of a split serial-parallel hybrid dual-power drive system.

FIG. 15 shows the block diagram of the fourteenth preferred embodiment of the split serial-parallel hybrid dual-power drive system of the present invention, essentially comprised of the first drive system 1001 and the second drive system 1002. In the first drive system 1001, the power generation unit 2000 is comprised of making the output terminal of the rotational kinetic energy of the active rotational power source 100 in the configuration of multiple output terminals either on the same side but not on the same shaft, not on the same side but on the same shaft, or neither on the same side nor on the same shaft for coupling with the optional transmission unit 129 and the optional clutch 102 to further couple to the first dynamo-electrical unit 101; and one of the output terminals of the rotational kinetic energy from the active rotational power source 100 is coupled to the optional transmission unit 129, the optional clutch 112 and the optional differential transmission unit 109 to respectively drive two loads 120 adapted to both output terminals of the differential transmission unit 109 with the power generation unit 2000 to jointly constitute the first drive system 1001. In the second drive system 1002, two or multiple second dynamo-electrical units 103 serving as the power source for the second drive system 1002 respectively drive the adapted loads 120 through the optional transmission units 109. By switching the clutch 132 to engage or disengage status to regulate the transmission of the rotational kinetic energy between the first drive system 1001 and the second drive system 1002 are regulated to perform those functions described in System Functions 1 through 80.

Furthermore, as required, the output terminal of the rotational kinetic energy of the active rotational power source 100, the output terminal of the transmission unit 129 coupled to, the rotary part to output the rotational kinetic energy of the clutch 112 coupled to the first drive system 1001, or the output terminal of the differential transmission unit 109 is coupled to the input end of the clutch 132; meanwhile the output terminal of the clutch 132 is coupled to the input end of the differential transmission unit 109 provided in the second drive system 1002 to respectively drive two rotary parts of both second dynamo-electrical units 103 serving as the power source for the second drive system 1002 for the control of the transmission status of the rotational kinetic energy between the first drive system 1001 and the second drive system 1002.

Figure 16:
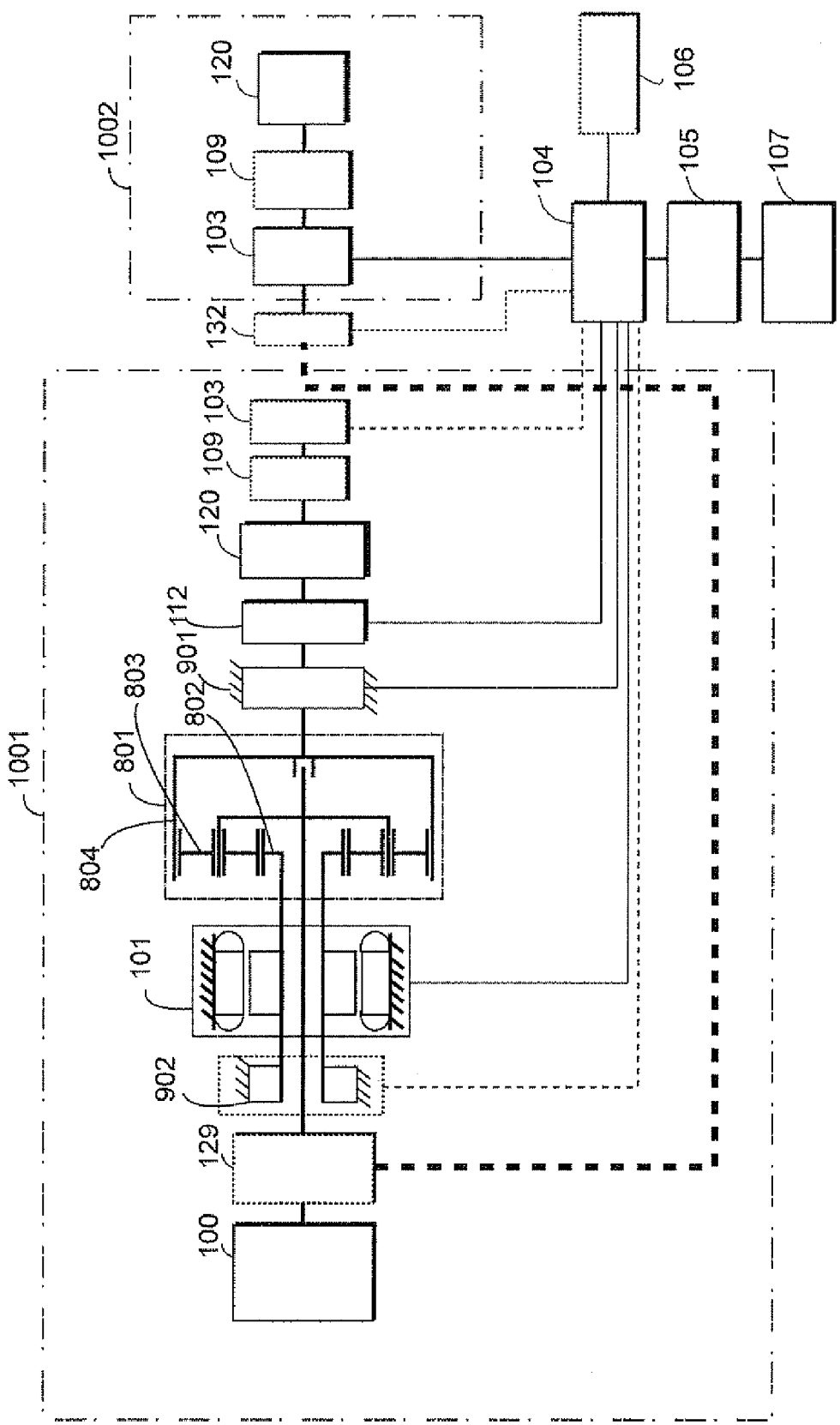
FIG. 16 is a block diagram of the fifteenth preferred embodiment of a split serial-parallel hybrid dual-power drive system.
Figure 17:
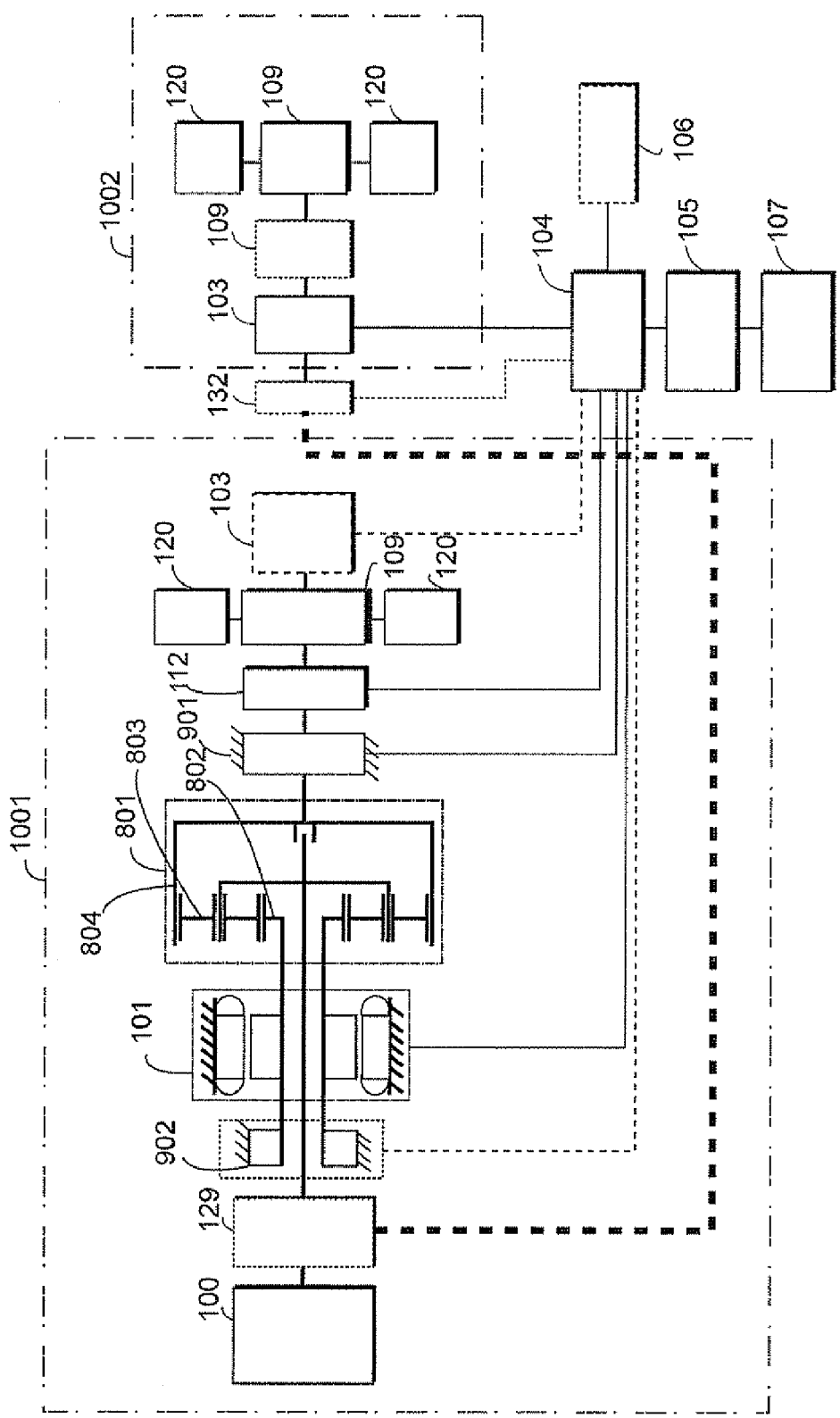
FIG. 17 is a block diagram of the sixteenth preferred embodiment of a split serial-parallel hybrid dual-power drive system.

FIGS. 16 and 17 respectively illustrate the block diagrams of a fifteenth and a sixteenth preferred embodiments of the split serial-parallel hybrid dual-power drive system of the present invention. In both preferred embodiments, each is essentially comprised of the first drive system 1001 and the second drive system 1002. In the first drive system 1001, the rotary part applied to output the rotational kinetic energy of the active rotational power source 100 is coupled to the optional transmission unit 129 and further coupled to the planet gear 803 of the planetary gear set 801. The rotary part of the first dynamo-electrical unit 101 is coupled to the sun gear 802 of the planetary gear set 801 while the relative motion between the rotary part and the stationary part of the first dynamo-electrical unit 101 is controlled by the drive control unit 104 to operates as a motor to output the rotational kinetic energy or as a generator to produce damping while generating power, with the effect of damping to transfer the rotational kinetic energy from the active rotational power source 100 to the external gear 804; or alternatively, by the regulating of the drive control unit 104, the stationary part and the rotary part are locked by electro-magnetic force, the function of electro-magnetic lock could be altered by the optional brake 902 with the rotary part of the first dynamo-electrical unit 101 coupled to the rotary part of the brake 902 and the stationary side of the brake 902 locked to the vehicle frame or the stationary part of the first dynamo-electrical unit 101; accordingly, the first dynamo-electrical unit 101 is in locked status allowing the rotational kinetic energy from the active rotational power source 100 transferred to the external gear 804.

Furthermore, the brake 901 is required for the active rotational power source 100 to drive the first dynamo-electrical unit 101 to operate as a generator. With The external gear 804 of the planetary gear set 801 coupled to the input end of the clutch 112 and the rotary part of the brake 901; the stationary part of the brake 901 is locked to the frame; and the other terminal of the clutch 112 might directly output to drive the load 120 or through the optional transmission unit 109 as illustrated in FIG. 16 or the other terminal of the clutch 112 might be coupled to the input terminal of the differential transmission unit 109 as illustrated in FIG. 17. Both differential output terminals of the differential transmission unit 109 are provided to drive their respective loads 120 to constitute the first drive system 1001.

The first drive system 1001 may or may not be provided with the second dynamo-electrical unit 103 depending on requirement. While the second dynamo-electrical unit 103 is provided to the first drive system 1001, the second dynamo-electrical unit 103 illustrated in FIG. 16 may be coupled directly or through the optional transmission unit 109 to the load 120; or coupled to the input terminal of the differential transmission unit 109 driven by the clutch 112, the clutch 112 as illustrated in FIG. 17. Wherein, the clutch 112 and the brake 901 may be separately provided or arranged in common structure.

The second drive system 1002 adapt the second dynamo-electrical unit 103 as the power source to couple to the optional transmission unit 109 or any other transmission device for driving one or multiple load 120, or as required, the rotary part of the second dynamo-electrical unit 103 is coupled to the input terminal of the differential transmission unit 109, and both differential output terminals of the differential transmission unit 109 are provided to drive respectively adapted loads 120 to constitute the second drive system 1002. By switching the clutch 132 to engage or disengage status for regulating the transmission of the rotational kinetic energy between the first drive system 1001 and the second drive system 1002 makes the system to perform those functions described in System Functions 1 through 80.

The primary functions of the preferred embodiments illustrated in FIGS. 16 and 17 include that while the brake 901 is closed and the clutch 112 is disengaged, the external gear 804 is locked to make the active rotational power source 100 to solely drive the sun gear 802 through the planet gear 803 thus to drive the first dynamo-electrical unit 101 to operate as a generator for driving the second dynamo-electrical unit 103 optionally adapted to the first drive system 1001, or for driving the second dynamo-electrical unit 103 adapted to the second drive system 1002, or driving both second dynamo-electrical units 103 adapted to the first drive system 1001 and the second drive system 1002 to provide the capability of generating the serial hybrid power output and/or recharge the rechargeable device 106.

Alternatively, the power generated from the first dynamo-electrical unit 101 and the rechargeable device 106 jointly drive the second dynamo-electrical unit 103 in the first drive system 1001, or the second dynamo-electrical unit 103 in the second drive system 1002 or both of the second dynamo-electrical units 103 simultaneously.

The second dynamo-electrical unit 103 in the first drive system 1001 and in the second drive system 1002 drive the load 120 jointly by utilizing the rotational kinetic energy from the active rotational power source 100 with the power from the rechargeable device 106 when the clutch 112 is engaged.

When the clutch 112 is disengaged and the first dynamo-electrical unit 101 driven by the active rotational power source 100 operates as a generator, under the control of the drive control unit 104 the second dynamo-electrical unit 103 operates in the serial hybrid power transmission mode by utilizing the power generated from the first dynamo-electrical unit 101.

Alternatively, the power from the rechargeable device 106 regulated by the drive control unit 104 solely drives the second dynamo-electrical unit 103 to operate as a motor; or the power generated from the first dynamo-electrical unit 101 and that from the rechargeable device 106 jointly drive the second dynamo-electrical unit 103 to operate as a motor under the control of the drive control unit 104.

Furthermore, the regenerated power of feedback braking regeneration provided by the second dynamo-electrical unit 103 recharges the rechargeable device 106 or supply power to other electrical power driven load.

The operation between the rotary part of the optionally adapted second dynamo-electrical unit 103 of the first drive system 1001 and the load 120 may either directly or through the optional transmission unit 109 or other transmission device to drive one or multiple load 120; or as required, the rotary part of the second dynamo-electrical unit 103 is coupled to the input end of the differential transmission unit 109 for both differential output ends of the differential transmission unit 109 to drive their respectively adapted loads 120. Accordingly, the adapted load 120 is driven by the structure and operation of the first drive system 1001 as described above.

In addition, the rotational kinetic energy output terminal of the active rotational power source 100 in the first drive system 1001, or the output terminal of the transmission unit 129 coupled to the power source 100 is coupled to the input terminal of the clutch 132. The output terminal of the clutch 132 is coupled to the rotary part of the second dynamo-electrical unit 103 serving as the power source for the second drive system 1002, or to the output terminal of the optional transmission unit 109 coupled to the second drive system 1002 as illustrated in FIG. 16; or coupled to the rotary part of the second dynamo-electrical unit 103 serving as the power source for the second drive system 1002 as illustrated in FIG. 17, or to the input terminal of the differential transmission unit 109 of multiple loads 120 optionally adapted to the second drive system 1002 for the control of the transmission status of the rotational kinetic energy between the first drive system 1001 and the second drive system 1002.

Figure 18:
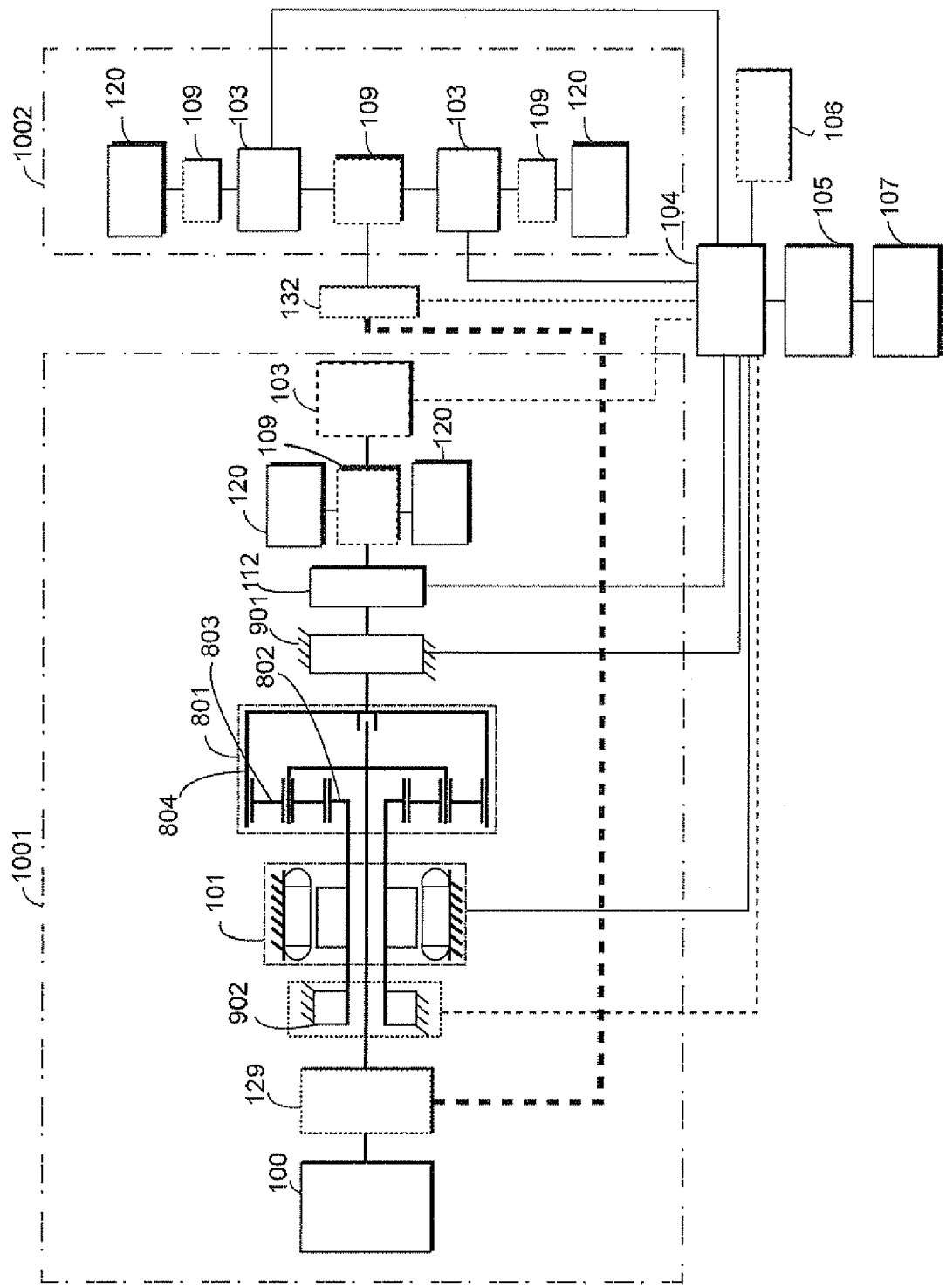
FIG. 18 is a block diagram of the seventeenth preferred embodiment of a split serial-parallel hybrid dual-power drive system.

FIG. 18 shows a block diagram of the seventeenth preferred embodiment of the split serial-parallel hybrid dual-power drive system of the present invention. The preferred embodiment is comprised of the first drive system 1001 and the second drive system 1002. In the first drive system 1001, the rotary part applied to output the rotational kinetic energy from the active rotational power source 100 is coupled to the optional transmission unit 129 and the planet gear 803 of the planetary gear set 801; and the rotary part of the first dynamo-electrical unit 101 is coupled to the sun gear 802 of the planetary gear set 801. Under the regulation of the drive control unit 104, the operation between the rotary part and the stationary part of the first dynamo-electrical unit 101 could optionally providing the functions as a motor to output the rotational kinetic energy, or to operate as a generator to produce damping while generating power output, with the effect of the damping, the rotational kinetic energy from the active rotational power source 100 is routed to the external gear 804. Alternatively, with the regulation of the drive control unit 104, the relative motion between the stationary part and the rotary part of the first dynamo-electrical unit 101 is locked by electro-magnetic force. As required, the electro-magnetic lockup function may be replaced by the dynamic brake 902 with the rotary part of the first dynamo-electrical unit 101 coupled to the rotary part of the brake 902 and the stationary part of the brake 902 is locked to the frame or to the stationary part of the first dynamo-electrical unit 101. Accordingly, the first dynamo-electrical unit 101 is locked up, which makes the rotational kinetic energy from the active rotational power source 100 to be routed through the external gear 804.

The brake 901 is required for the active rotational power source 100 to drive the first dynamo-electrical unit 101 to operate as a generator. The external gear 804 of the planetary gear set 801 is coupled to the input terminal of the clutch 112 and coupled to the rotary part of the brake 901; the stationary part of the brake 901 is locked to the frame; and the other terminal of the clutch 112 may directly drive the load 120 or through the optional transmission unit 109.

The first drive system 1001 may or may not be provided with the second dynamo-electrical unit 103. If the second dynamo-electrical unit 103 is provided to the first drive system 1001, the second dynamo-electrical unit 103 may coupled to the load 120 directly or through the optional transmission unit 109; or coupled to the input terminal of the differential transmission unit 109 driven by the clutch 112, the clutch 112 as illustrated in FIG. 17. Wherein, the clutch 112 and the brake 901 may be separately provided or arranged in common structure.

The second drive system 1002 equipped with multiple second dynamo-electrical units 103 as the power source to respectively coupled to the optional transmission unit 109 or any other transmission device to drive respectively adapted loads 120 to constitute the second drive system 1002.

Alternatively, by switching the clutch 132 to engage or disengage status for regulating the transmission of the rotational kinetic energy between the first drive system 1001 and the second drive system 1002 makes the system to perform those functions described in System Functions 1 through 80.

The primary operation functions of the preferred embodiments illustrated in FIG. 18 include that when the brake 901 is closed and the clutch 112 is disengaged, the external gear 804 is locked to make the active rotational power source 100 to solely drive the sun gear 802 through the planet gear 803 thus to drive the first dynamo-electrical unit 101 to operate as a generator for driving the second dynamo-electrical unit 103 optionally adapted to the first drive system 1001, or for driving the second dynamo-electrical unit 103 adapted to the second drive system 1002, or driving both second dynamo-electrical units 103 adapted to the first drive system 1001 and the second drive system 1002 to provide the capability of generating the serial hybrid power output and/or recharge the rechargeable device 106.

Alternatively, the power generated from the first dynamo-electrical unit 101 and from the rechargeable device 106 jointly drive the second dynamo-electrical unit 103 in the first drive system 1001, or the second dynamo-electrical unit 103 in the second drive system 1002 or both of the second dynamo-electrical units 103 simultaneously.

The second dynamo-electrical unit 103 in the first drive system 1001 and that in the second drive system 1002 drive the load 120 jointly by utilizing the rotational kinetic energy from the active rotational power source 100 with the power from the rechargeable device 106 when the clutch 112 is engaged.

When the clutch 112 is disengaged, the brake 901 is closed, the brake 902 is disengaged, and the first dynamo-electrical unit 101 is driven by the active rotational power source 100 through the planet gear set 801 to operate as a generator, under the control of the drive control unit 104 the second dynamo-electrical unit 103 operates in the serial hybrid power transmission mode by utilizing the power generated from the first dynamo-electrical unit 101.

Alternatively, the power from the rechargeable device 106 regulated by the drive control unit 104 solely drives the second dynamo-electrical unit 103 to operate as a motor; or the power generated from the first dynamo-electrical unit 101 and that from the rechargeable device 106 jointly drive the second dynamo-electrical unit 103 to operate as a motor under the control of the drive control unit 104.

Furthermore, the regenerated power of feedback braking regeneration provided by the second dynamo-electrical unit 103 recharges the rechargeable device 106 or supply power to other electrical power driven load.

The operation between the rotary part of the second dynamo-electrical unit 103 optionally adapted to the first drive system 1001 and the load 120 may either directly or through the optional transmission unit 109 or other transmission device drive one or multiple load 120; or as required, the rotary part of the second dynamo-electrical unit 103 is coupled to the input terminal of the differential transmission unit 109 for both differential output terminals of the differential transmission unit 109 to drive their respectively adapted loads 120. Accordingly, the adapted load 120 is driven by the structure and operation of the first drive system 1001 as described above.

In addition, the rotational kinetic energy output terminal of the active rotational power source 100 in the first drive system 1001, or the output terminal of the transmission unit 129 coupled to the power source 100 is coupled to the input terminal of the clutch 132. The output terminal of the clutch 132 is coupled to the input terminal of the differential transmission unit 109 optionally provided to the second drive system 1002 for the control of the transmission status of the rotational kinetic energy between the first drive system 1001 and the second drive system 1002.

Figure 19:
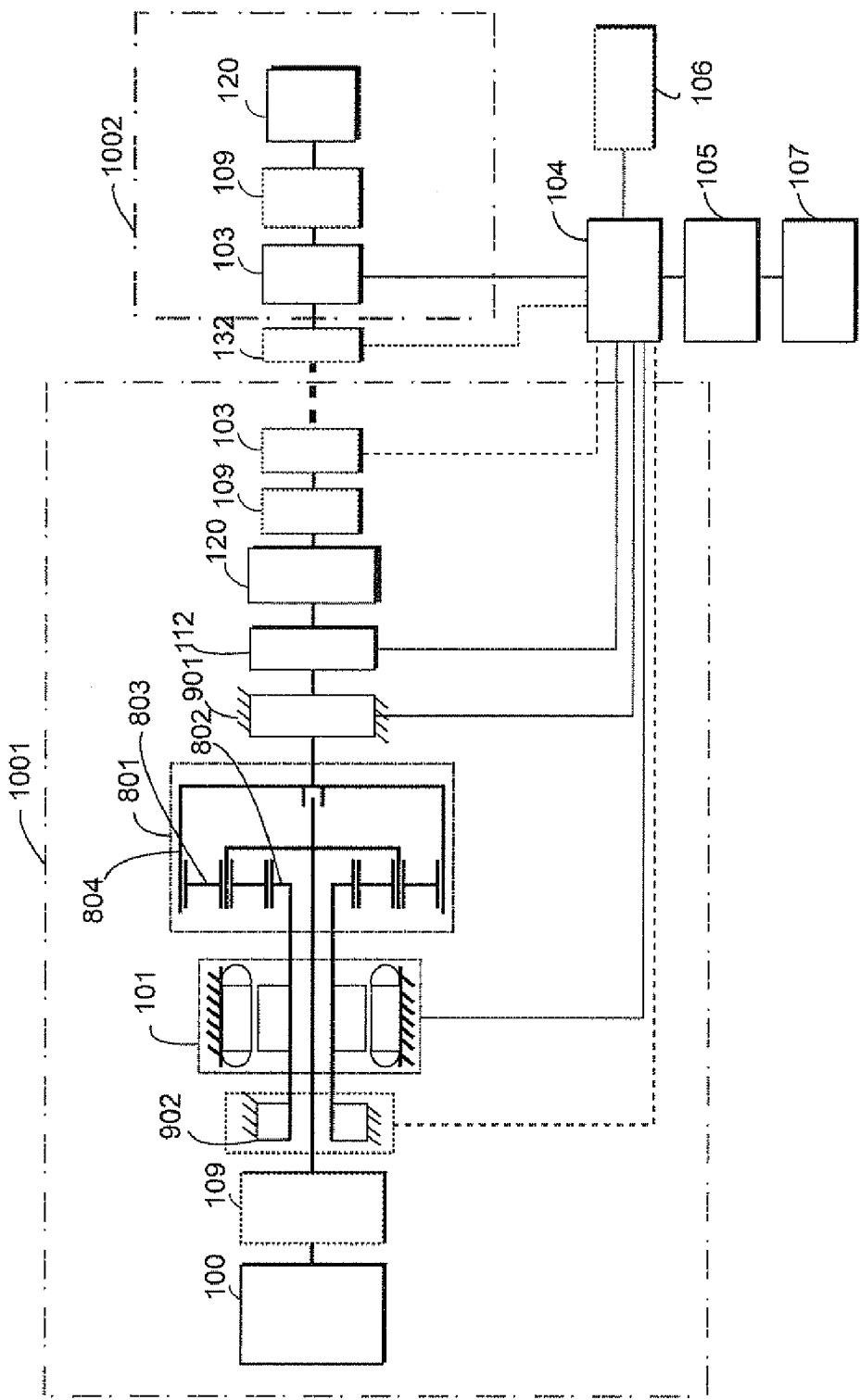
FIG. 19 is a block diagram of the eighteenth preferred embodiment of a split serial-parallel hybrid dual-power drive system.
Figure 20:
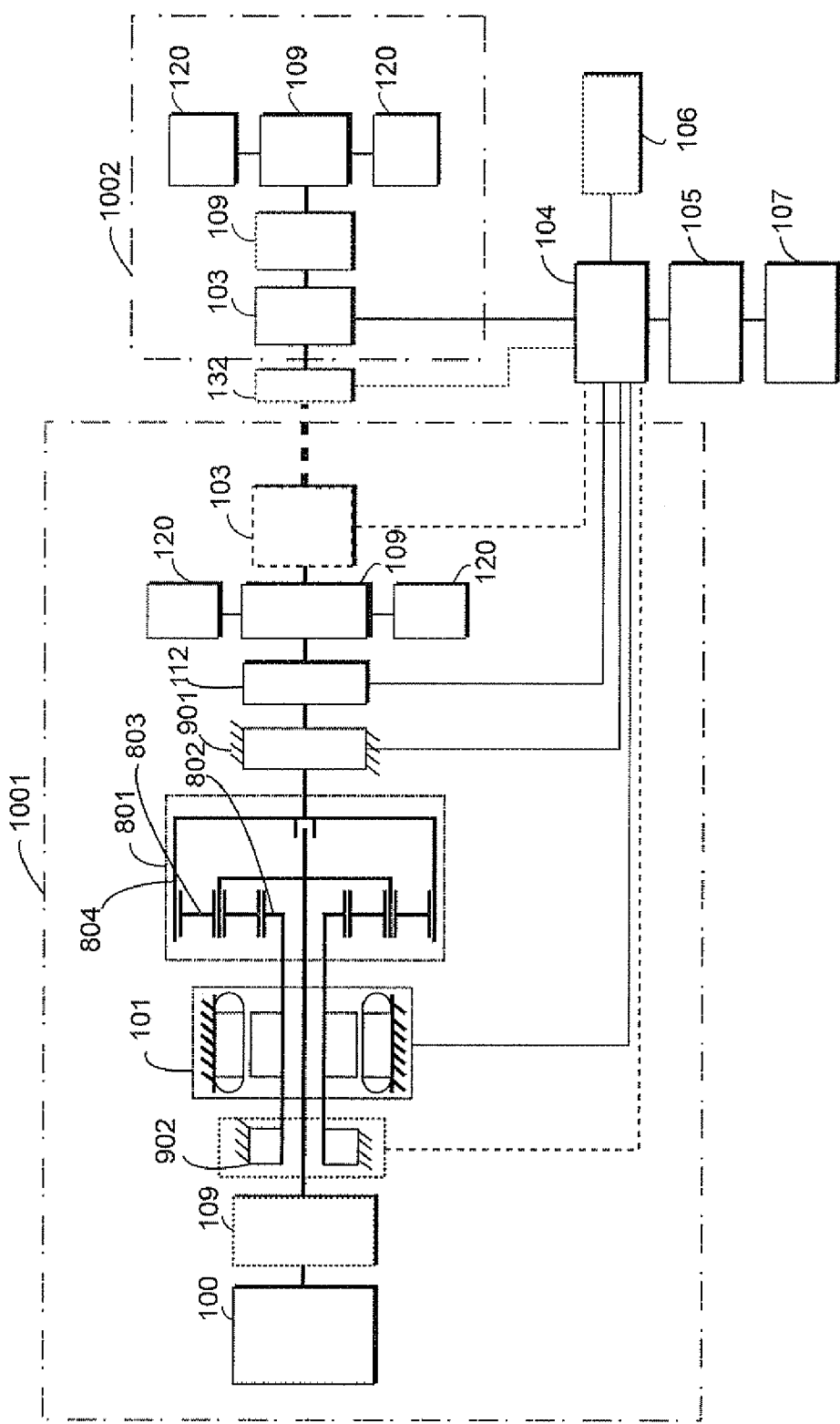
FIG. 20 is a block diagram of the nineteenth preferred embodiment of a split serial-parallel hybrid dual-power drive system.

FIG. 19 shows a block diagram of the eighteenth preferred embodiment of the split serial-parallel hybrid dual-power drive system of the present invention. The construction of the first drive system 1001 and the second drive system 1002 for the preferred embodiment illustrated in FIG. 19 is identical with that given in FIG. 16. FIG. 20 shows a block diagram of the nineteenth preferred embodiment of the split serial-parallel hybrid dual-power drive system of the present invention. The construction of the first drive system 1001 and the second drive system 1002 for the preferred embodiment illustrated in FIG. 20 is identical with that given in FIG. 17. However, the input terminal of the clutch 132 respectively illustrated in FIGS. 19 and 20 is coupled to the rotary part of the second dynamo-electrical unit 103 adapted to the first drive system 1001, or to the input terminal or output terminal of the transmission unit 109 adapted to the second dynamo-electrical unit 103; and the output terminal of the clutch 132 is coupled to the rotary part of the second dynamo-electrical unit 103 serving as the power source for the second drive system 1002, or to the transmission unit 109 optionally adapted to the rotary part of the second dynamo-electrical unit 103, or to the input terminal of the differential transmission unit 109. The clutch 132 may be optionally provided to control the transmission status between the first drive system 1001 and the second drive system 1002 while the transmission unit 109 may be optionally provided to the output terminal of the active rotational power source 100 to drive the planet gear 803 of the planetary gear set 801.

Figure 21:
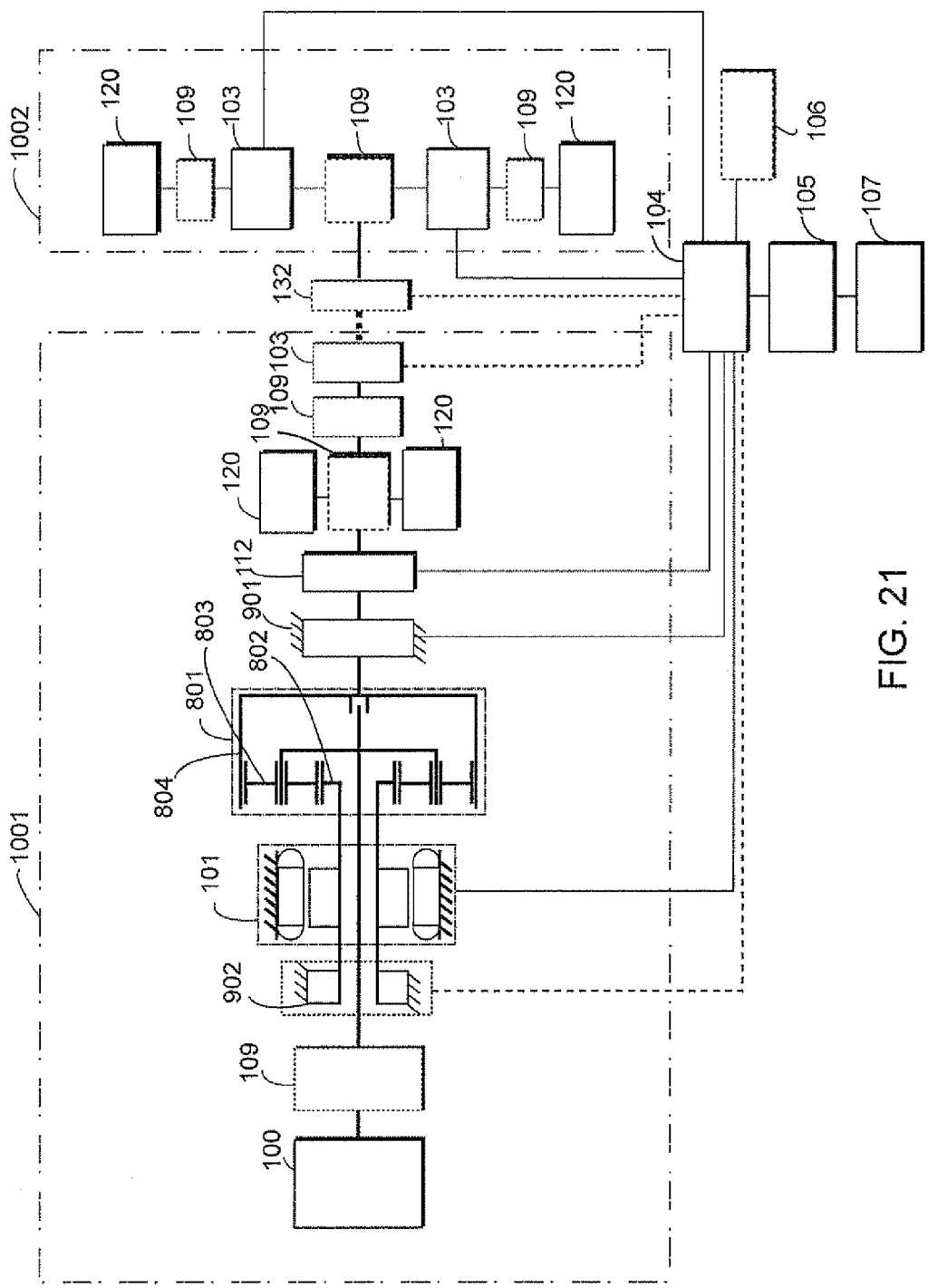
FIG. 21 is a block diagram of the twentieth preferred embodiment of a split serial-parallel hybrid dual-power drive system.

FIG. 21 shows a block diagram of the twentieth preferred embodiment of the split serial-parallel hybrid dual-power drive system of the present invention. The construction of the first drive system 1001 and the second drive system 1002 for the preferred embodiment illustrated in FIG. 21 is identical with that given in FIG. 18. However, the input terminal of the clutch 132 as illustrated in FIG. 21 is coupled to the rotary part of the second dynamo-electrical unit 103 adapted to the first drive system 1001, or to the input terminal or output terminal of the transmission unit 109 adapted to the second dynamo-electrical unit 103 while the output terminal of the clutch 132 is coupled to the input terminal of the differential transmission unit 109 optionally provided to the second drive system 1002 with both output terminals of the differential transmission unit 109 respectively coupled to the rotary parts of multiple second dynamo-electrical units 103 serving as the power source for the second drive system 1002. The clutch 132 may be optionally provided to control the transmission status of the rotational kinetic energy between the first drive system 1001 and the second drive system 1002 while transmission unit 109 may be optionally provided to the output terminal of the active rotational power source 100 to drive the planet gear 803 of the planetary gear set 801.

The differential function of the planetary gear set adapted to the first drive system 1001 as respectively illustrated in FIGS. 16, 17, 18, 19, 20, and 21 may be replaced by the rotational gear set 1030 working on the same principles but provided in different structure.

Figure 22:
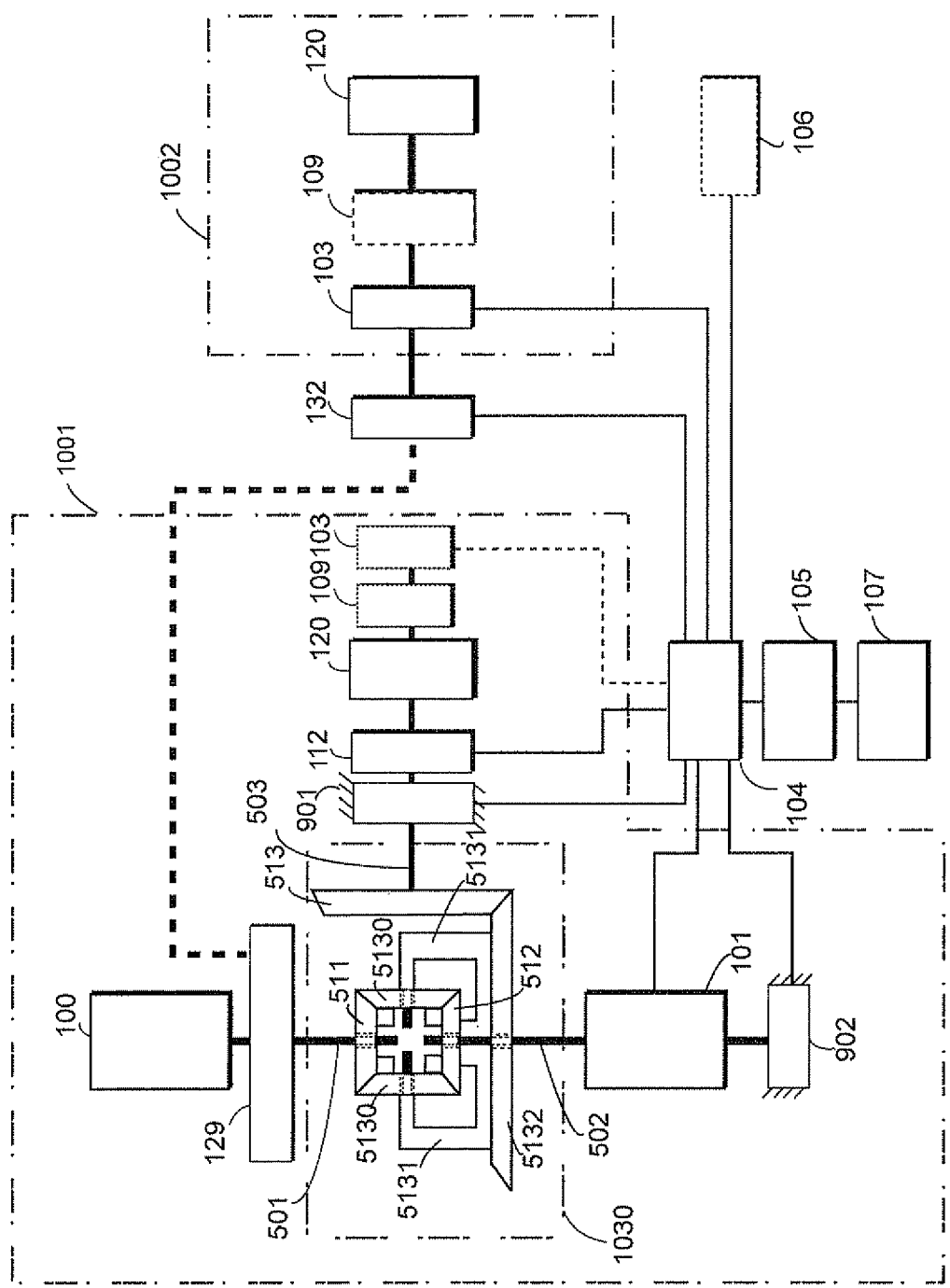
FIG. 22 is a block diagram of the twenty-first preferred embodiment of a split serial-parallel hybrid dual-power drive system with a planet gear set illustrated in FIG. 16 replaced by a differential gear set.
Figure 23:
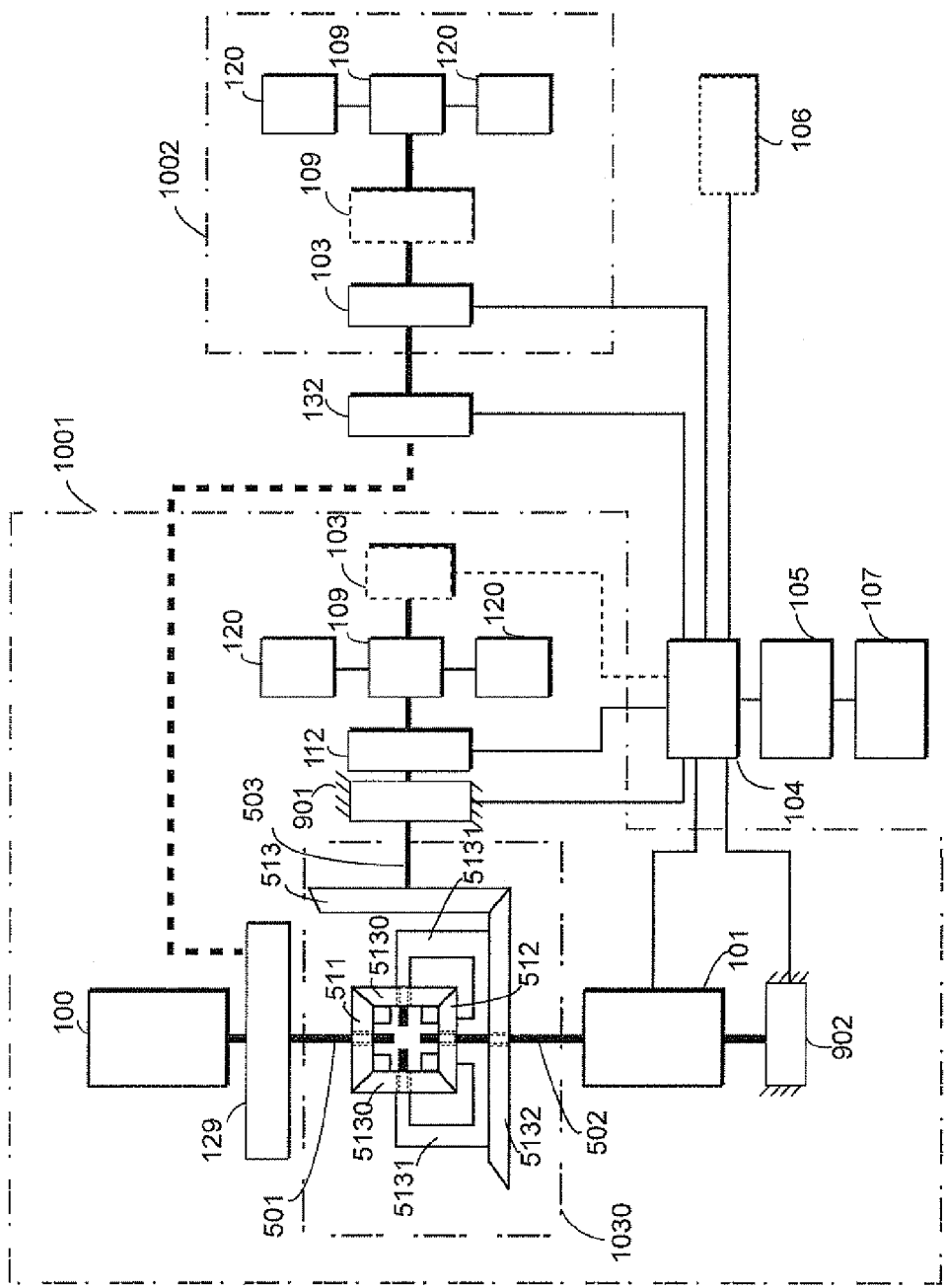
FIG. 23 is a block diagram of the twenty-second preferred embodiment of a split serial-parallel hybrid dual-power drive system with a planet gear set illustrated in FIG. 17 replaced by a differential gear set.

FIG. 22 shows the twenty-first preferred embodiment of the present invention with the differential gear set to replace the separation type of the planet gear set as illustrated in FIG. 16. FIG. 23 shows the twenty-second preferred embodiment of the present invention with the differential gear set to replace the separation type of the planet gear set as illustrated in FIG. 17. In both preferred embodiments respectively illustrated in FIGS. 22 and 23, the rotational gear set 1030 substitutes the planetary gear set 801. Among the three input and output terminals of the rotational gear set 1030, the first input and output terminal 501 is coupled to the first input and output gear set 511 and to the input and output terminal of the rotational kinetic energy from the active rotational power source 100, or to the optionally provided transmission unit 129 while the transmission unit 129 is driven by the active rotational power source 100. The second input and output terminal 502 is coupled to the first dynamo-electrical unit 101, the brake 902 and the second input and output gear set 512. Both of the first and the second input and output gear sets 511, 512 are coupled to the differential gear set 5130 for a rotary arm 5131 to draw the differential output gear set 5132 and the third input and output gear set 513 for the third input and output gear set 513 to drive the third input and output terminal 503 and the rotary part of the brake 901 and the clutch 112 coupled to the third input and output terminal 503. As illustrated in FIG. 22, the other terminal of the clutch 112 might drives the load 120 directly or through the optionally provided transmission unit 109. Or as illustrated in FIG. 23, the other terminal of the clutch 112 is coupled to the input terminal of the differential transmission unit 109 for both differential output terminals of the differential transmission unit 109 to drive their respectively adapted loads 120 to constitute the first drive system 1001.

The first drive system 1001 may be optionally provided with a second dynamo-electrical unit 103. If the second dynamo-electrical unit 103 is deployed, that illustrated in FIG. 22 may coupled to the load 120 directly or through the optionally provided transmission unit 109; and that illustrated in FIG. 23 may coupled to the input terminal of the differential transmission unit 109 driven by the clutch 112.

The second drive system 1002 with the second dynamo-electrical unit 103 as the power source for the second drive system 1002 is coupled to the optionally provided transmission unit 109 or any other transmission device to drive one or multiple load 120; or alternatively, the rotary part of the second dynamo-electrical unit 103 is coupled to the input terminal of the differential transmission unit 109 for both differential output terminals of the differential transmission unit 109 to drive their respectively adapted loads 120 to constitute the second drive system 1002.

Alternatively, the transmission status of the rotational kinetic energy between the first drive system 1001 and the second drive system 1002 is controlled by engaging or disengaging the clutch 132 to provide those functions described in System Functions 1 through 80.

The primary operating functions of both preferred embodiments illustrated in FIGS. 22 and 23 include that while the clutch 112 is disengaged, the brake 901 is closed and the brake 902 is disengaged, the active rotational power source 100 drives the first dynamo-electrical unit 101 through the rotational gear set 1030 to operate as a generator, through the control of the drive control unit 104, the power generated by the first dynamo-electrical unit 101 is applied to drive the second dynamo-electrical unit 103 in the first drive system 1001, or that in the second drive system 1002, or both at the same time to operate as a motor for driving the load to provide the functions of a serial hybrid power transmission.

If the rechargeable device 106 is provided, under the control of the drive control unit 104, the second dynamo-electrical unit 103 operating as a motor to drive the load 120 by receiving the power from the first dynamo-electrical unit 101 and the rechargeable device 106.

Alternatively, under the control of the drive control unit 104, the second dynamo-electrical unit 103 operates as a motor to drive the load 120 by receiving the power from the rechargeable device 106.

While the brake 901 is disengaged, the brake 902 is engaged and the clutch 112 is also engaged, under the control of the drive control unit 104, the second dynamo-electrical unit 103 operating as a motor to drive the load 120 jointly with the rotational kinetic energy from the active rotational power source 100 by receiving the power from the rechargeable device 106.

When the brake 901 is disengaged, the brake 902 is closed up, and the clutch 112 is also closed up, the rotational kinetic energy from the active rotational power source 100 drives the load 120.

The second dynamo-electrical unit 103 performs power regeneration by recycling the kinetics to recharge the rechargeable device 106 or supply power to any other electrical power driven load 130.

In addition, as required, the rotational kinetic energy output terminal of the active rotational power source 100 in the first drive system 1001, or the output terminal of the transmission unit 129 coupled to the active rotational power source 100 is coupled to the input terminal of the clutch 132 while the output terminal of the clutch 132 is coupled to the rotary part of the second dynamo-electrical unit 103 as the power source of the second drive system 1002, or to the output terminal of the optionally provided transmission unit 109 as illustrated in FIG. 22, or coupled to the rotary part of the second dynamo-electrical unit 103 of the power source of the second drive system 1002, or to the input terminal of the differential transmission unit 109 of multiple loads 120 optionally provided to the second drive system 1002 as illustrated in FIG. 23 for the control of the transmission status of the rotational kinetic energy between the first drive system 1001 and the second drive system 1002.

Figure 24:
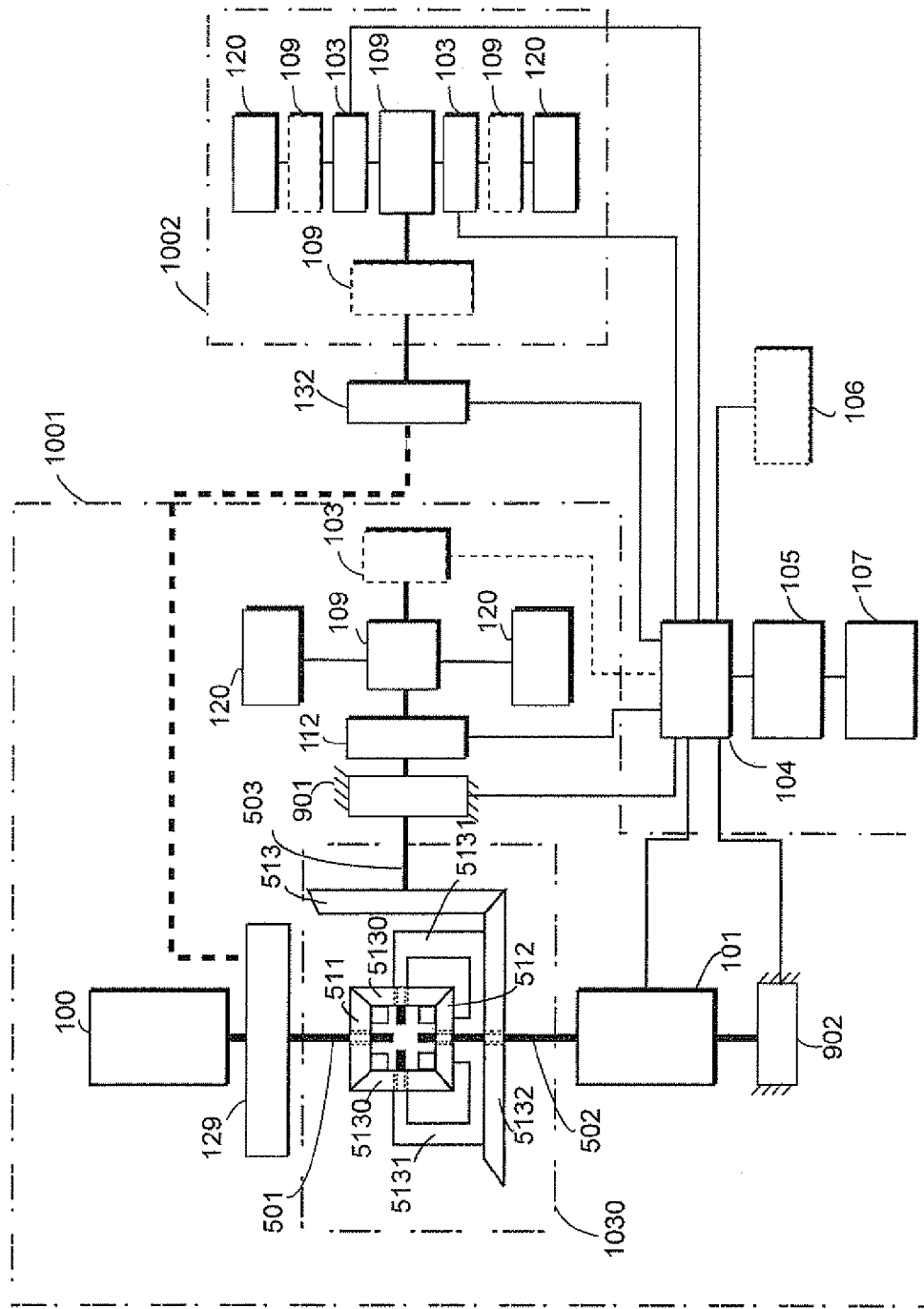
FIG. 24 is a block diagram of the twenty-third preferred embodiment of a split serial-parallel hybrid dual-power drive system with a planet gear set illustrated in FIG. 18 replaced by a differential gear set.

FIG. 24 shows the twenty-third preferred embodiment of the present invention with the differential gear set to replace the separation type of the planetary gear set as illustrated in FIG. 18. Wherein, the rotational gear set 1030 substitutes the planet gear set 801. Among the three input and output terminals of the rotational gear set 1030, the first input and output terminal 501 is coupled to the first input and output gear set 511, and to the input and output terminal of the rotational kinetic energy from the active rotational power source 100, or to the optionally provided transmission unit 129 while the transmission unit 129 is driven by the active rotational power source 100. The second input and output terminal 502 is coupled to the first dynamo-electrical unit 101, the brake 902 and the second input and output gear set 512. Both of the first and the second input and output gear sets 511, 512 are coupled to the differential gear set 5130 for a rotary arm 5131 to draw the differential output gear set 5132 and the third input and output gear set 513 for the third input and output gear set 513 to drive the third input and output terminal 503 and the rotary part of the brake 901 and the clutch 112 coupled to the third input and output terminal 503. The other terminal of the clutch 112 is coupled to the input terminal of the differential transmission unit 109 with both differential output terminals of the differential transmission unit 109 to drive their respectively adapted loads 120 to constitute the first drive system 1001. The first drive system 1001 may be optionally provided with a second dynamo-electrical unit 103. If the second dynamo-electrical unit 103 is deployed, it may be coupled to the clutch 112 or to the input of the differential transmission unit 109 driven by the clutch 112.

Each of the multiple second dynamo-electrical units 103 serving as the power source for the second drive system 1002 is coupled to the optionally provided transmission unit 109 or any other transmission device to drive one or multiple load 120 to constitute the second drive system 1002.

Alternatively, the transmission status of the rotational kinetic energy between the first drive system 1001 and the second drive system 1002 is controlled by engage or disengage the clutch 132 to provide those functions described in System Functions 1 through 80.

The primary operation functions of both preferred embodiments illustrated in FIG. 24 include that when the clutch 112 is disengaged, the brake 901 is closed and the brake 902 is disengaged, the active rotational power source 100 drives through the rotational gear set 1030 the first dynamo-electrical unit 101 to operate as a generator; and either or both of the second dynamo-electrical unit 103 in the first drive system 1001 and that in the second drive system 1002 receives the power generated from the first dynamo-electrical unit 101 to operate as a motor as controlled by the drive control unit 104 to drive the load and provide those functions of the series combine power.

If the rechargeable device 106 is provided, the second dynamo-electrical unit 103 by accepting the power from the first dynamo-electrical unit 101 and the rechargeable device 106 operates as a motor to drive the load 120 through the control by the drive control unit 104; or the second dynamo-electrical unit 103 by receiving the power from the rechargeable device 106 operates as a motor to drive the load 120 through the control by the drive control unit 104.

When the brake 901 is disengaged, the brake 902 is closed up and the clutch 112 is also closed up, the second dynamo-electrical unit 103 by accepting the power from the rechargeable device 106 operates as a motor to jointly drive the load 120 through the control by the drive control unit 104 and the rotational kinetic energy from the active rotational power source 100.

When the brake 901 is disengaged, the brake 902 is closed up, and the clutch 112 is also closed up, the rotational kinetic energy from the active rotational power source 100 drives the load 120.

The second dynamo-electrical unit 103 executes power regeneration by reclaiming the kinetics to recharge the rechargeable device 106 or supply power to any other electrical power driven load 130.

In addition, as required, the rotational kinetic energy output terminal of the active rotational power source 100 in the first drive system 1001, or the output terminal of the transmission unit 129 coupled to the first drive system 1001 is coupled to the input terminal of the clutch 132 while the output terminal of the clutch 132 is coupled to the input of the differential transmission unit 109 of multiple loads 120 optionally provided to the second drive system 1002 for the control of the transmission status of the rotational kinetic energy between the first drive system 1001 and the second drive system 1002.

Figure 25:
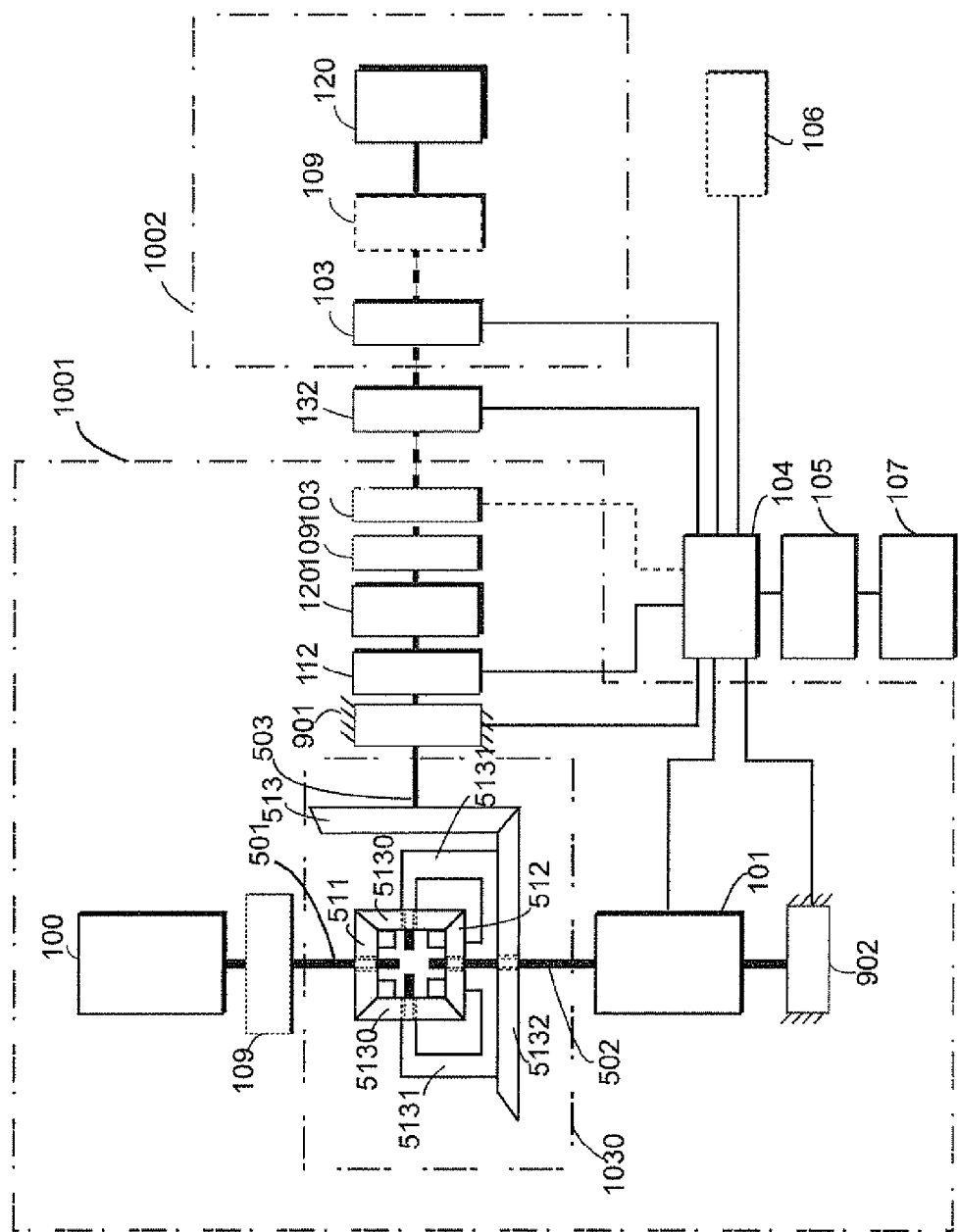
FIG. 25 is a block diagram of the twenty-fourth preferred embodiment of a split serial-parallel hybrid dual-power drive system with a planet gear set illustrated in FIG. 19 replaced by a differential gear set.
Figure 26:
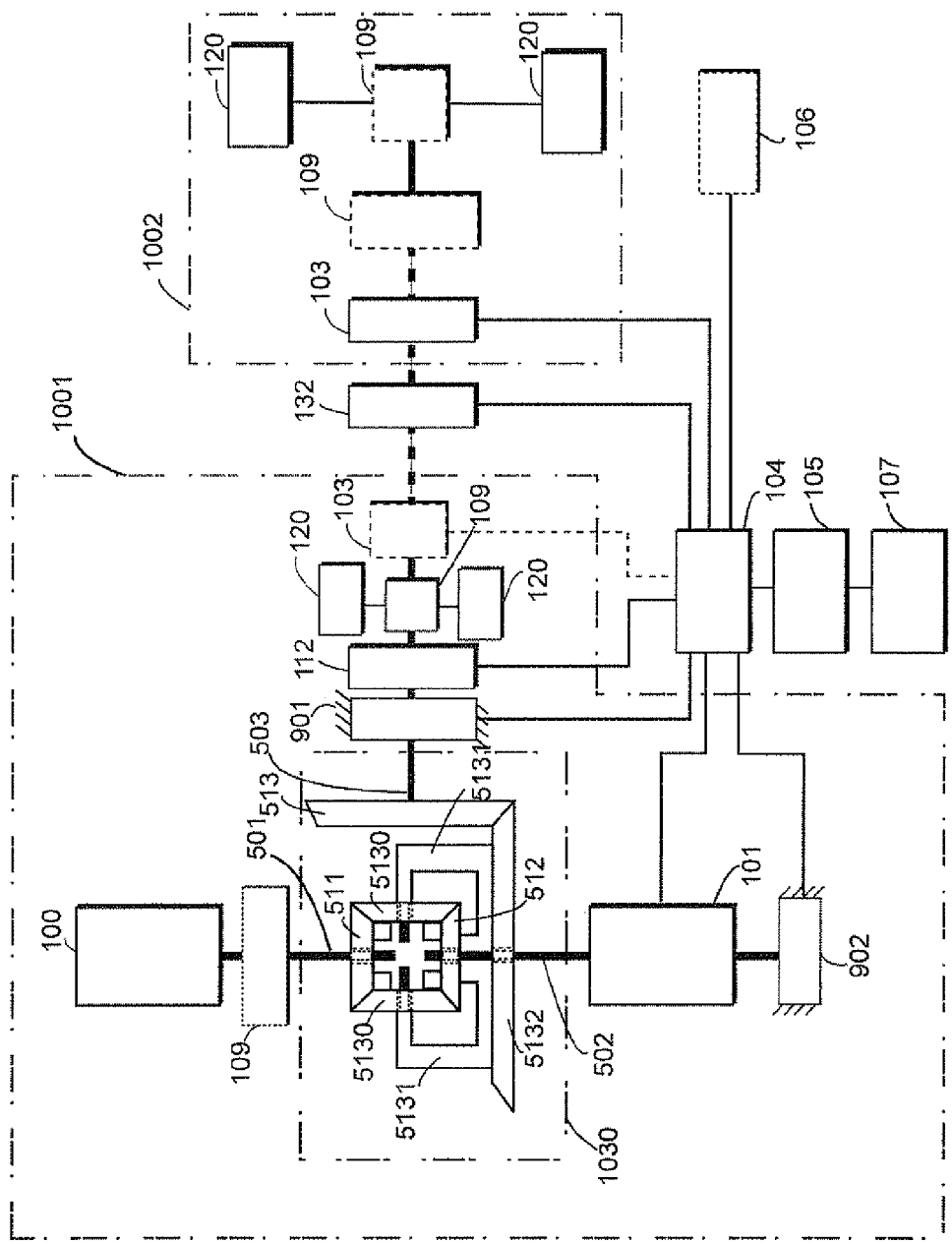
FIG. 26 is a block diagram of the twenty-fifth preferred embodiment of a split serial-parallel hybrid dual-power drive system with a planet gear set illustrated in FIG. 20 replaced by a differential gear set.

FIG. 25 shows a block diagram of the twenty-fourth preferred embodiment of the present invention. Wherein, the differential gear substitutes the separation type of the preferred embodiment of the planetary gear set as illustrated in FIG. 19. For the preferred embodiment illustrated in FIG. 25, the construction of the first drive system 1001 and the second drive system 1002 is identical with illustrated in FIG. 22. FIG. 26 shows a block diagram of the twenty-fifth preferred embodiment of the present invention. Wherein, the differential gear substitutes the separation type of the preferred embodiment of the planetary gear set as illustrated in FIG. 20. For the preferred embodiment illustrated in FIG. 25, the construction of the first drive system 1001 and the second drive system 1002 is identical with that as illustrated in FIG. 23. However, the input terminal of the clutch 132 as respectively illustrated in FIGS. 25 and 26 is coupled to the rotary part of the second dynamo-electrical unit 103 adapted to the first drive system 101, or to the input terminal or output terminal of the transmission unit 109 adapted to the second dynamo-electrical unit 103 while the output terminal of the clutch 132 is coupled to the rotary part of the second dynamo-electrical unit 103 serving as the power source for the second drive system 1002, or to the transmission unit 109 optionally adapted to the rotary part of the second dynamo-electrical unit 103, or to the input terminal of the differential transmission unit 109. The clutch 132 may be optionally provided to control the transmission status of the rotational kinetic energy between the first drive system 1001 and the second drive system 1002 while the output terminal of the active rotational power source 100 may be optionally provided with a transmission unit 109 to further drive the planet gear 803 of the planetary gear set 801.

Figure 27:
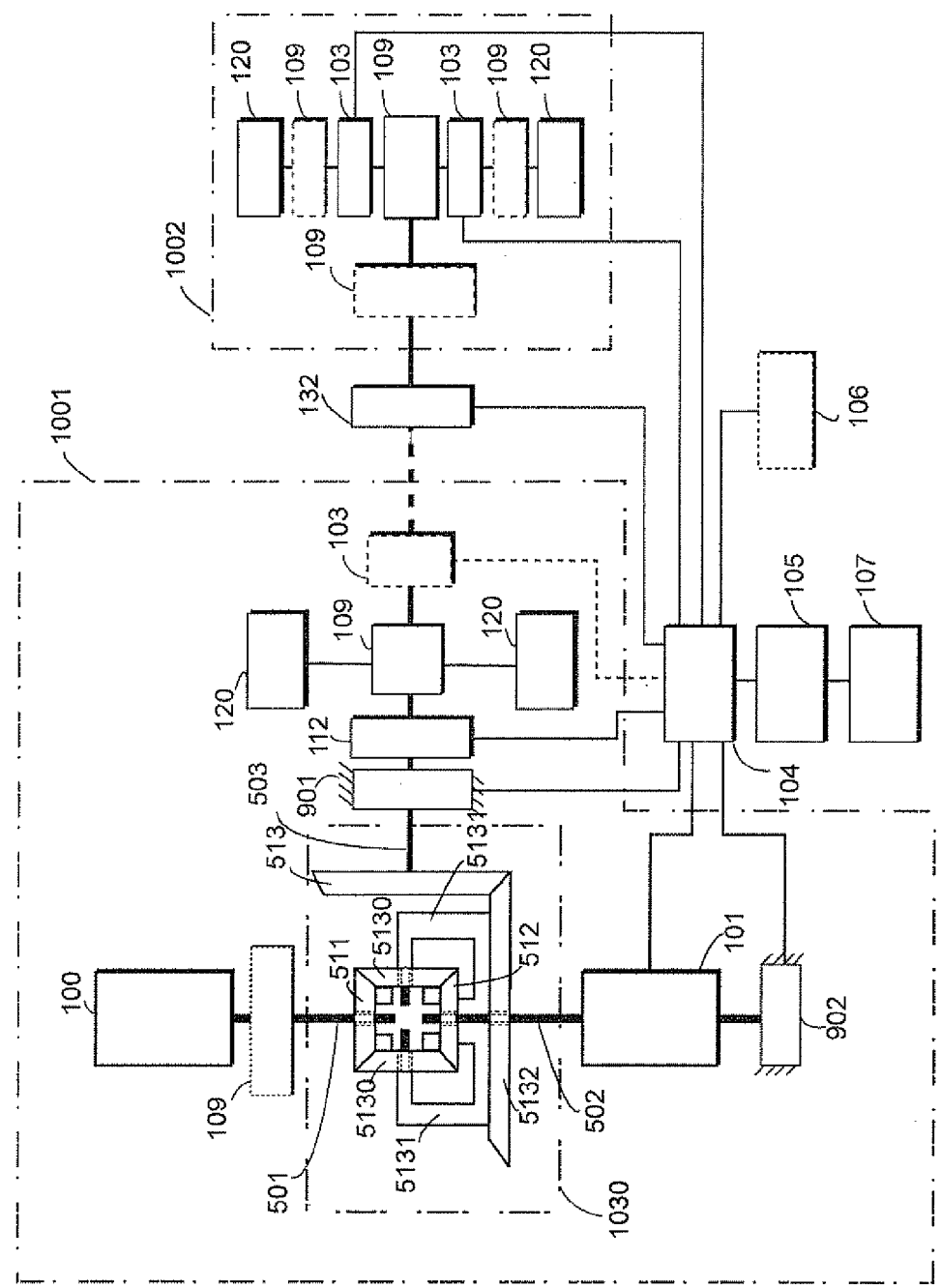
FIG. 27 is a block diagram of the twenty-sixth preferred embodiment of a split serial-parallel hybrid dual-power drive system with a planet gear set illustrated in FIG. 21 replaced by a differential gear set.

FIG. 27 shows a block diagram of the twenty-sixth preferred embodiment of the present invention. Wherein, the differential gear substitutes the separation type of the preferred embodiment of the planetary gear set as illustrated in FIG. 21. For the preferred embodiment illustrated in FIG. 27, the construction of the first drive system 1001 and the second drive system 1002 is identical with that as illustrated in FIG. 24. However, the input terminal of the clutch 132 illustrated in FIG. 27 is coupled to the rotary part of the second dynamo-electrical unit 103 adapted to the first drive system 1001, or to the input terminal or output terminal of the transmission unit 109 adapted to the second dynamo-electrical unit 103 while the output terminal of the clutch 132 is coupled to the input terminal of the transmission unit 109 optionally adapted to second drive system 1002 with both output terminals of the differential transmission unit 109 respectively coupled to the rotary parts of multiple second dynamo-electrical units 103 serving as the power source for the second drive system 1002. The clutch 132 may be optionally provided to control the transmission status of the rotational kinetic energy between the first drive system 1001 and the second drive system 1002 while the output terminal of the active rotational power source 100 may be optionally provided with a transmission unit 109 to further drive the planet gear 803 of the planetary gear set 801.

The differential function provided by the planetary gear set adapted to the first drive unit 1001 respectively illustrated in FIGS. 16, 17, 18, 19, 20 and 21 is replaced with a dual motion dynamo-electrical unit providing the similar functions but different structure.

Figure 28:
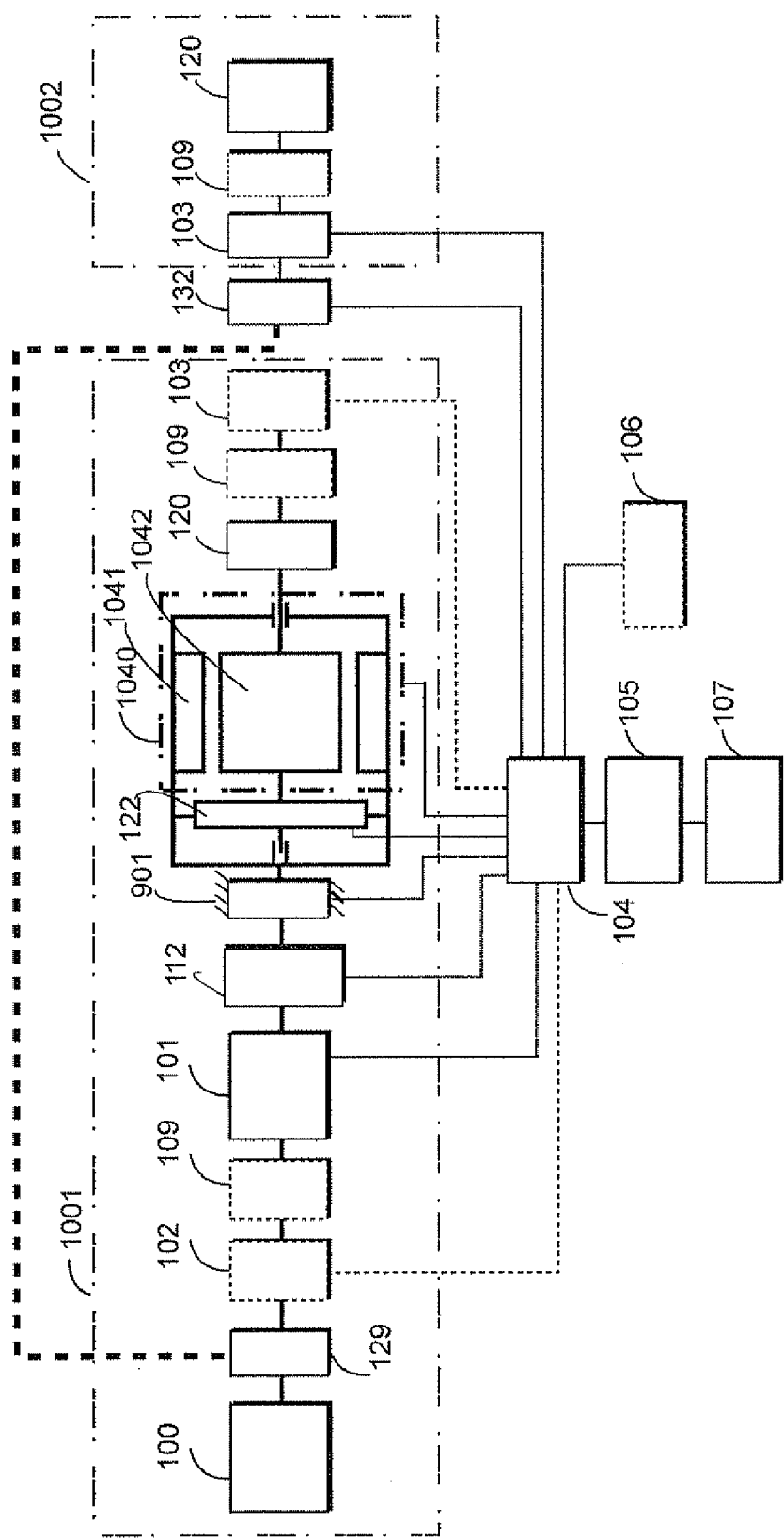
FIG. 28 is a block diagram of the twenty-seventh preferred embodiment of a split serial-parallel hybrid dual-power drive system with a planet gear set illustrated in FIG. 16 replaced by a dual-power motor.
Figure 29:
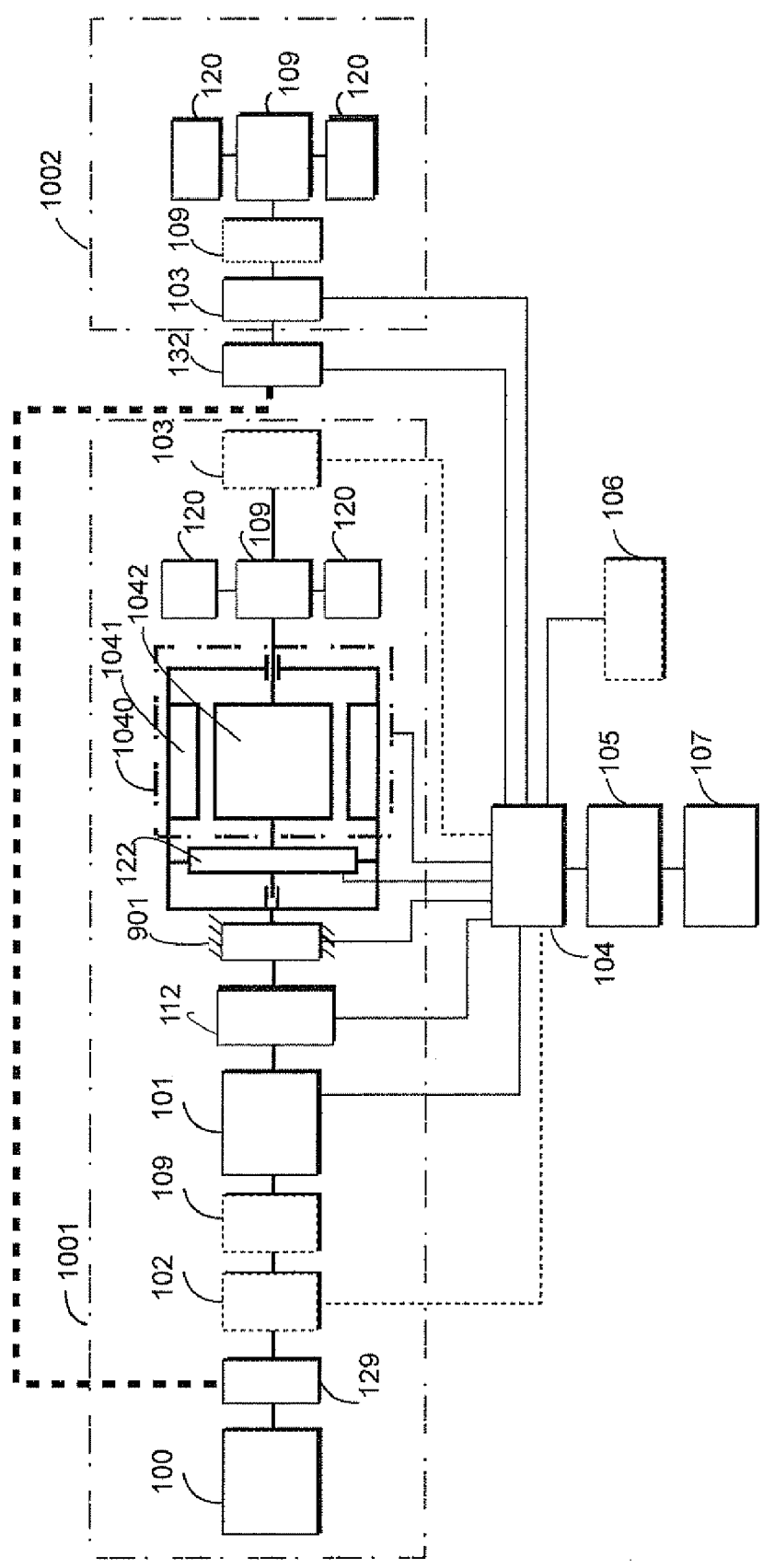
FIG. 29 is a block diagram of the twenty-eighth preferred embodiment of a split serial-parallel hybrid dual-power drive system with a planet gear set illustrated in FIG. 17 replaced by a dual-power motor.

FIG. 28 shows a block diagram of the twenty-seventh preferred embodiment of the present invention, wherein, the dual motion dynamo-electrical unit substitutes the split installed planetary gear set illustrated in FIG. 16; and FIG. 29 shows a block diagram of the twenty-eighth preferred embodiment of the present invention, wherein, the dual motion dynamo-electrical unit substitute the split installed planetary gear set illustrated in FIG. 16. In both preferred embodiments given in FIGS. 28 and 29, the rotary part to output the rotational kinetic energy of the active rotational power source 100 is coupled to the transmission unit 129, the clutch 102 and the transmission unit 109 optionally provided to drive the rotary part of the first dynamo-electrical unit 101. In the first drive system 1001, the dual motion dynamo-electrical unit 1040 could be implemented in the form of AC or DC, brush or brushless, synchronous or asynchronous. The dual motion dynamo-electrical unit 1040 made in a cylinder, disk or cone structure is comprised of the first rotary part 1041 and the second rotary part 1042 with the controllable clutch 122 arranged between the first and the second rotary parts 1041, 1042. The first rotary part 1041 is coupled to the rotary part of the brake 901, and through the clutch 112 to couple with the rotary part of the first dynamo-electrical unit 101. The stationary part of the brake 901 is locked to the frame. The second rotary part 1042 of the dual motion dynamo-electrical unit 1040 as illustrated in FIG. 28 drives the load 120 directly or through the optionally provided transmission unit 109, or as illustrated in FIG. 29, coupled to the input terminal of the differential transmission unit 109 with both differential output terminals of the differential transmission unit 109 to drive their respectively adapted loads 120 to constitute the first drive system 1001.

As required, the second dynamo-electrical unit 103 may be or may not be provided to the first drive system 1001. While the second dynamo-electrical unit 103 is provided, its rotary part as illustrated in FIG. 28 is coupled to the load 120 directly or through the optionally provided transmission unit 109, or to the differential transmission unit 109 driven by the second rotary part 1042 as illustrated in FIG. 29.

The second drive system 1002 deploy the second dynamo-electrical unit 103 as the power source to drive one or multiple load 120 through the optionally provided transmission unit 109 or any other transmission device; or the rotary part of the second dynamo-electrical unit 103 is coupled to the input terminal of the differential transmission unit 109 with both differential output terminals of the differential transmission unit 109 to drive their respectively adapted loads 120 to constitute the second drive system 1002. Alternatively, by switching the clutch 132 between engaging or disengaging status to regulate the rotational kinetic energy between the first drive system 1001 and the second drive system 1002 to provide those functions described in System Functions 1 through 80.

The primary functions of both preferred embodiments given in FIGS. 28 and 29 include that while the clutch 112 is disengaged and the brake 901 is closed, the active rotational power source 100 drives the first dynamo-electrical unit 101 to operate as a generator; and either or both of the second dynamo-electrical unit 103 in the first drive system 1001 and that in the second drive system 1002 receives the power generated from the first dynamo-electrical unit 101 to operate as a motor controlled by the drive control unit 104 to drive the load and provide the functions of serial hybrid power transmission.

If the rechargeable device 106 is provided, under the control of the drive control unit 104, the second dynamo-electrical unit 103 receive the power from the first dynamo-electrical unit 101 and the rechargeable device 106 to operate as a motor to drive the load 120; or the second dynamo-electrical unit 103 with the power from the rechargeable device 106 to operate as a motor to drive the load.

When both clutches 102, 112 are engaged, and both of the clutch 122 and the brake 901 are disengaged, under the control of the drive control unit 104 the second dynamo-electrical unit 103 receive the power from the rechargeable device 106 to operate as a motor to jointly drive the load 120 with the rotational kinetic energy from the active rotational power source 100.

The second dynamo-electrical unit 103 performs power regeneration by recycling the feedback brake kinetics to recharge the rechargeable device 106 or supply power to any other electrical power driven load 130.

Alternatively, while all the clutches 102, 112, 122 are closed up and the brake 901 is disengaged, the load 120 is driven by the rotational kinetic energy from the active rotational power source 100.

In addition, as required, the rotational kinetic energy output terminal of the active rotational power source 100 in the first drive system 1001, or the output terminal of the transmission unit 129 coupled to the first drive system 1001 is coupled to the input terminal of the clutch 132 while the output terminal of the clutch 132 is coupled to rotary part of the second dynamo-electrical unit 103 serving as the power source for the second drive system 1002, or to the output terminal of the transmission unit 109 optionally provided as illustrated in FIG. 28; or coupled to the rotary part of the second dynamo-electrical unit 103 serving as the power source for the second drive system 1002, or to the input terminal of the differential transmission units 109 of multiple loads 120 coupled to the second drive system 1002 optionally provided as illustrated in FIG. 29 for the control of the transmission status of the rotational kinetic energy between the first drive system 1001 and the second drive system 1002.

Figure 30:
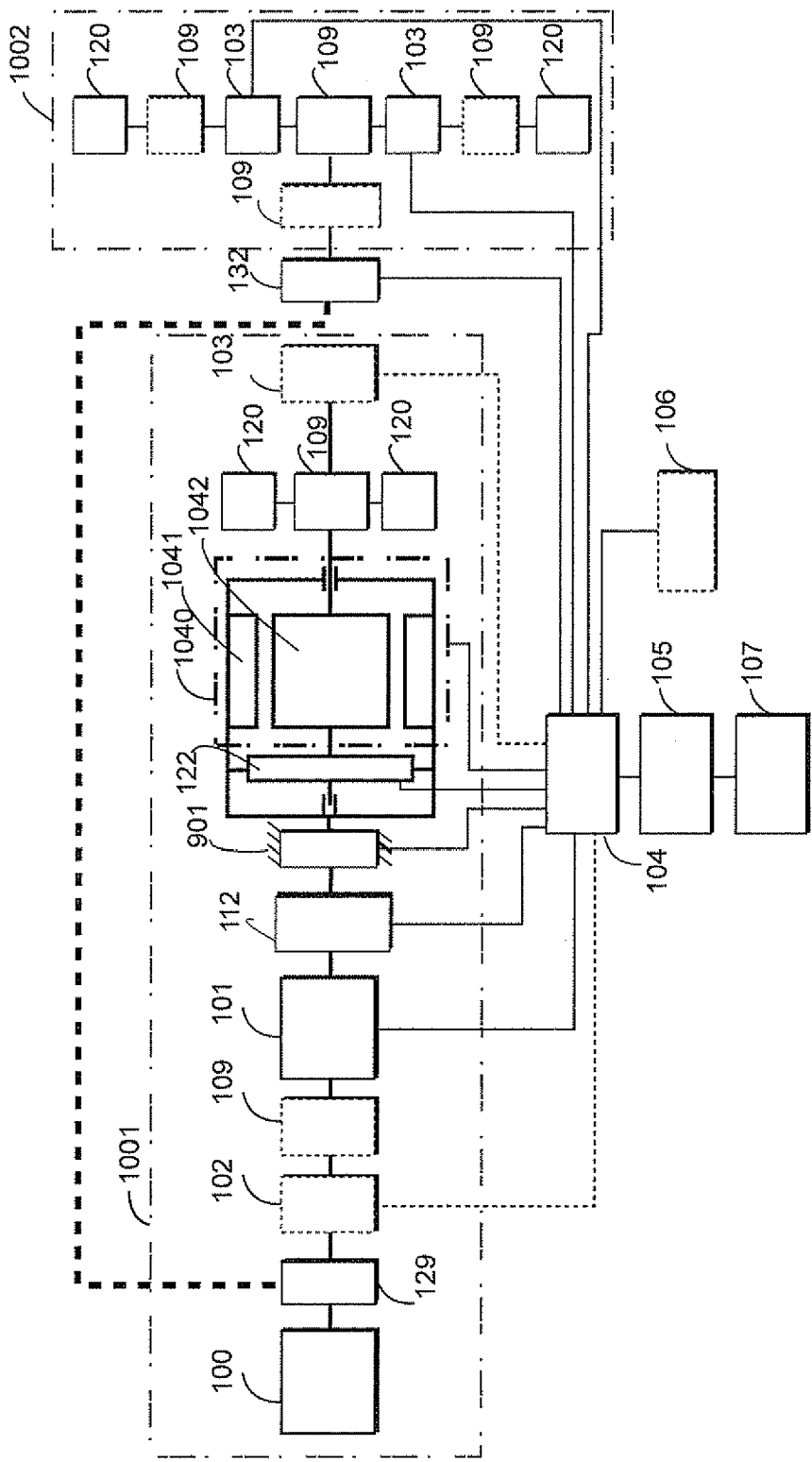
FIG. 30 is a block diagram of the twenty-ninth preferred embodiment of a split serial-parallel hybrid dual-power drive system with a planet gear set illustrated in FIG. 18 replaced by a dual-power motor.

FIG. 30 shows the block diagram of the twenty-ninth preferred embodiment of the present invention. Wherein, the dual motion dynamo-electrical unit substitutes the split planetary gear set illustrated in FIG. 18. In the preferred embodiment the rotary part applied to output the rotational kinetic energy of the active rotational power source 100 is coupled to the transmission unit 129, the clutch 102 and the transmission unit 109 optionally provided to drive the rotary part of the first dynamo-electrical unit 101. In the first drive system 1001, a dual motion dynamo-electrical unit 1040 made in the form of AC or DC, brush or brushless, synchronous or asynchronous is provided. The dual motion dynamo-electrical unit 1040 made in a cylinder, disk or cone shape is comprised of the first rotary part 1041 and the second rotary part 1042 with the controllable clutch 122 installed between the first and the second rotary parts 1041, 1042. The first rotary part 1041 is coupled to the rotary part of the brake 901, and further to the rotary part of the first dynamo-electrical unit 101 through the clutch 112. The stationary part of the brake 901 is locked to the frame. The second rotary part 1042 of the dual motion dynamo-electrical unit 1040 is coupled to the input terminal of the differential transmission unit 109 with both differential outputs of the differential transmission unit 109 to drive their respectively adapted loads 120 to constitute the first drive system 1001.

As required, the second dynamo-electrical unit 103 may be or may not be provided to the first drive system 1001. When the second dynamo-electrical unit 103 is provided, it is coupled to the second rotary part 1042 or to the input terminal of the differential transmission unit 109 driven by the second rotary part 1042.

The second drive system 1002 deployed multiple second dynamo-electrical units 103 as the power source drives separately coupled to the optionally transmission unit 109 or any other transmission device to drive their respectively adapted loads 120 to constitute the second drive system 1002. Alternatively, by switching the clutch 132 to be disengaged or engaged to regulate the transmission status of the rotational kinetic energy between the first drive system 1001 and the second drive system 1002 to provide those functions described in System Functions 1 through 80.

The primary functions of the preferred embodiment given in FIGS. 30 and 29 include that when the clutch 112 is disengaged, and the brake 901 is closed, the active rotational power source 100 drives the first dynamo-electrical unit 101 to operate as a generator; under the regulation of the drive control unit 104, either or both of the second dynamo-electrical unit 103 in the first drive system 1001 and that in the second drive system 1002 receive power generated from the first dynamo-electrical unit 101 to operate as a motor to drive the load and provide the function of the serial hybrid power transmission.

If the rechargeable device 106 is provided, under the control of the drive control unit 104, the second dynamo-electrical unit 103 receive the power from the first dynamo-electrical unit 101 and the rechargeable device 106 operates as a motor to drive the load 120.

When both clutches 102, 112 are engaged, and both of the clutch 122 and the brake 901 are disengaged, under the control of the drive control unit 104 the second dynamo-electrical unit 103 receive the power from the rechargeable device 106 operates as a motor for driving the load 120; or the second dynamo-electrical unit 103 receive the power from the rechargeable device 106 to operate as a motor to jointly drive the load 120 with the rotational kinetic energy from the active rotational power source 100.

The second dynamo-electrical unit 103 performs power regeneration by recycling the feedback brake kinetics to recharge the rechargeable device 106 or supply power to any other electrical power driven load 130.

Alternatively, when all the clutches 102, 112, 122 are engaged and the brake 901 is disengaged, the load 120 is driven by the rotational kinetic energy from the active rotational power source 100.

In addition, as required, the rotational kinetic energy output terminal of the active rotational power source 100 in the first drive system 1001, or the output terminal of the transmission unit 129 coupled to the first drive system 1001 is coupled to the input terminal of the clutch 132 while the output terminal of the clutch 132 is coupled to the input terminal of the differential transmission unit 109 of multiple second dynamo-electrical unit 103 coupled to the optionally provided second drive system 1002 for the control of the transmission status of the rotational kinetic energy between the first drive system 1001 and the second drive system 1002.

Figure 31:
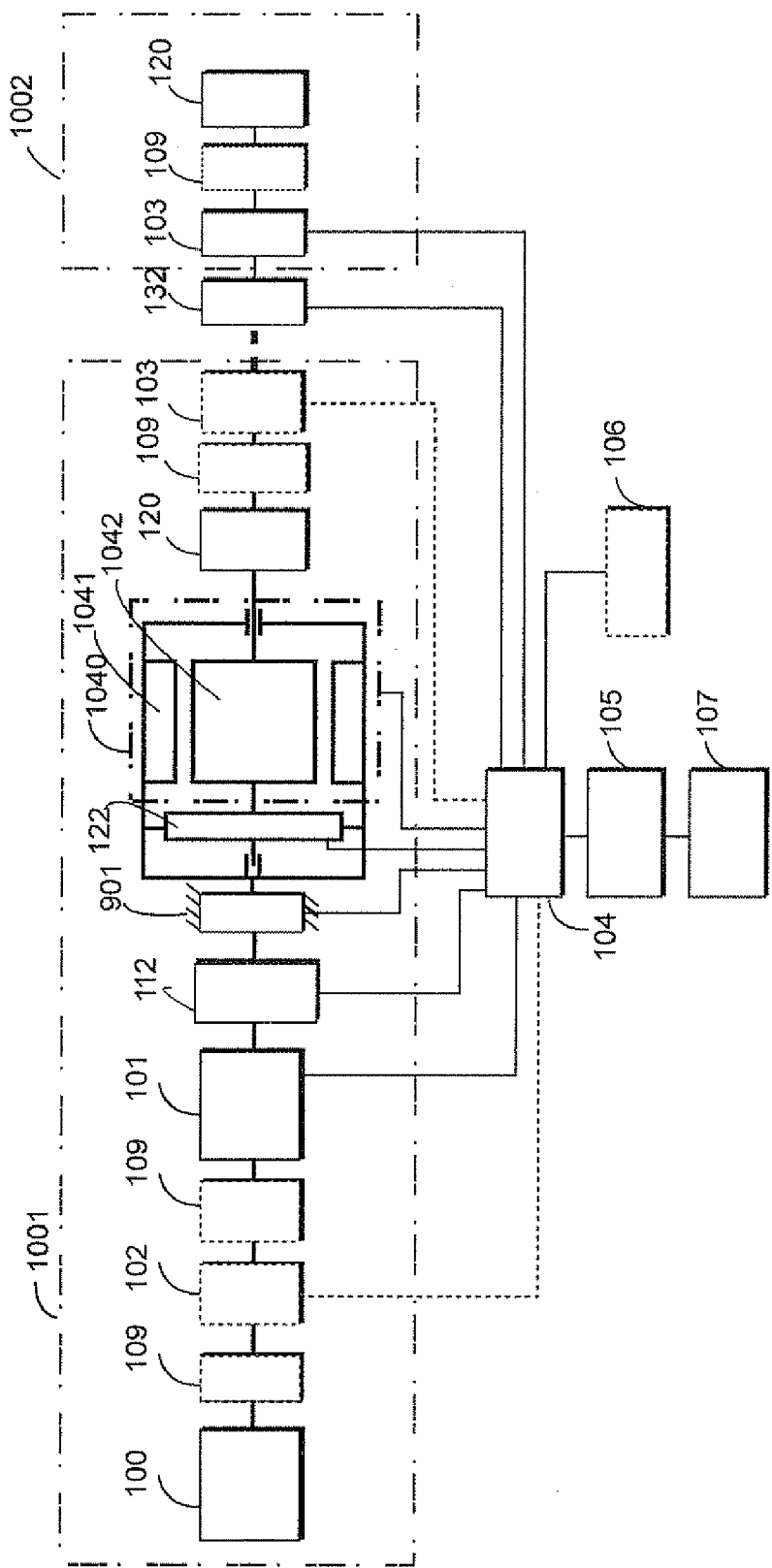
FIG. 31 is a block diagram of the thirtieth preferred embodiment of a split serial-parallel hybrid dual-power drive system with a planet gear set illustrated in FIG. 19 replaced by a dual-power motor.
Figure 32:
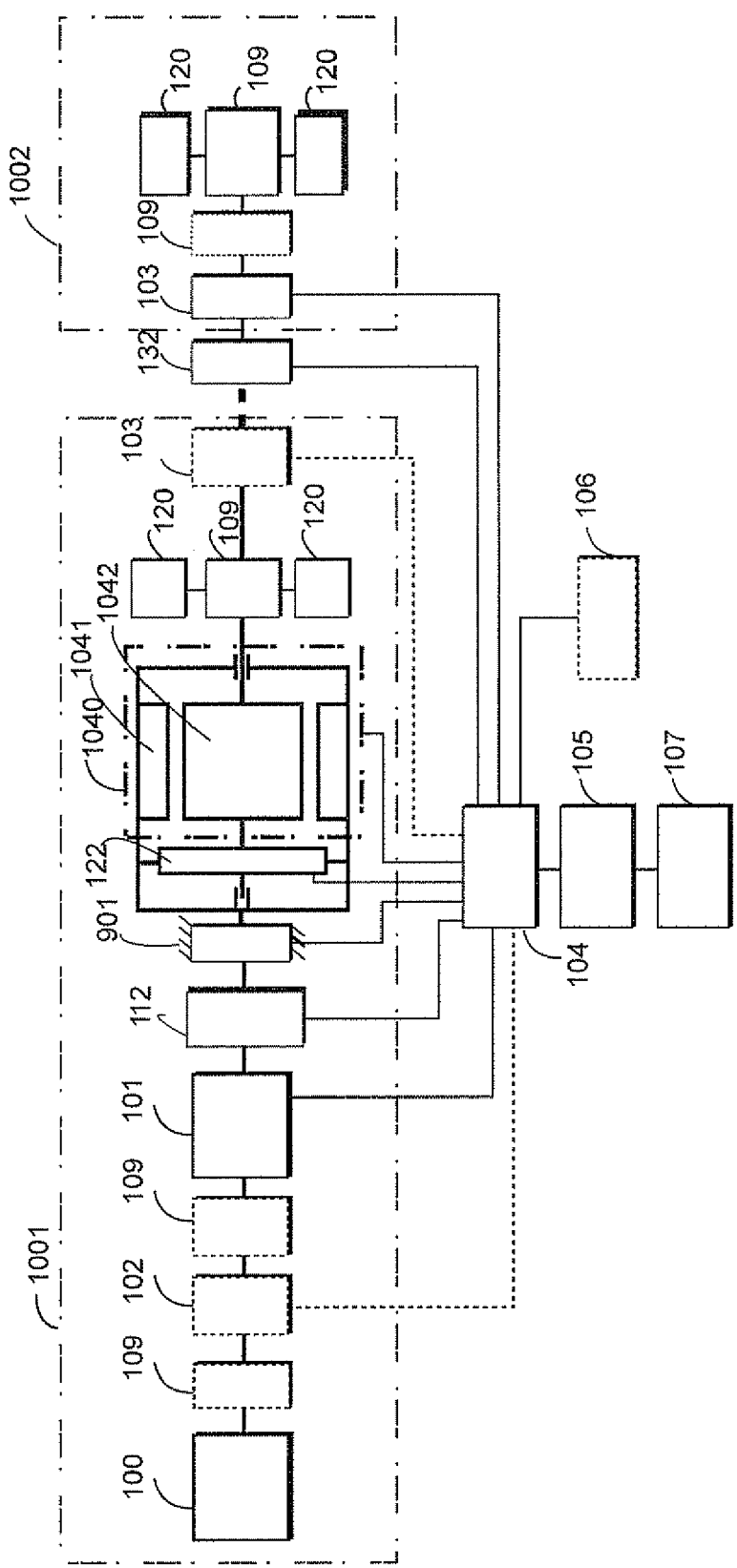
FIG. 32 is a block diagram of the thirty-first preferred embodiment of a split serial-parallel hybrid dual-power drive system with a planet gear set illustrated in FIG. 20 replaced by a dual-power motor.

FIG. 31 shows the block diagram of the thirtieth preferred embodiment of the present invention. Wherein, the dual motion dynamo-electrical unit substitutes the split planetary gear set illustrated in FIG. 19. The construction of the first drive system 1001 and the second drive system 1002 of the preferred embodiment illustrated in FIG. 31 is identical with that illustrated in FIG. 28. FIG. 32 shows the block diagram of the thirty-first preferred embodiment of the present invention. Wherein, the dual motion dynamo-electrical unit substitutes the split planetary gear set illustrated in FIG. 20. The construction of the first drive system 1001 and the second drive system 1002 of the preferred embodiment illustrated in FIG. 32 is identical with that illustrated in FIG. 29. The transmission unit 109 may be also optionally provided to the output terminal of the active rotational power source 100 in the system respectively illustrated in FIGS. 31 and 32 so to further drive the planet gear 803 of the planetary gear set 801. The clutch 132 is optionally provided for the control of the transmission status of the rotational kinetic energy between the first drive system 1001 and the second drive system 1002. The difference respectively between both preferred embodiment given in FIGS. 31 and 32 and those in FIGS. 28 and 29 rests in that the input terminal of the clutch 132 respectively of the thirtieth and the thirty-first preferred embodiments is coupled to the rotary part of the second dynamo-electrical unit 103 optionally adapted to the first drive system 1001, or to the input terminal or output terminal of the transmission unit 109 adapted to the second dynamo-electrical unit 103 while the output terminal of the clutch 132 is coupled to the rotary part of the second dynamo-electrical unit 103 serving as the power source for the second drive system 1002, or to the transmission unit 109 optionally provided to the rotary part of the second dynamo-electrical unit 013 in the second drive system, or to the input terminal of the differential transmission unit 109.

Figure 33:
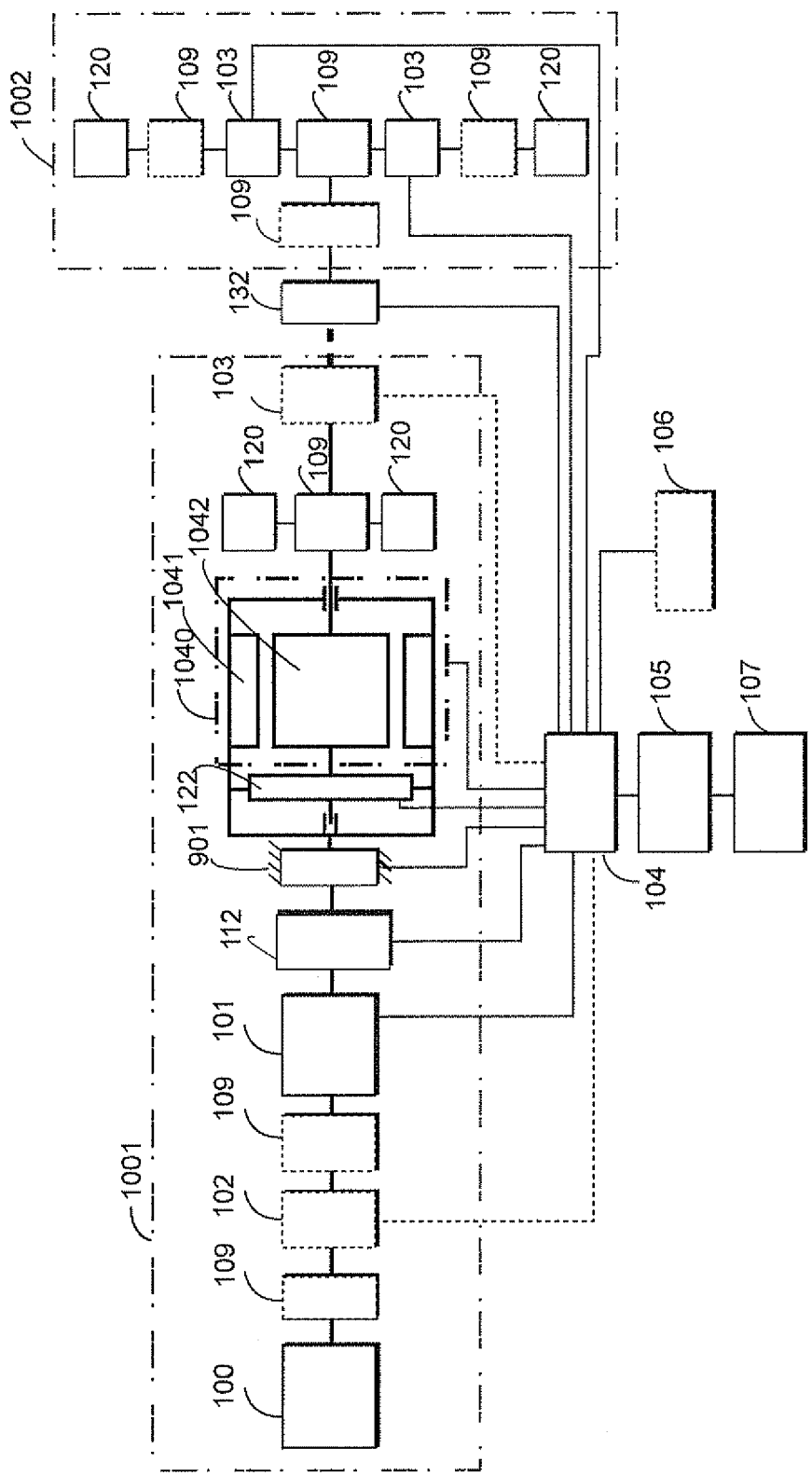
FIG. 33 is a block diagram of the thirty-second preferred embodiment of a split serial-parallel hybrid dual-power drive system with a planet gear set illustrated in FIG. 21 replaced by a dual-power motor.

FIG. 33 shows the block diagram of the thirty-second preferred embodiment of the present invention. Wherein the dual motion dynamo-electrical unit substitutes the split planet gear set illustrated in FIG. 21. The construction of the first drive system 1001 and the second drive system 1002 of the preferred embodiment illustrated in FIG. 33 is identical with that illustrated in FIG. 30. The transmission unit 109 may be also optionally provided to the output terminal of the active rotational power source 100 in the system illustrated in FIG. 33 so to further drive the planet gear 803 of the planetary gear set 801. The clutch 132 is optionally provided for the control of the transmission status of the rotational kinetic energy between the first drive system 1001 and the second drive system 1002. The difference respectively between both preferred embodiment given in FIGS. 31 and 32 and those in FIGS. 28 and 29 rests in that the input terminal of the clutch 132 respectively of the thirtieth and the thirty-first preferred embodiments is coupled to the rotary part of the second dynamo-electrical unit 103 optionally adapted to the first drive system 1001, or to the input terminal or output terminal of the transmission unit 109 adapted to the second dynamo-electrical unit 103 while the output terminal of the clutch 132 is coupled to the input terminal of the differential transmission unit 109 optionally provided to the second drive system 1002 with both output terminals of the differential transmission unit 109 to be respectively coupled to the rotary parts of multiple second dynamo-electrical units 103 serving as the power source for the second drive system 1002.

The output terminal of the active rotational power source 100 in the split serial-parallel hybrid dual-power drive system is firstly coupled to the clutch 1020. The clutch 1020 is operating by manual, mechanical force, eccentric force, air pressure, or hydraulic flow force, or electro-magneto controlled clutch, or single way clutch, or coupler with torque control capability, or any other transmission device that transmits or interrupt the mechanical rotational kinetic energy transfer. The clutch 1020 is coupled to the transmission unit 109 serving as the pilot drive unit 1000 and coupled to the transmission device 129 and the load 120 to control the load 120 driven by the pilot drive unit 1000 which generates the rotational kinetic energy. The power generated by the first dynamo-electrical unit 101 driven by the active rotational power source 100 drives the second dynamo-electrical unit 103 in the second drive system 1002 directly or under the regulation of the drive control unit 104 to provide the capability of serial hybrid power transmission, or to operate the primary functions of the parallel hybrid power transmission and other operations described in System Functions 1 through 80 under the regulation of a control system.

Figure 34:
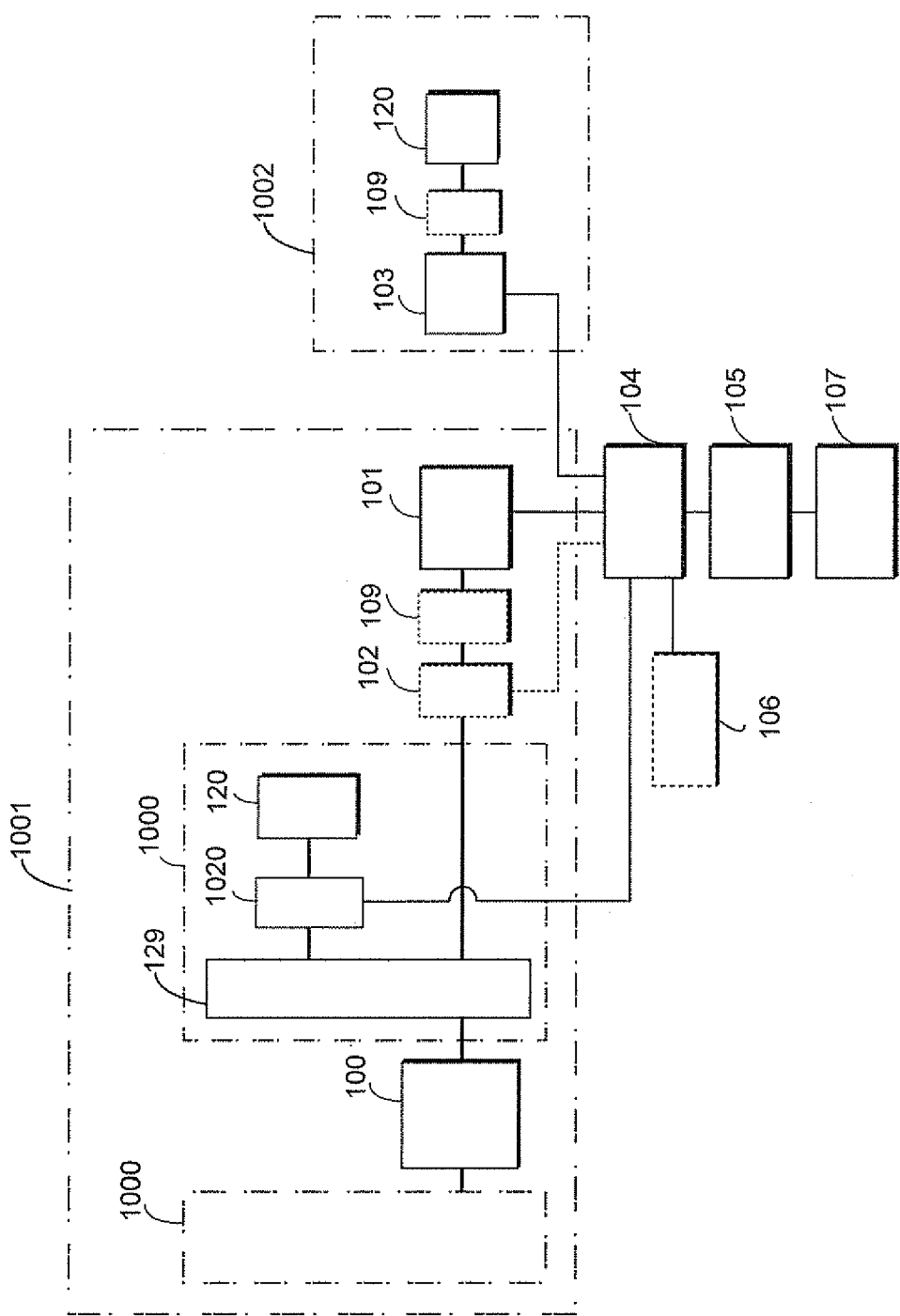
FIG. 34 is the first block diagram showing that a pilot drive unit is provided to the output terminal of the active rotational power source of the present invention.
Figure 35:
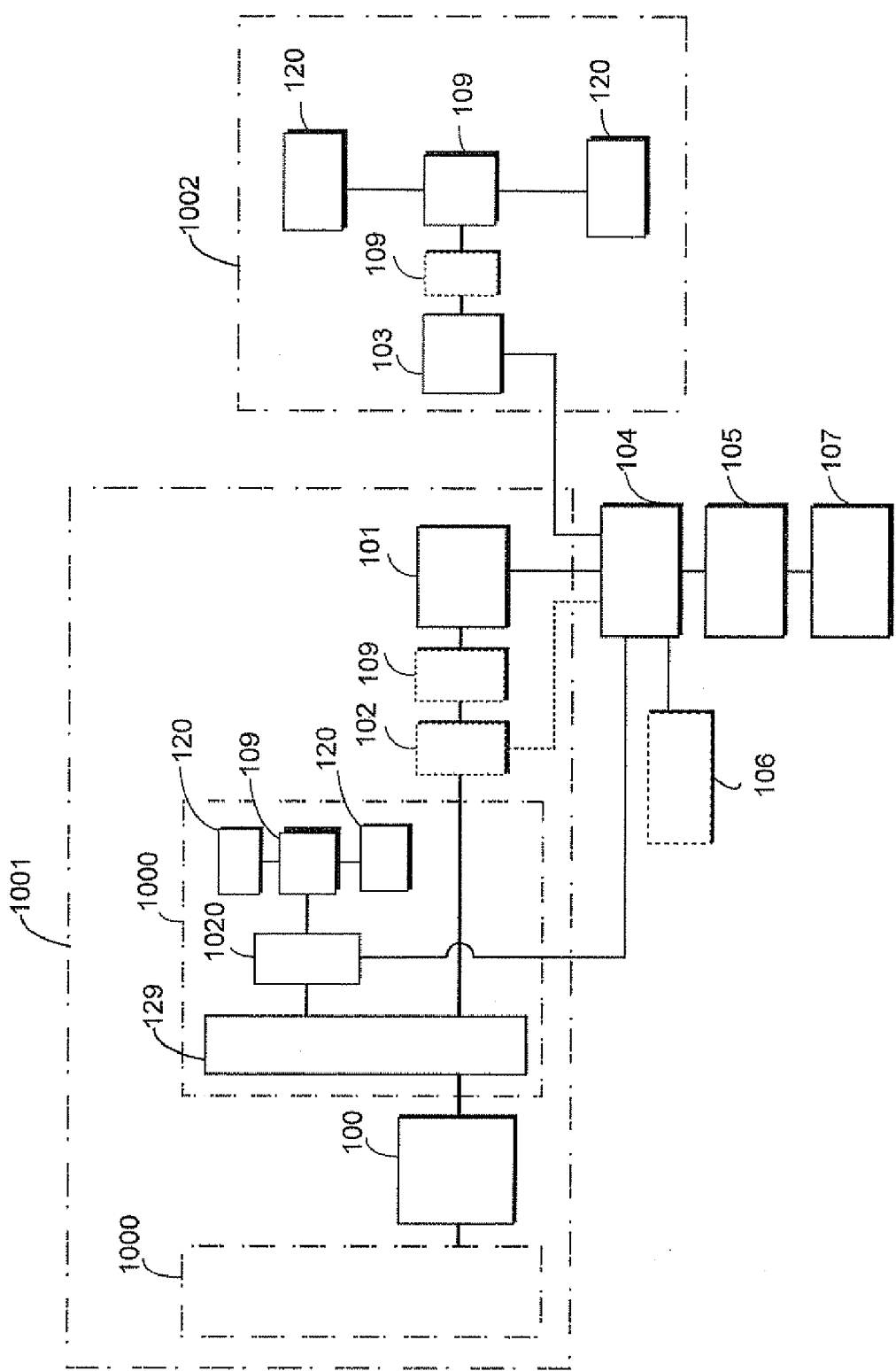
FIG. 35 is the second block diagram showing that a pilot drive unit is provided to the output terminal of the active rotational power source of the present invention.

FIG. 34 is the first block diagram showing that a pilot drive unit is provided to the output terminal of the active rotational power source of the present invention; and FIG. 35 is a second block diagram showing that a pilot drive unit is provided to the output terminal of the active rotational power source of the present invention. Each of both preferred embodiments illustrated in FIGS. 34 and 35 essentially includes the pilot drive unit 1000 comprised of the output terminal of the active rotational power source 100 that is firstly coupled to the transmission unit 129, the auxiliary clutch 1020, and a transmission unit 109 of the prior art optionally provided to drive the load 120. The clutch 1020 is provided to control the transmission status of the rotational kinetic energy between the active rotational power source 100 and the load 120 to the pilot drive unit 1000.

If the active rotational power source 100 is implemented in multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

The input terminal of the clutch 1020 in the pilot drive unit 1000 is coupled to the output terminal of the transmission unit 129 driven by the active rotational power source 100, or to another output terminal of the active rotational power source 100. As required, the transmission unit 109 coupled between the clutch 1020 and the load 120 may be comprised of the transmission unit 109 which provides the capability of controllable multistage transmission, continuously variable transmission, reversing or idling function as illustrated in FIG. 34 to drive the load 120, or may be comprised of the transmission unit 109 which provides with the capability of controllable multistage transmission, continuously variable transmission, reversing or idling function and multiple shafts for differential output as illustrated in FIG. 35 to drive the loads 120 respectively adapted to each differential output terminal for differential operation.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

In the second drive system 1002, the transmission unit 109 driven by the second dynamo-electrical unit 103 may be provided with the capability of controllable multistage transmission, continuously variable transmission, reversing or idling function as illustrated in FIG. 34 to drive the load 120, or in the form of the transmission unit 109 that is provided with the capability of controllable multistage transmission, continuously variable transmission, reversing or idling function and multiple shafts for the operation of differential output as illustrated in FIG. 35 to drive the loads 120 respectively adapted to each differential output terminal for differential transmission.

As required, the clutch 102 coupled to the output terminal of the active rotational power source 100 through the transmission unit 129, the optionally provided transmission unit 109 and the first dynamo-electrical unit 101 may coupled with the first drive system 1001, or coupled with the second drive system 1002 or provide standalone operation.

In the system respectively illustrated in FIGS. 34 and 35, while driving the pilot drive unit 1000, the operation of the active rotational power source 100 may further include driving the first dynamo-electrical unit 101 by the active rotational power source 100 to operate as a generator with the power generated to drive the second dynamo-electrical unit 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive the second dynamo-electrical unit 103 in the second drive system 1002 to drive the load 120.

When the system is provided with the rechargeable device 106, the active rotational power source 100 drives the first dynamo-electrical unit 101 to operate as a generator to recharge the rechargeable device 106 or to supply power to other electrical power driven load 130 (including any externally connected unspecified load).

The first dynamo-electrical unit 101 operates as a generator with the power from the rechargeable device 106 to jointly drive the second dynamo-electrical unit 103 to produce the rotational kinetic energy to drive the load 120 or supply power to any other electrical power driven load 130 (including any externally connected unspecified load).

The power from the rechargeable device 106 drives the second dynamo-electrical unit 103 in the second drive system 1002 to generate the rotational kinetic energy for driving the load.

The power from the rechargeable device 106 drives the second dynamo-electrical unit 103 in the second drive system 1002 to generate the rotational kinetic energy for jointly driving the load with the power from the active rotational power source 100.

The recycled power from feedback braking regeneration by the first dynamo-electrical unit 101 or the second dynamo-electrical unit 103 recharges the rechargeable device 106 or supply power to any other electrical power driven load 130 (including any externally connected unspecified load).

Figure 36:
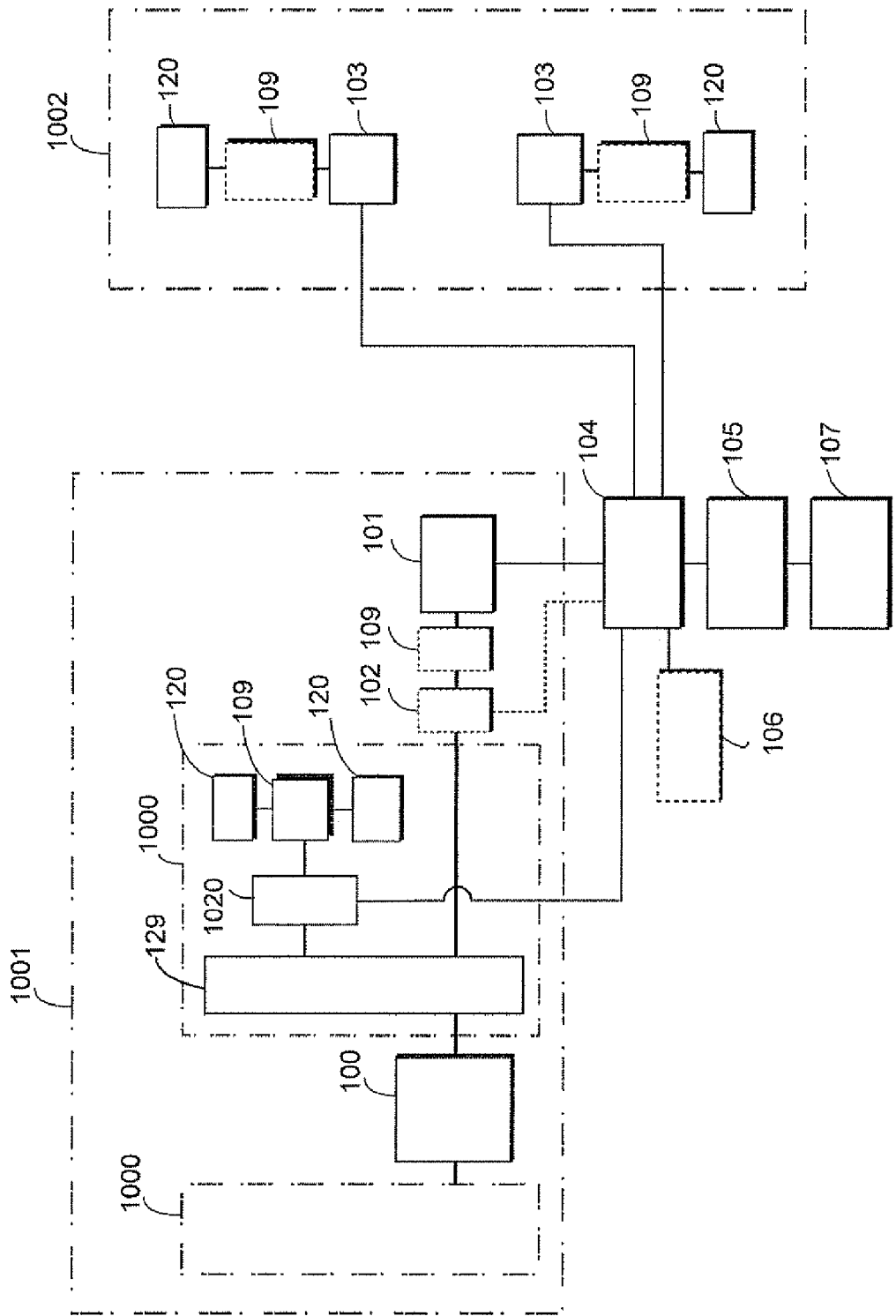
FIG. 36 is the third block diagram showing that a pilot drive unit is provided to the output terminal of the active rotational power source of the present invention.

FIG. 36 is the third block diagram showing that a pilot drive unit is provided to the output terminal of the active rotational power source of the present invention. The preferred embodiment illustrated in FIG. 36 includes the pilot drive unit 1000 comprised of the output terminal of the active rotational power source 100 that is coupled first to the transmission unit 129, the auxiliary clutch 1020, and a transmission unit 109 of the prior art optionally provided to drive the load 120. The clutch 1020 is provided to control the transmission status of the rotational kinetic energy between the active rotational power source 100 and the load 120 to the pilot drive unit 1000.

If the active rotational power source 100 is implemented with a multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The input terminal of the clutch 1020 in the pilot drive unit 1000 is coupled to the output terminal of the transmission unit 129 driven by the active rotational power source 100, or to another output terminal of the active rotational power source 100. The input terminal of the clutch 1020 is coupled to the output terminal of the transmission unit 129 driven by the active rotational power source 100 or to the other output terminal of the active rotational power source 100. As required, the transmission unit 109 coupled between the clutch 1020 and the load 120 may be comprised of the transmission unit 109 which provides the capability of controllable multistage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

In the second drive system 1002, the transmission unit 109 driven by the second dynamo-electrical unit 103 may be provided with the capability of controllable multistage transmission, continuously variable transmission, reversing or idling function as illustrated in FIG. 34 to drive the load 120, or in the form of the transmission unit 109 that is provided with the capability of controllable multistage transmission, continuously variable transmission, reversing or idling function and multiple shafts for the operation of differential output to drive the loads 120 respectively adapted to each differential output terminal for differential operation.

As required, the clutch 102 coupled to the output terminal of the active rotational power source 100 through the transmission unit 129, the optionally provided transmission unit 109 and the first dynamo-electrical unit 101 may coupled with the first drive system 1001, or coupled with the second drive system 1002 or provide standalone operation.

In the system illustrated in FIG. 36, while driving the pilot drive unit 1000, the operation of the active rotational power source 100 may further drive the first dynamo-electrical unit 101 by the active rotational power source 100 to operate as a generator with the power generated to drive multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive multiple second dynamo-electrical units 103 in the second drive system 1002 to drive the load 120.

When the system is provided with the rechargeable device 106, the active rotational power source 100 drives the first dynamo-electrical unit 101 to operate as a generator with the power generated to recharge the rechargeable device 106 or to supply power to other electrical power driven load 130 (including any externally connected unspecified load).

When the first dynamo-electrical unit 101 operates as a generator, the power generated and that from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy produced by the second dynamo-electrical unit 103 in the second drive system 1002 as driven by the power from the rechargeable device 106 and that from the active rotational power source 100 jointly drive the load.

The recycled power from feedback braking regeneration by the first dynamo-electrical unit 101 or the second dynamo-electrical unit 103 recharges the rechargeable device 106 or supply power to any other electrical power driven load 130 (including any externally connected unspecified load).

Figure 37:
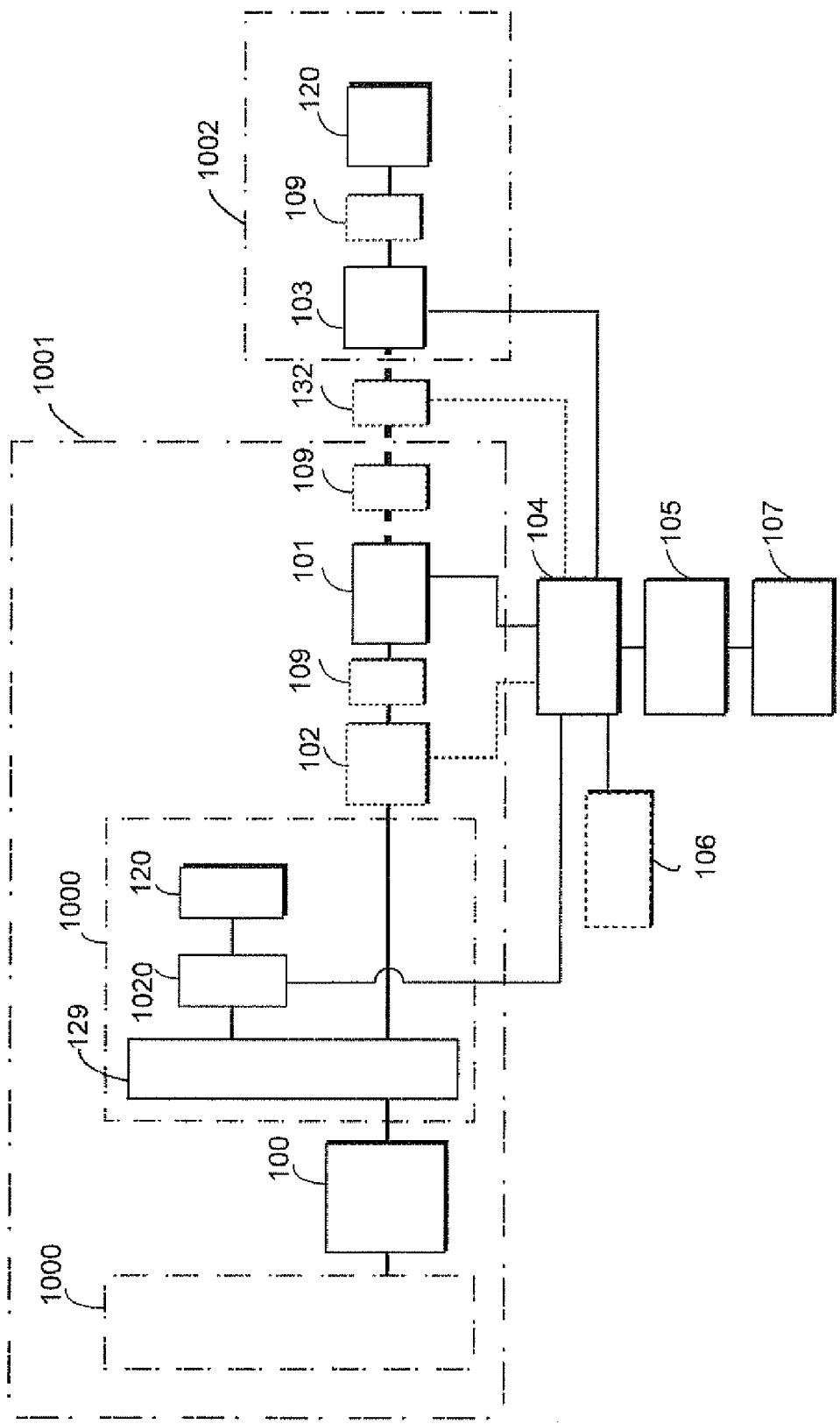
FIG. 37 is the fourth block diagram showing that a pilot drive unit is provided to the output terminal of the active rotational power source of the present invention.
Figure 38:
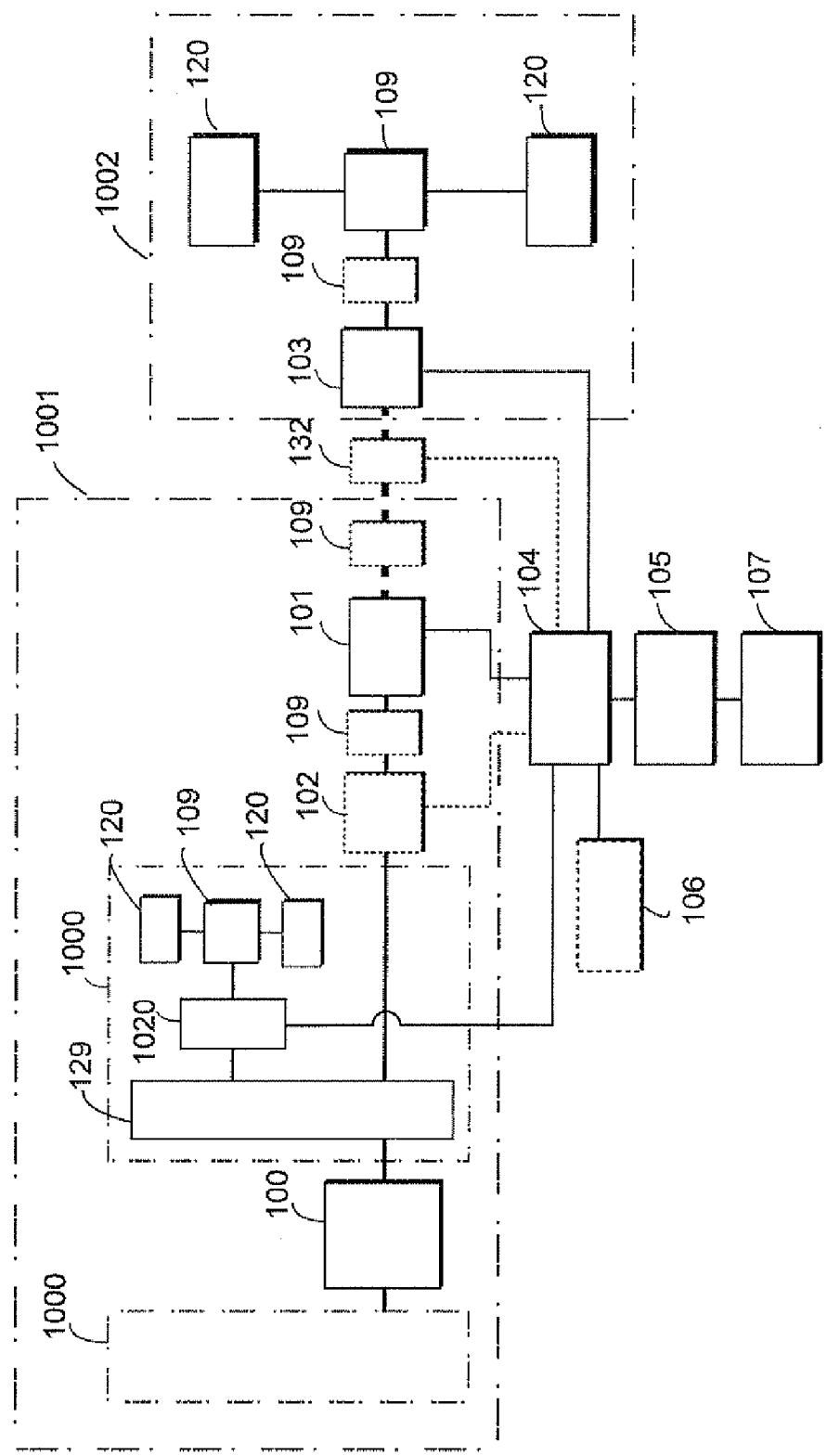
FIG. 38 is the fifth block diagram showing that a pilot drive unit is provided to the output terminal of the active rotational power source of the present invention.

FIG. 37 is the fourth block diagram showing that a pilot drive unit is provided to the output terminal of the active rotational power source of the present invention. FIG. 38 is the fifth block diagram showing that a pilot drive unit is provided to the output terminal of the active rotational power source of the present invention. In both preferred embodiments illustrated in FIGS. 37 and 38, the clutch 132 is installed between the rotary part of the first dynamo-electrical unit 101 and the rotary part of the second drive system 1002. The system essentially includes the pilot drive unit 1000 comprised of the output terminal of the active rotational power source 100 that is coupled first to the transmission unit 129, the auxiliary clutch 1020, and a transmission unit 109 of the prior art optionally provided to drive the load 120. The clutch 1020 is provided to control the transmission status of the rotational kinetic energy between the active rotational power source 100 and the load 120 to the pilot drive unit 1000.

If the active rotational power source 100 is implemented with a multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The input terminal of the clutch 1020 in the pilot drive unit 1000 is coupled to the output terminal of the transmission unit 129 driven by the active rotational power source 100, or to another output terminal of the active rotational power source 100. As required, the transmission unit 109 coupled between the clutch 1020 and the load 120 may be comprised of the transmission unit 109 which provides the capability of controllable multistage transmission, continuously variable transmission, reversing or idling function as illustrated in FIG. 37 to drive the load 120, or may be comprised of the transmission unit 109 which provides the capability of controllable multistage transmission, continuously variable transmission, reversing or idling function and multiple shafts for the operation of differential output as illustrated in FIG. 38 to drive the loads 120 respectively adapted to each differential output terminal for differential operation.

Furthermore, the rotary part of the first dynamo-electrical unit 101 adapted to the first drive system 1001, or the rotary part of the optionally provided transmission unit 109 coupled to the first drive system 1001 is coupled to the input terminal of the clutch 132 while the output terminal of the clutch 132 is coupled to the rotary part of the second dynamo-electrical unit 103 serving as the power source for the second drive system 1002, or to the input terminal of the differential transmission unit 109 coupled to the rotary part of the second dynamo-electrical unit 103 in the second drive system 1002. Both differential output terminals of the differential transmission unit 109 are coupled to their respectively adapted loads 120 while the clutch 132 is used to control the transmission status of the rotational kinetic energy between the first drive system 1001 and the second drive system 1002.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

In the second drive system 1002, the transmission unit 109 driven by the second dynamo-electrical unit 103 may be provided in the form of the transmission unit 109 which provides the capability of controllable multistage transmission, continuously variable transmission, reversing or idling function as illustrated in FIG. 37 to drive the load 120, or in the form of the transmission unit 109 which provides the capability of controllable multistage transmission, continuously variable transmission, reversing or idling function and multiple shafts for the operation of differential output as illustrated in FIG. 38 to drive the loads 120 respectively adapted to each differential output terminal for differential operation.

As required, the clutch 102 coupled to the out put end of the active rotational power source 100 through the transmission unit 129, the optionally provided transmission unit 109, and the first dynamo-electrical unit 101 may coupled with the first drive system 1001, or coupled with the second drive system 1002 or provide standalone operation.

In the system respectively illustrated in FIGS. 37 and 38, while driving the pilot drive unit 1000, the operation of the active rotational power source 100 may further drive the first dynamo-electrical unit 101 by the active rotational power source 100 to operate as a generator with the power generated to drive the second dynamo-electrical unit 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive the second dynamo-electrical unit 103 in the second drive system 1002 to produce the rotational kinetic energy for driving the load 120.

When the system is provided with the rechargeable device 106, the active rotational power source 100 drives the first dynamo-electrical unit 101 to operate as a generator with the power generated to recharge the rechargeable device 106 or supply power to nay other electrical power driven load 130 (including any externally connected unspecified load).

The first dynamo-electrical unit 101 operates as a generator with the power generated and that from the rechargeable device 106 to jointly drive the second dynamo-electrical unit 103 to produce the rotational kinetic energy to drive the load 120 or supply power to any other electrical power driven load 130 (including any externally connected unspecified load); or the power from the rechargeable device 106 alone drives the second dynamo-electrical unit 103 adapted in the second drive system 1002 to produce the rotational kinetic energy to drive the load.

The rotational kinetic energy produced by the second dynamo-electrical unit 103 in the second drive system 1002 as driven by the power from the rechargeable device 106 and that from the active rotational power source 100 jointly drive the load.

The recycled power from feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is controlled by switching the clutch 132 to disengaged or engaged state.

Figure 39:
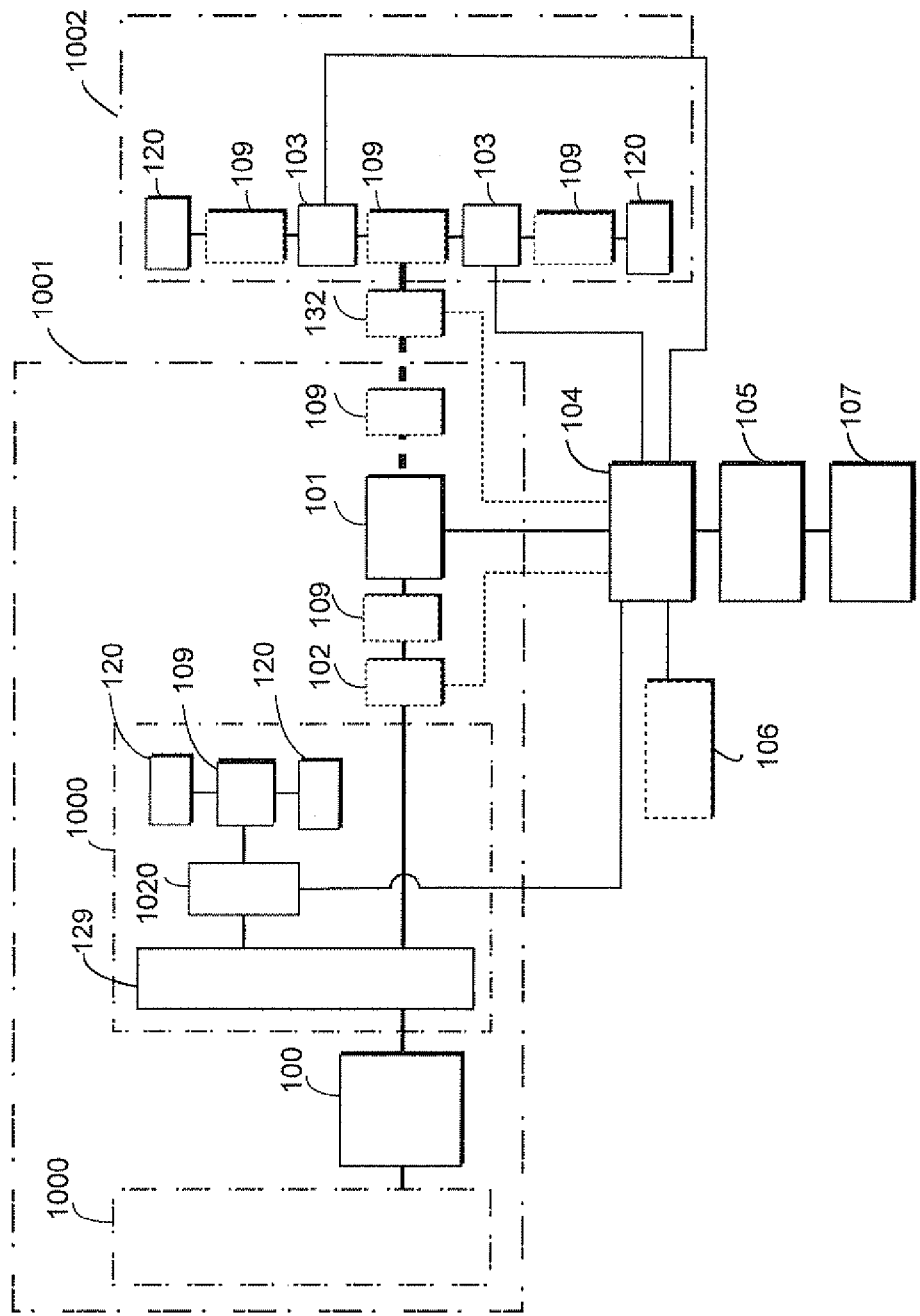
FIG. 39 is the sixth block diagram showing that a pilot drive unit is provided to the output terminal of the active rotational power source of the present invention.

FIG. 39 is the sixth block diagram showing that a pilot drive unit is provided to the output terminal of the active rotational power source of the present invention. In the preferred embodiment illustrated in FIG. 39, the controllable clutch 132 is installed between the rotary part of the first dynamo-electrical unit 101 and the rotary part of the second drive system 1002. The system essentially include the pilot drive unit 1000 comprised of the active rotational power source 100 that is coupled first to the transmission unit 129, the auxiliary clutch 1020, and a transmission unit 109 of the prior art optionally provided to drive the load 120. The clutch 1020 is provided to control the transmission status of the rotational kinetic energy between the active rotational power source 100 and the load 120 to the pilot drive unit 1000.

If the active rotational power source 100 is implemented with a multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The input terminal of the clutch 1020 in the pilot drive unit 1000 is coupled to the output terminal of the transmission unit 129 driven by the active rotational power source 100, or to another output terminal of the active rotational power source 100. As required, the transmission unit 109 coupled between the clutch 1020 and the load 120 may be comprised of the transmission unit 109 which provides the capability of controllable multistage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation.

Furthermore as required, the rotary part of the first dynamo-electrical unit 101 adapted to the first drive system 1001, or that of the optionally provided transmission unit 109 coupled to the first drive system 1001 is coupled to the input terminal of the clutch 132 while the output terminal of the clutch 132 is coupled to two rotary parts of both second dynamo-electrical units 103 serving as the power source for the second drive unit 1002, or coupled to the input terminal of the differential transmission unit 109 operationally adapted to the second drive system 1002. With the two differential output terminals of the differential transmission unit 109 coupled to rotary parts of multiple second dynamo-electrical units 103, the transmission status of the rotational kinetic energy between the first drive system 1001 and the second drive system 1002 is controlled through the clutch 132.

If multiple loads are provided to the pilot drive unit 1000 or to the second drive system 1002 and a differential operation function is required among the loads 120, the transmission unit 109 coupled between the clutch 1020 of the pilot drive unit 1000 and the load 120 may be provided with the capability of controllable multistage transmission, reversing or idling functions; or may be further provided in a construction of a transmission unit that is provided with multiple output shafts with the capability of controllable multistage transmission, reversing or idling functions for differential transmission output so to drive each load 120 coupled to the differential output terminals.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

The differential transmission unit 109 is provided to the second drive system 1002 to be driven by the clutch 132. Both output terminals of the differential transmission unit 109 are respectively coupled to the rotary parts from multiple second dynamo-electrical units 103. As required, the differential transmission unit 109 may be provided with controllable multistage transmission, continuously variable transmission, reversing or idling function, and multiple shafts output for the operation of differential output to drive the loads 120 respectively adapted to each differential output terminal for differential operation.

While being incorporated to the first drive system 1001, the clutch 102 coupled to the output terminal of the active rotational power source 100 through the transmission unit 129 and the clutch 132, the optionally provided transmission unit 109 and the clutch 132 and the first dynamo-electrical unit 101 may be incorporated to the second drive system 1002 or standalone operating as required.

In the system illustrated in FIG. 39, while the clutch 132 disengaged, the primary operation of the active rotational power source 100 driving the pilot drive unit 1000 may further drive the first dynamo-electrical unit 101 by the active rotational power source 100 to operate as a generator with the generated power to drive multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy generated by the second dynamo-electrical unit 103 in the second drive system 1002 as driven by the power from the rechargeable device 106 drive the load jointly with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 to engage or disengaged state.

Figure 40:
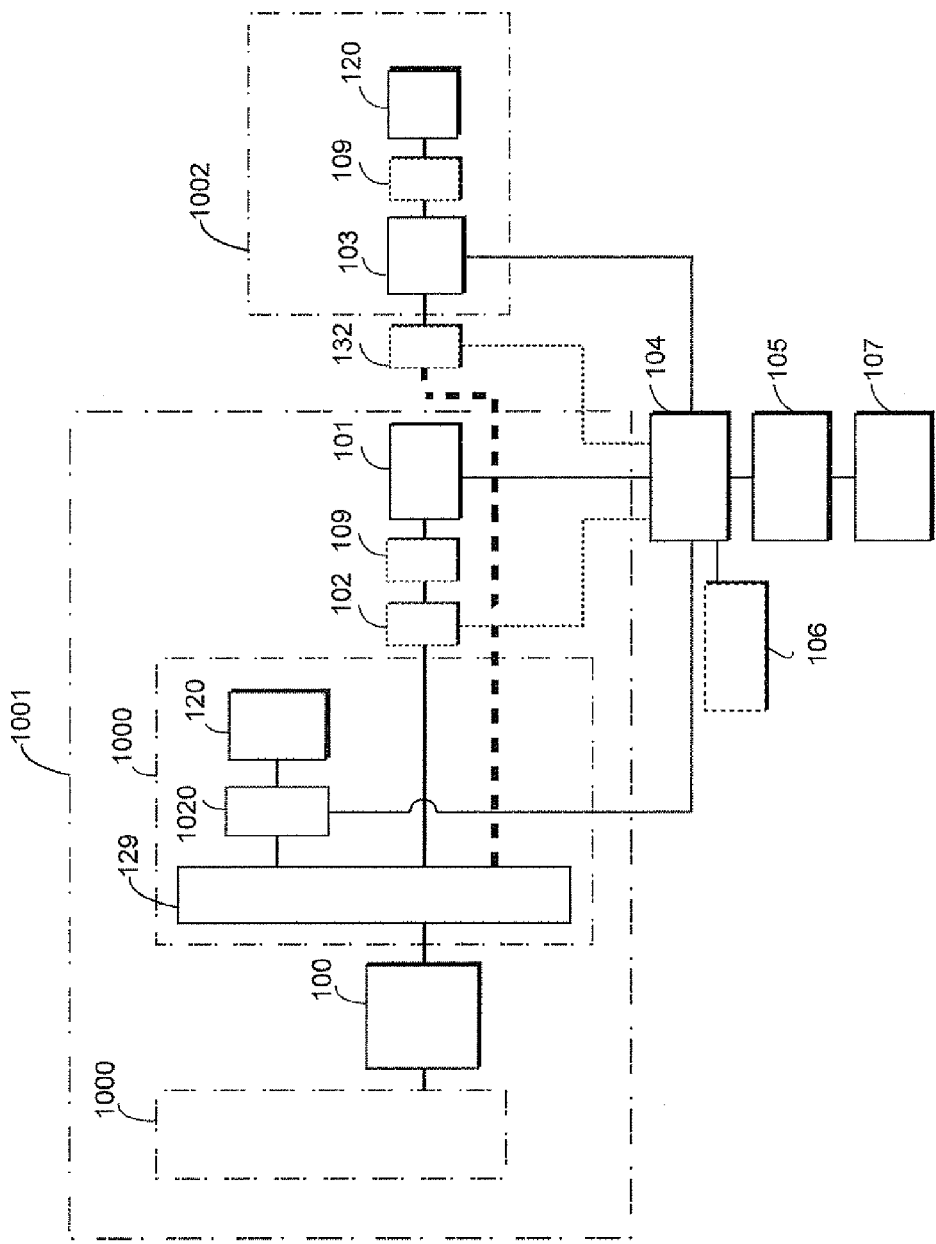
FIG. 40 is the seventh block diagram showing that a pilot drive unit is provided to the output terminal of the active rotational power source of the present invention.
Figure 41:
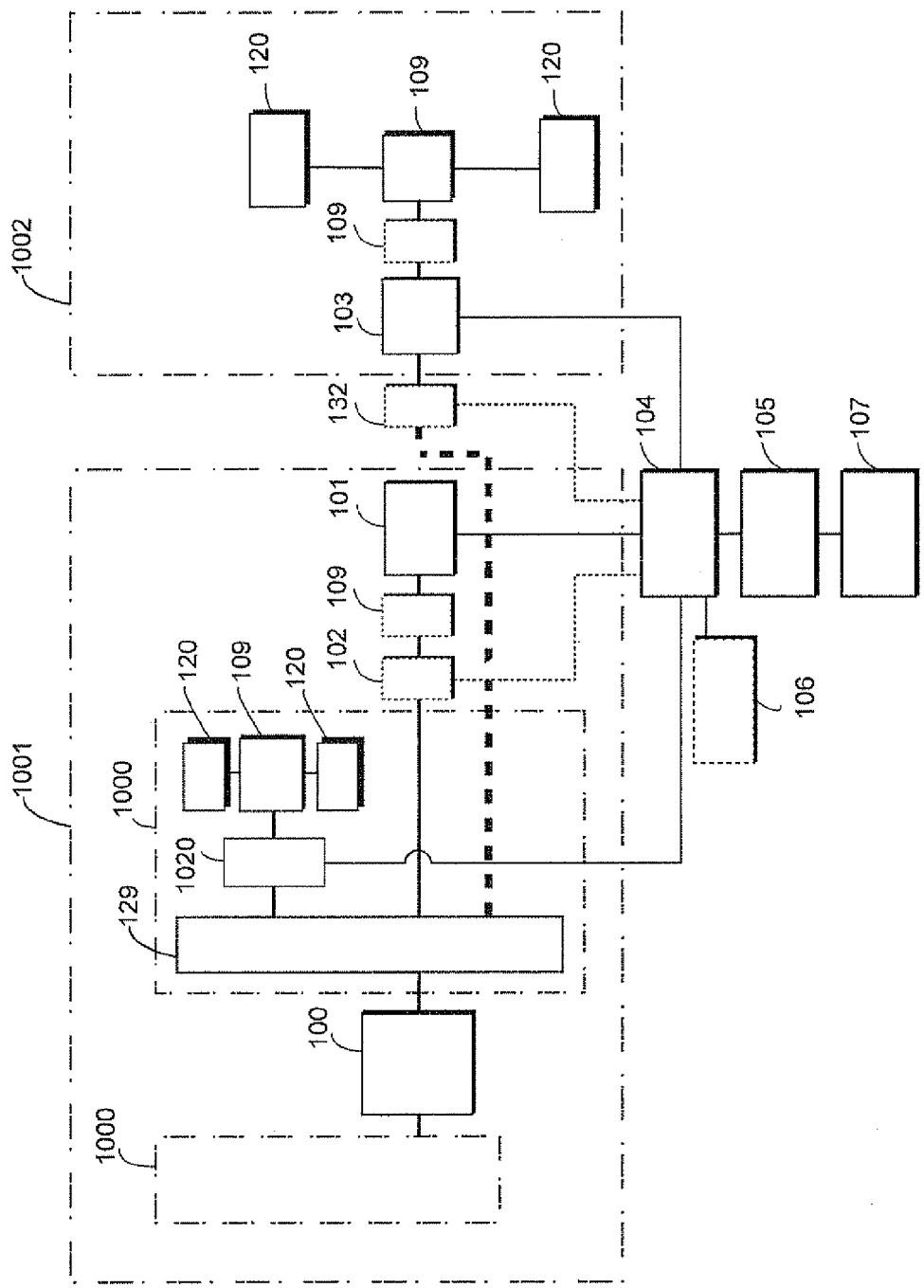
FIG. 41 is the eighty block diagram showing that a pilot drive unit is provided to the output terminal of the active rotational power source of the present invention.

FIG. 40 is the seventh block diagram showing the pilot drive unit provided to the output terminal of the active rotational power source of the present invention; and FIG. 41 is the eighth block diagram showing the pilot drive unit is provided to the output terminal of the active rotational power source of the present invention. Both preferred embodiments respectively illustrated in FIGS. 40 and 41, the controllable clutch 132 is installed between the transmission unit 129 coupled to the output terminal of the active rotational power source 100 and the rotary part of the second drive system 1002, and essentially include the pilot drive unit 1000 comprised of the rotational power source 100 that is coupled first to the transmission unit 129, the auxiliary clutch 1020, and a transmission unit 109 of the prior art optionally provided to drive the load 120. The clutch 1020 is provided to control the transmission status of the rotational kinetic energy between the active rotational power source 100 and the load 120 to the pilot drive unit 1000.

If the active rotational power source 100 is implemented with a multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled at where between the clutch 1020 and the load 120 may be comprised of the transmission unit 109 which provides the capability of controllable multistage transmission, continuously variable transmission, reversing or idling function as illustrated in FIG. 40 or may be comprised of the transmission unit 109 which provides the capability of controllable multistage transmission, continuously variable transmission, reversing or idling function and multiple shafts for the operation of differential output to drive the loads 120 respectively adapted to each differential output terminal for executing the differential operation as illustrated in FIG. 41

Furthermore, as required, the transmission unit 129 coupled to the output terminal of the active rotational power source 100 adapted to the first drive system 1001 is coupled to the input terminal of the clutch 132 while the output terminal of the clutch 132 is coupled to the rotary part of the second dynamo-electrical unit 103 serving as the power source for the second drive system 1002, or to the input terminal of the differential transmission unit 109 optionally provided in the second drive system 1002 to be coupled to the rotary part of the second dynamo-electrical unit 103. Both differential output terminals of the differential transmission unit 109 are coupled to their respectively adapted loads 120 for the control of the transmission status of the rotational kinetic energy between the first drive system 1001 and the second drive system 1002 through the control by the clutch 132.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

In the second drive system 1002, the transmission unit 109 driven by the second dynamo-electrical unit 103 may be provided in the form of the transmission unit 109 which provides the capability of controllable multistage transmission, continuously variable transmission, reversing or idling function as illustrated in FIG. 40 to drive the load 120, or in the form of the transmission unit 109 which provides the capability of controllable multistage transmission, continuously variable transmission, reversing or idling function and multiple shafts for the operation of differential output to drive the loads 120 respectively adapted to each differential output terminal for executing the differential operation as illustrated in FIG. 41.

While being incorporated to the first drive system 1001, the clutch 102 coupled to the output terminal of the active rotational power source 100 through the transmission unit 129, the optionally provided transmission unit 109 and the first dynamo-electrical unit 101 may be incorporated to the second drive system 1002 or provided standalone operation as required.

In the system respectively illustrated in FIGS. 40 and 41, while driving the pilot drive unit 1000, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy produced by the second dynamo-electrical unit 103 in the second drive system 1002 as driven by the power from the rechargeable device 106 and that from the active rotational power source 100 jointly drive the load.

The regenerated power of feedback braking regeneration power by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 to engage or disengage status to perform the System Functions 1 through 80.

Figure 42:
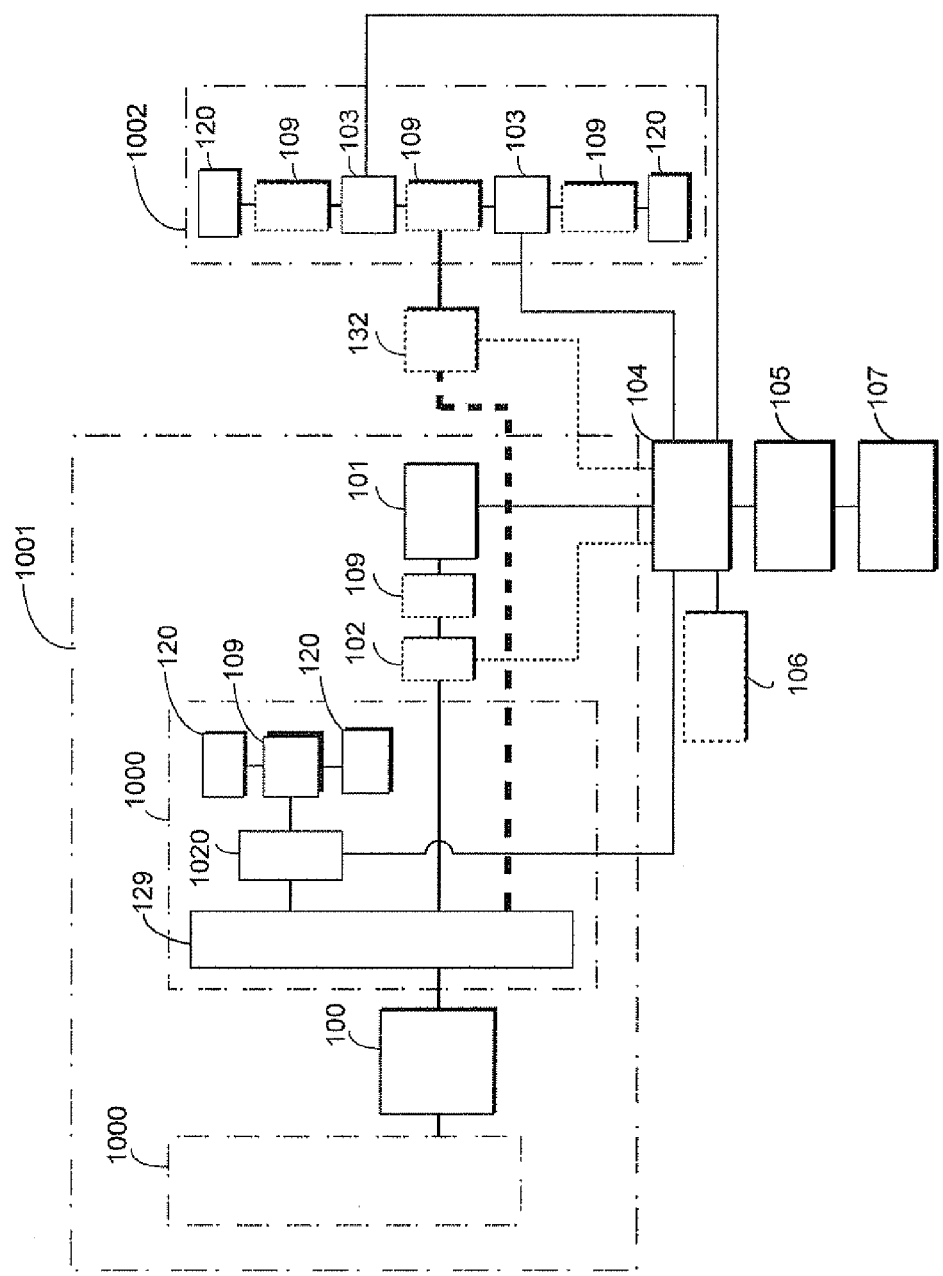
FIG. 42 is the ninth block diagram showing that a pilot drive unit is provided to the output terminal of the active rotational power source of the present invention.

FIG. 42 is the ninth block diagram showing that the pilot drive unit is provided to the output terminal of the active rotational power source of the present invention. Wherein, the controllable clutch 132 is installed between the transmission unit 129 coupled to the output terminal of the active rotational power source 100 and the rotary part of the second drive system 1002, and essentially include the pilot drive unit 1000 comprised of having first coupled the transmission unit 129, the auxiliary clutch 1020 and the transmission unit 109 of the prior art optionally provided to drive the load 120. The clutch 1020 is provided to regulate the transmission status of the rotational kinetic energy between the active rotational power source 100 and the load 120 to the pilot drive unit 1000.

If the active rotational power source 100 is implemented with a multi-shaft output, the pilot drive unit 1000 may be optionally provided to any other output terminal of the active rotational power source 100. The clutch 102 and the transmission unit 109 are optionally provided to the same output terminal or different output terminals of the active rotational power source 100 to drive the first dynamo-electrical unit 101 to constitute the first drive system 1001 with the pilot drive unit 1000.

The input terminal of the clutch 1020 in the pilot drive unit 1000 is coupled to the output terminal of the transmission unit 129 driven by the active rotational power source 100, or to another output terminal of the active rotational power source 100. As required, the transmission unit 109 coupled between the clutch 1020 and the load 120 may be comprised of the transmission unit 109 which provides the capability of controllable multistage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation.

Furthermore, as required, the transmission unit 129 coupled to the output terminal of the active rotational power source 100 adapted to the first drive system 1001 is coupled to the input terminal of the clutch 132 while the output terminal of the clutch 132 is coupled to the rotary parts of both second dynamo-electrical units 103, or to the input terminal of the differential transmission unit 109 optionally adapted to the second drive system 1002. With two differential output terminals of the differential transmission unit 109 coupled to rotary parts of multiple second dynamo-electrical units 103, the transmission status of the rotational kinetic energy between the first drive system 1001 and the second drive system 1002 is regulated through the clutch 132.

If multiple loads are provided to the pilot drive unit 1000 or to the second drive system 1002 and a differential operation function is required among the loads 120, the transmission unit 109 coupled between the clutch 1020 of the pilot drive unit 1000 and the load 120 may be provided in the construction of a transmission unit which provides the capability of controllable transmission, reversing or idling functions; or may be further provided in a construction of the transmission unit 109 that is provided with multiple shafts for executing differential transmission output so to drive each load 120 coupled to the differential output terminal to execute the differential operation.

The second drive system 1002 with the second dynamo-electrical unit 103 as the power source is coupled to the transmission unit 109 of the prior art optionally provided for driving one or multiple loads 120 adapted to the transmission unit 109 to constitute the second drive system 1002.

The differential transmission unit 109 is provided to the second drive system 1002 to be driven by the clutch 132. Both output terminals of the differential transmission unit 109 are respectively coupled to the rotary parts from multiple second dynamo-electrical units 103. As required, the differential transmission unit 109 may be provided with controllable multistage transmission, continuously variable transmission, reversing or idling function, and multiple shafts for the operation of differential output to drive the loads 120 respectively adapted to each differential output terminal for differential operation.

While being incorporated to the first drive system 1001, the clutch 102 coupled to the out put end of the active rotational power source 100 through the transmission unit 129, the optionally provided transmission unit 109 and the clutch 132 and the first dynamo-electrical unit 101 may be incorporated to the second drive system 1002 or provided standing alone as required.

In the system illustrated in FIG. 42, while the clutch 132 disengaged, the primary operation of the active rotational power source 100 driving the pilot drive unit 1000 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator to recharge the rechargeable device 106 or to supply power to other electrical power driven load 130 (including any externally connected unspecified load).

When the first dynamo-electrical unit 101 operates as a generator, the generated power and the power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to generate the rotational kinetic energy for driving the load; or the rotational kinetic energy produced by the second dynamo-electrical unit 103 in the second drive system 1002 as driven by the power from the rechargeable device 106 jointly drive the load 120 with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is controlled by switching the clutch 132 to engage or disengage state for the system to operating with those System Functions 1 through 80.

Figure 43:
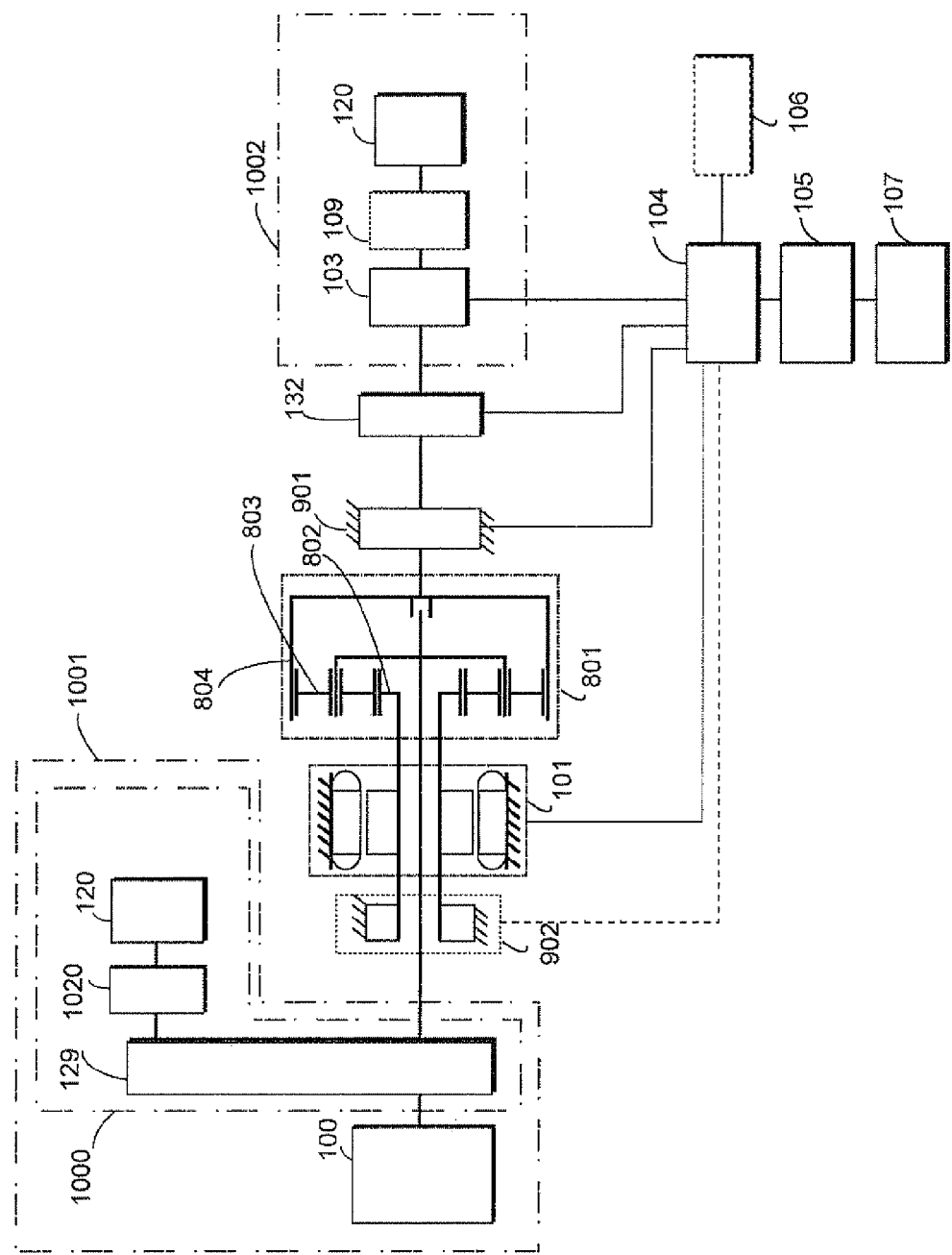
FIG. 43 is the tenth block diagram showing that a pilot drive unit is provided to the output terminal of the active rotational power source of the present invention.
Figure 44:
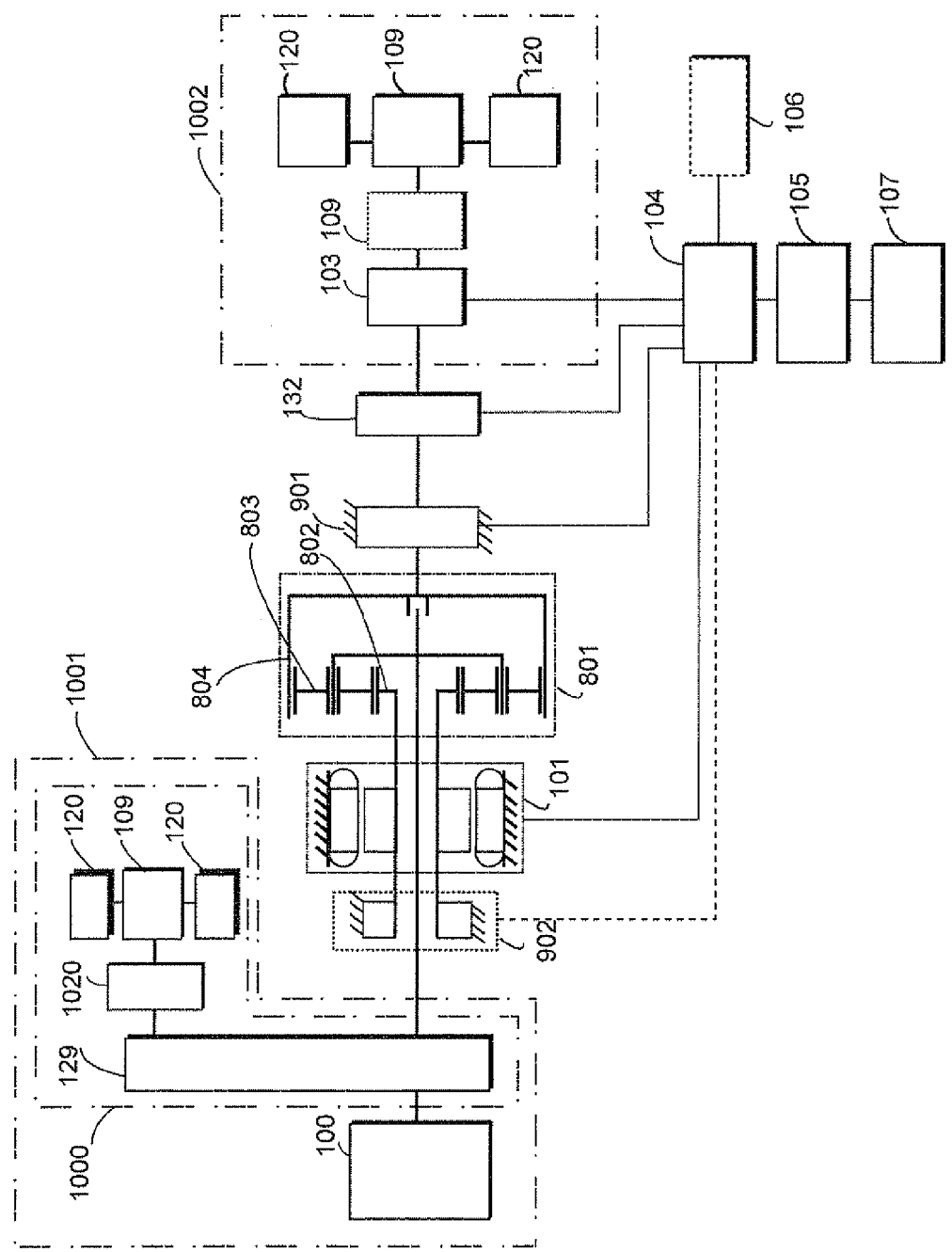
FIG. 44 is the eleventh block diagram showing that a pilot drive unit is provided to the output terminal of the active rotational power source of the present invention.

FIG. 43 is the tenth block diagram showing that a pilot drive unit is provided to the output terminal of the active rotational power source of the present invention; and FIG. 44 is the eleventh block diagram showing that a pilot drive unit is provided to the output terminal of the active rotational power source of the present invention. Both preferred embodiments respectively illustrated in FIGS. 43 and 44 are each comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled between the clutch 1020 and the load 120 may be comprised of the transmission unit 109 which provides the capability of controllable multistage transmission, continuously variable transmission, reversing or idling function as illustrated in FIG. 43 or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation as illustrated in FIG. 44.

Another output terminal of the transmission unit 129 is provided to drive the planet gear 803 of the planetary gear set 801. The rotary part of the first dynamo-electrical unit 101 is coupled to the sun gear 802 of the planetary gear set 801. The operation between the rotary part and the stationary part of the first dynamo-electrical unit 101 as required may function as a motor under the regulation of the drive control unit 104 to output the rotational kinetic energy, or as a generator to produce damping while generating the power for the damping to make the rotational kinetic energy from the active rotational power source 100 to be routed to the external gear 804, or under the regulation of the drive control unit 104 to control the electromagnetic lock up operation between the stationary part and the rotary part of the first dynamo-electrical unit 101. The EM lockup function may be replaced by the brake 902 when required with the rotary part of the first dynamo-electrical unit 101 coupled to the rotation side of the brake 902 and the stationary part of the brake 902 locked to the frame or to the stationary part of the first dynamo-electrical unit 101 for locking up the first dynamo-electrical unit 101 and routing the rotational kinetic energy from the active rotational power source 100 to be transfer through the external gear 804.

To compromise the operation of the system, the brake 901 is required for the active rotational power source 100 to drive the first dynamo-electrical unit 101 to operate as a generator. The external gear 804 of the planetary gear set 801 is coupled to the input terminal of the clutch 132 and coupled to the rotation side of the brake 901; the stationary part of the brake 901 is locked to the frame; and another end of the clutch 132 is coupled to the rotary part of the second dynamo-electrical unit 103 in the second drive system 1002, or to the input terminal of the optionally provided transmission unit 109 in the second drive system 1002. The optionally provided clutch 132 controls the transmission of the rotational kinetic energy between the first drive unit 1001 and the second drive unit 1002 while the clutch 132 and the brake 901 may be split installed or share the compact structure.

The second drive system 1002 as illustrated in FIG. 43 is comprised of the second dynamo-electrical unit 103 serving as the power source coupled to the optionally provided transmission unit 109 or any other transmission device to drive one or multiple load 120; or as illustrated in FIG. 44, the rotary part of the second dynamo-electrical unit 103 as required is coupled to the input terminal of the differential transmission unit 109, and both differential output terminals of the differential transmission unit 109 drive their respectively adapted loads 120.

As required by the construction, the planetary gear set 801, the first dynamo-electrical unit 101, the brake 902, the brake 901, and the clutch 132 may be incorporated to the first drive system 1001, or to the second drive system 1002 or provided standing alone.

In the system respectively illustrated in FIGS. 43 and 44, while driving the pilot drive unit 1000, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator with the power generated to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy produced by the second dynamo-electrical unit 103 in the second drive system 1002 as driven by the power from the rechargeable device 106 jointly drive the load 120 with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is controlled by switching the clutch 132 to engage or disengage state for the system to operating with those System Functions 1 through 80.

Figure 45:
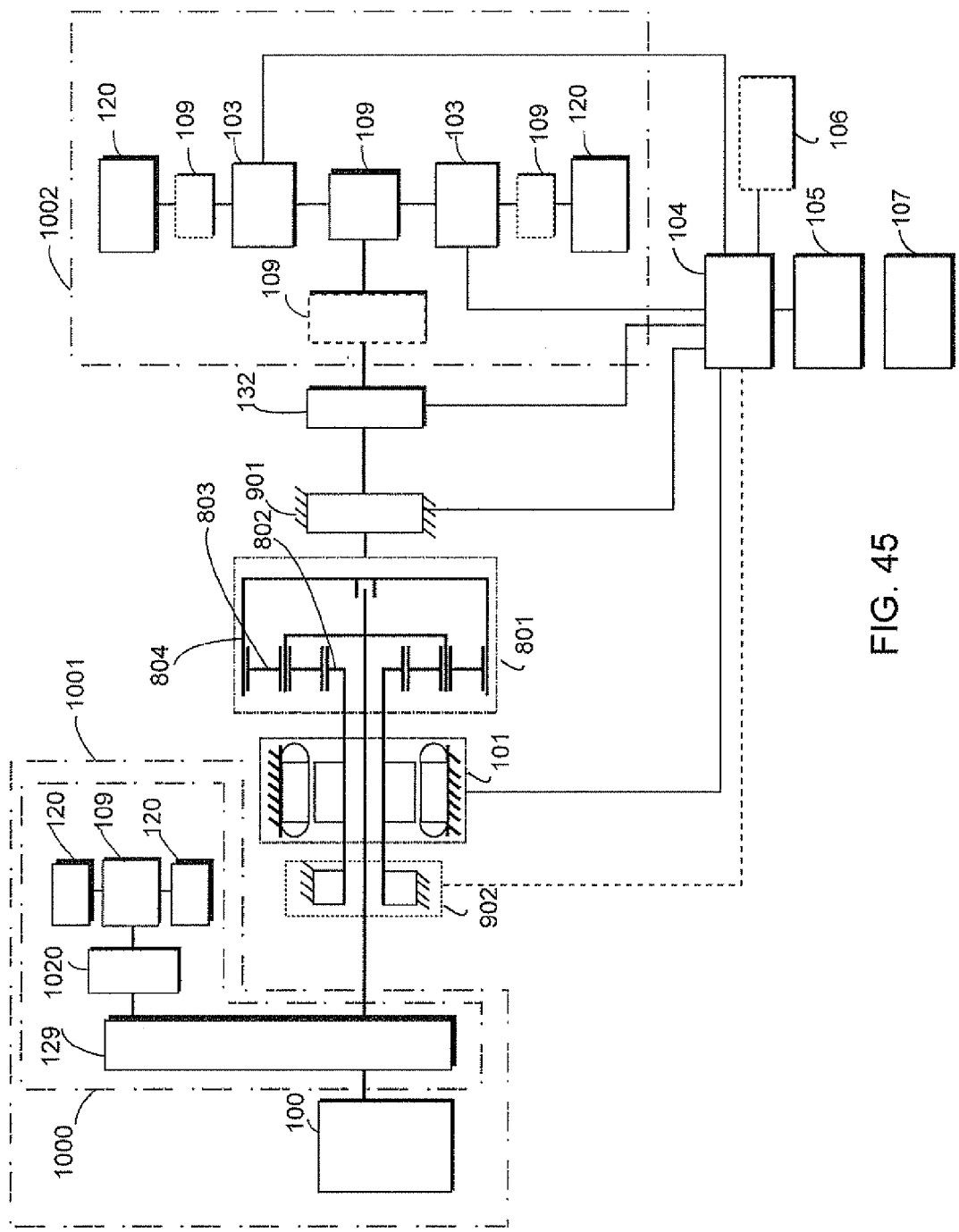
FIG. 45 is the twelfth block diagram showing that a pilot drive unit is provided to the output terminal of the active rotational power source of the present invention.

FIG. 45 is the twelfth block diagram showing that a pilot drive unit is provided to the output terminal of the active rotational power source of the present invention. The preferred embodiment illustrated in FIG. 45 is comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled between the clutch 1020 and the load 120 may be comprised of the transmission unit 109 which provides the capability of controllable multi-stage transmission, continuously variable transmission, reversing or idling function, or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation.

Another output terminal of the transmission unit 129 is provided to drive the planet gear 803 of the planetary gear set 801. The rotary part of the first dynamo-electrical unit 101 is coupled to the sun gear 802 of the planetary gear set 801. The operation between the rotary part and the stationary part of the first dynamo-electrical unit 101 as required may function as a motor under the regulation of the drive control unit 104 to output the rotational kinetic energy, or as a generator to produce damping while generating the power for the damping to make the rotational kinetic energy from the active rotational power source 100 to be transferred from the external gear 804, or under the regulation of the drive control unit 104 for electromagnetic lock up operation between the stationary part and the rotary part of the first dynamo-electrical unit 101. As required, the EM lockup function may be replaced by the brake 902 with the rotary part of the first dynamo-electrical unit 101 coupled to the rotation side of the brake 902 and the stationary part of the brake 902 locked to the frame or to the stationary part of the first dynamo-electrical unit 101 for locking up the first dynamo-electrical unit 101 and routing the rotational kinetic energy from the active rotational power source 100 to be transferred through the external gear 804.

To compromise the operation of the system, the brake 901 is required for the active rotational power source 100 to drive the first dynamo-electrical unit 101 to operate as a generator. The external gear 804 of the planetary gear set 801 is coupled to the input terminal of the clutch 112 and coupled to the rotation side of the brake 901; the stationary part of the brake 901 is locked to the frame; and another end of the clutch 132 is coupled to the rotary part of the second dynamo-electrical unit 103 in the second drive system 1002, or to the input terminal of the optionally provided transmission unit 109 in the second drive system 1002. The optionally provided clutch 132 regulates the transmission of the rotational kinetic energy between the first drive unit 1001 and the second drive unit 1002 while the clutch 132 and the brake 901 may be split installed or share common structure.

The second drive system 1002 as illustrated in FIG. 45 is comprised of multiple second dynamo-electrical units 103 serving as the power source respectively coupled to the optionally provided transmission unit 109 or any other transmission device their respectively coupled loads 120.

As required by the construction, the planetary gear set 801, the first dynamo-electrical unit 101, the brake 902, the brake 901, and the clutch 132 may be incorporated to the first drive system 1001, or to the second drive system 1002 or provide standalone operation.

In the system respectively illustrated in FIG. 45, while driving the pilot drive unit 1000, with the clutch 132 disengaged, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator with the generated power to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load 120; or the rotational kinetic energy produced by the second dynamo-electrical unit 103 in the second drive system 1002 as driven by the power from the rechargeable device 106 jointly drive the load 120 with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is controlled by switching the clutch 132 to engaged or disengage to perform System Functions 1 through 80.

Figure 46:
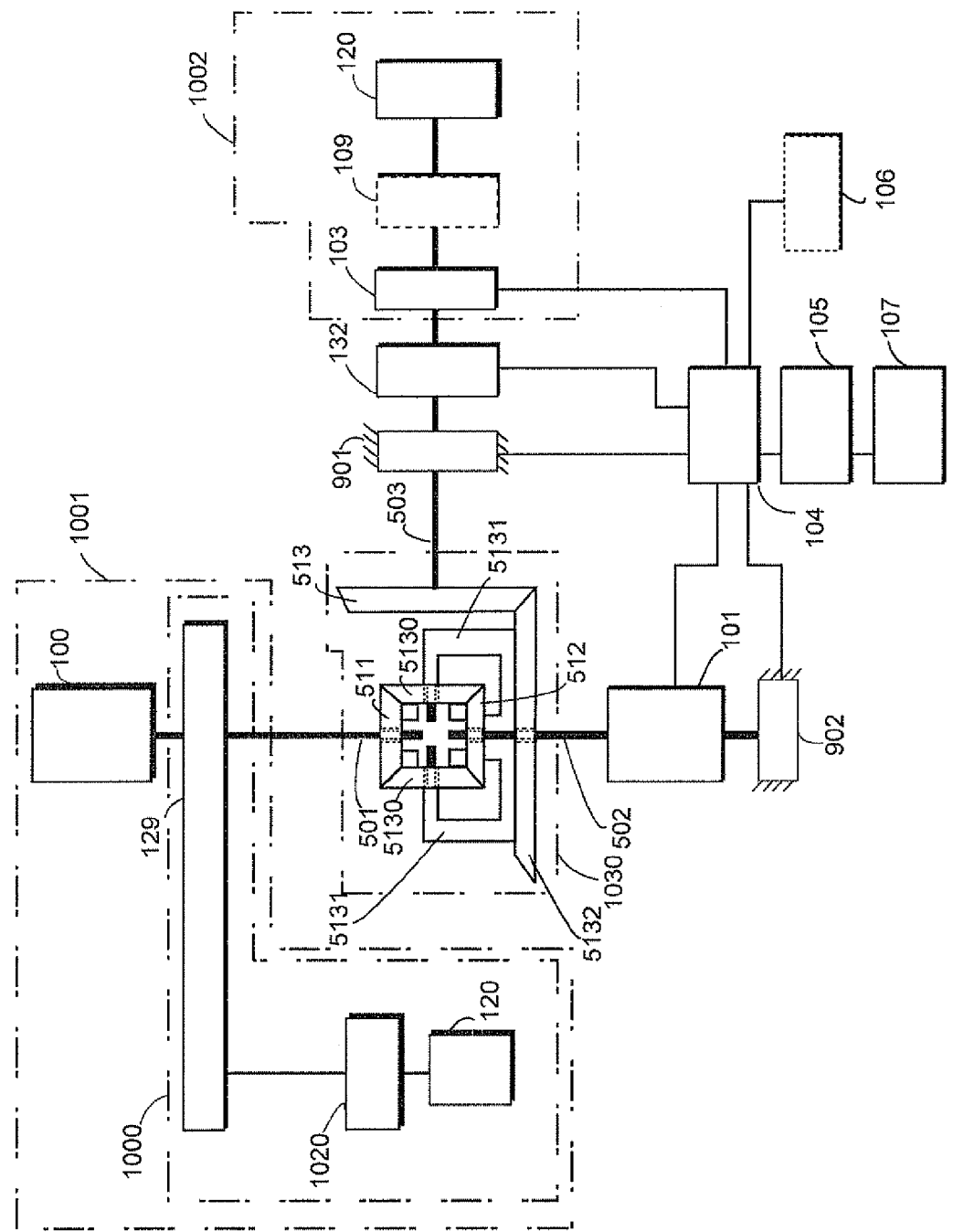
FIG. 46 is the thirteenth block diagram showing that a pilot drive unit is provided to the output terminal of the active rotational power source of the present invention.
Figure 47:
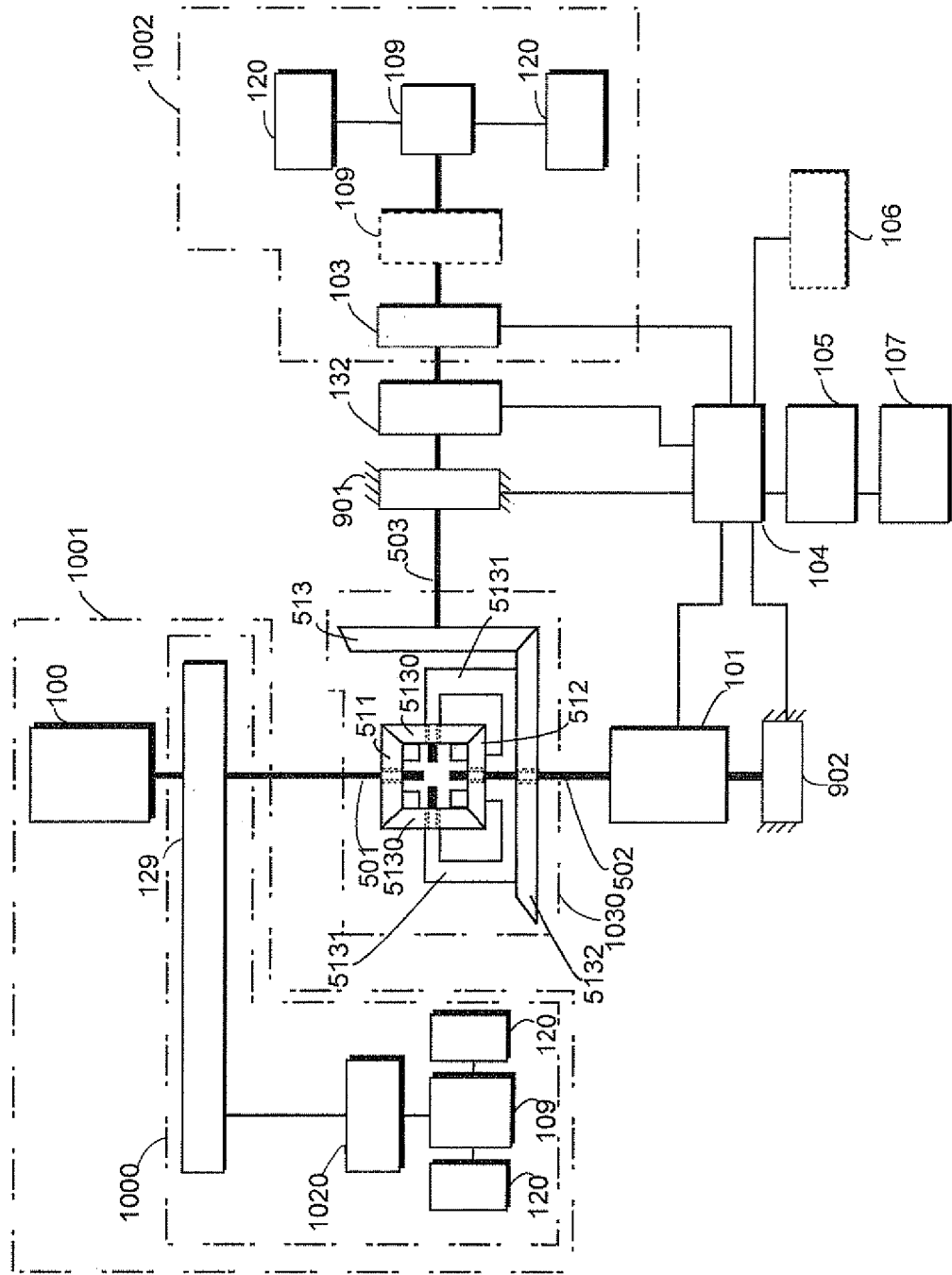
FIG. 47 is the fourteenth block diagram showing that a pilot drive unit is provided to the output terminal of the active rotational power source of the present invention.

FIG. 46 is the thirteenth block diagram showing that a pilot drive unit is provided to the output terminal of the active rotational power source of the present invention; and FIG. 47 is the fourteenth block diagram showing that a pilot drive unit is provided to the output terminal of the active rotational power source of the present invention. Both preferred embodiments respectively illustrated in FIGS. 46 and 47 are each comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled between the clutch 1020 and the load 120 may be comprised of the transmission unit 109 which provides the capability of controllable multistage transmission, continuously variable transmission, reversing or idling function as illustrated in FIG. 46 or may be comprised of the transmission unit 109 which provides the capability of controllable multistage transmission, continuously variable transmission, reversing or idling function and multiple shafts for the operation of differential output to drive the loads 120 respectively adapted to each differential output terminal for executing the differential operation as illustrated in FIG. 47.

Among the three input and output terminals of the rotational gear set 1030, the first input and output terminal 501 is coupled to the first input and output gear set 511, and to another output terminal of the additionally provided transmission unit 129. The second input and output terminal 502 is coupled to the first dynamo-electrical unit 101, the brake 902 and the second input and output gear set 512. Both of the first and the second input and output gear sets 511, 512 are coupled to the differential gear set 5130 for a rotary arm 5131 to draw the differential output gear set 5132 and the third input and output gear set 513 for the third input and output gear set 513 to drive the third input and output terminal 503 and the rotary part of the brake 901 and the input terminal of the clutch 132. The stationary part of the brake 901 is locked to the frame and another end of the clutch 132 is coupled to the rotary part of the second dynamo-electrical unit 103 adapted to the second drive system 1002, or to the input terminal of the optionally provided transmission unit 109. The optionally provided clutch 132 regulates the transmission of the rotational kinetic energy between the first drive system 1001 and the second drive system 1002. The clutch 132 and the brake 901 may be split installed or share the common structure.

The second drive system 1002 is comprised with the second dynamo-electrical unit 103 as the power source as illustrated in FIG. 46 to be coupled to the optionally provided transmission unit 109 or any other transmission device to drive one or multiple load 120; or as illustrated in FIG. 47, with the rotary part of the optionally provided second dynamo-electrical unit 103 to be coupled to the input terminal of the differential transmission unit 109 for both differential output terminals of the differential transmission unit 109 to drive their respectively adapted loads 120.

As required by the construction, the rotational gear set 1030, the first dynamo-electrical unit 101, the brake 902, the brake 901, and the clutch 132 may be incorporated to the first drive system 1001, or to the second drive system 1002 or providing standalone operation.

In the system respectively illustrated in FIGS. 46 and 47, while driving the pilot drive unit 1000, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator with the power generated to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy produced by the second dynamo-electrical unit 103 in the second drive system 1002 as driven by the power from the rechargeable device 106 jointly drive the load with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 between engage or disengage to perform System Functions 1 through 80.

Figure 48:
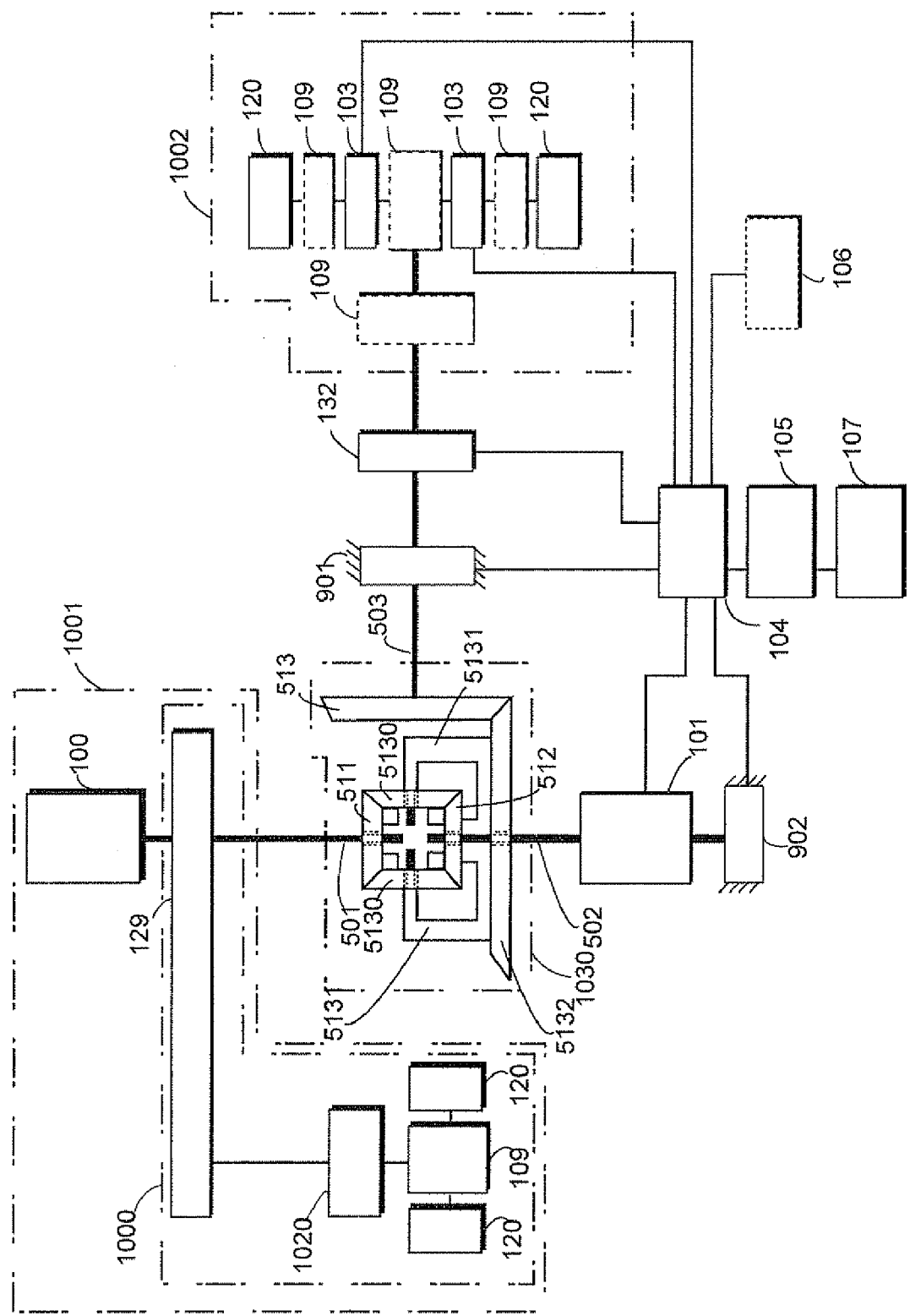
FIG. 48 is the fifteenth block diagram showing that a pilot drive unit is provided to the output terminal of the active rotational power source of the present invention.

FIG. 48 is the fifteenth block diagram showing that a pilot drive unit is provided to the output terminal of the active rotational power source of the present invention. The preferred embodiment illustrated in FIG. 48 is comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled between the clutch 1020 and the load 120 may be comprised of the transmission unit 109 which provides the capability of controllable multistage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation Among the three input and output terminals of the rotational gear set 1030, the first input and output terminal 501 is coupled to the first input and output gear set 511, and to another output terminal of the additionally provided transmission unit 129. The second input and output terminal 502 is coupled to the first dynamo-electrical unit 101, the brake 902 and the second input and output gear set 512. Both of the first and the second input and output gear sets 511, 512 are coupled to the differential gear set 5130 for a rotary arm 5131 to draw the differential output gear set 5132 and the third input and output gear set 513 for the third input and output gear set 513 to drive the third input and output terminal 503 and the rotary part of the brake 901 and the input terminal of the clutch 132. The stationary part of the brake 901 is locked to the frame and another end of the clutch 132 is coupled to the rotary part of the second dynamo-electrical unit 103 adapted to the second drive system 1002, or to the input terminal of the optionally provided transmission unit 109. The optionally provided clutch 132 controls the transmission of the rotational kinetic energy between the first drive system 1001 and the second drive system 1002. The clutch 132 and the brake 901 may be split installed or share common structure.

The second drive system 1002 with multiple second dynamo-electrical units 103 as the power source is coupled to the individual optionally provided transmission unit 109 or any other transmission device for driving their respectively adapted loads 120.

The rotational gear set 1030, the first dynamo-electrical unit 101, the brake 902, the brake 901, and the clutch 132 may be incorporated to the first drive system 1001, or to the second drive system 1002 or providing standalone operation as required.

In the system illustrated in FIG. 48, while driving the pilot drive unit 1000, the primary operation of the active rotational power source 100 with the clutch 132 is disengaged may further drive the first dynamo-electrical unit 101 by the active rotational power source 100 to operate as a generator with the power generated to drive two or multiple second dynamo-electrical units 103 in the second drive system 1002 to generate the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator with the power generated to recharge the rechargeable device 106 or to supply power to other electrical power driven load 130 (including any externally connected unspecified load).

When the first dynamo-electrical unit 101 operates as a generator, the generated power and power from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load 120; or the rotational kinetic energy produced by the second dynamo-electrical unit 103 in the second drive system 1002 as driven by the power from the rechargeable device 106 drive the load 120 jointly with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 to engaged or disengaged status to perform the System Functions 1 through 80.

Figure 49:
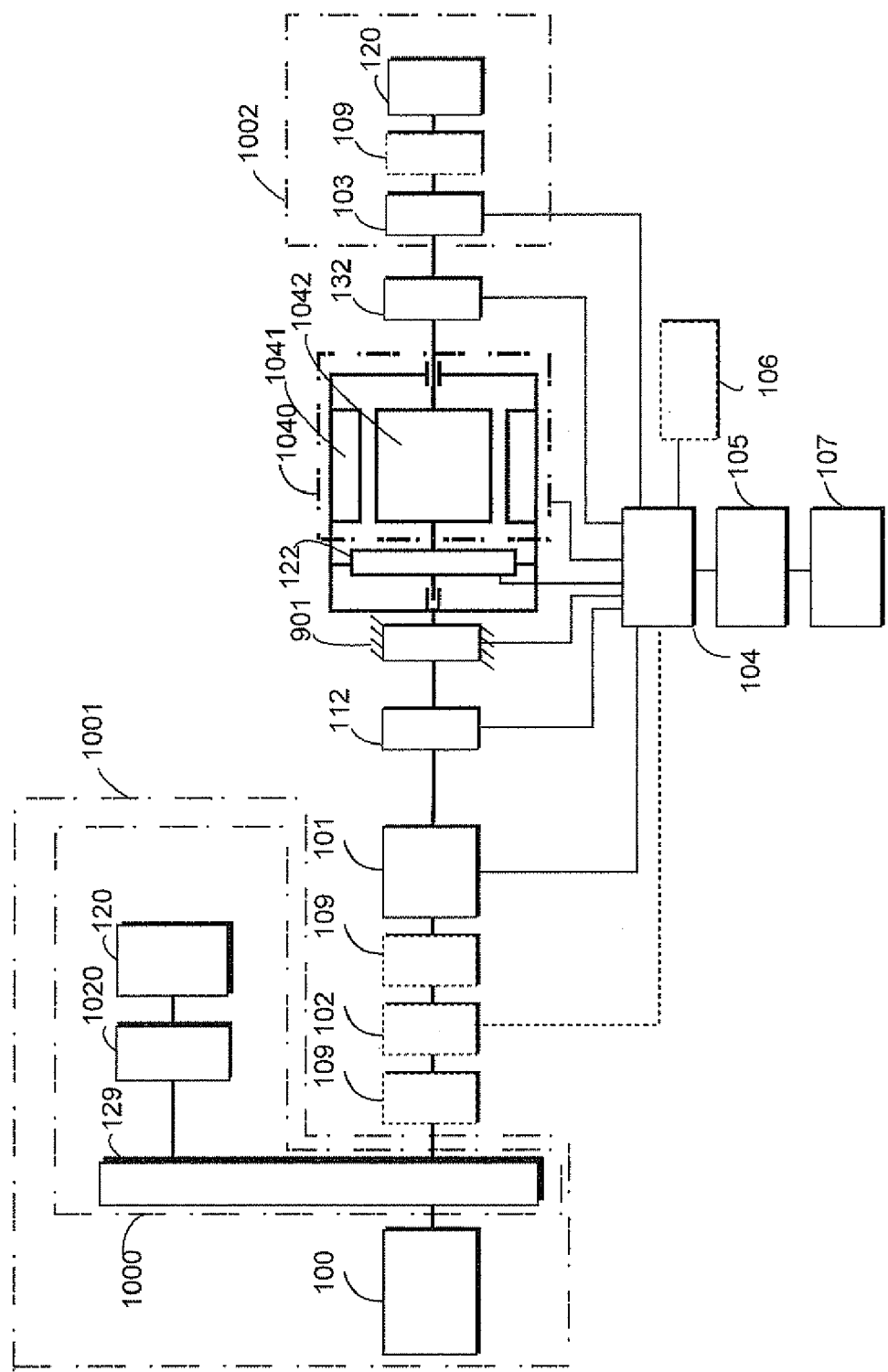
FIG. 49 is the sixteenth block diagram showing that a pilot drive unit is provided to the output terminal of the active rotational power source of the present invention.
Figure 50:
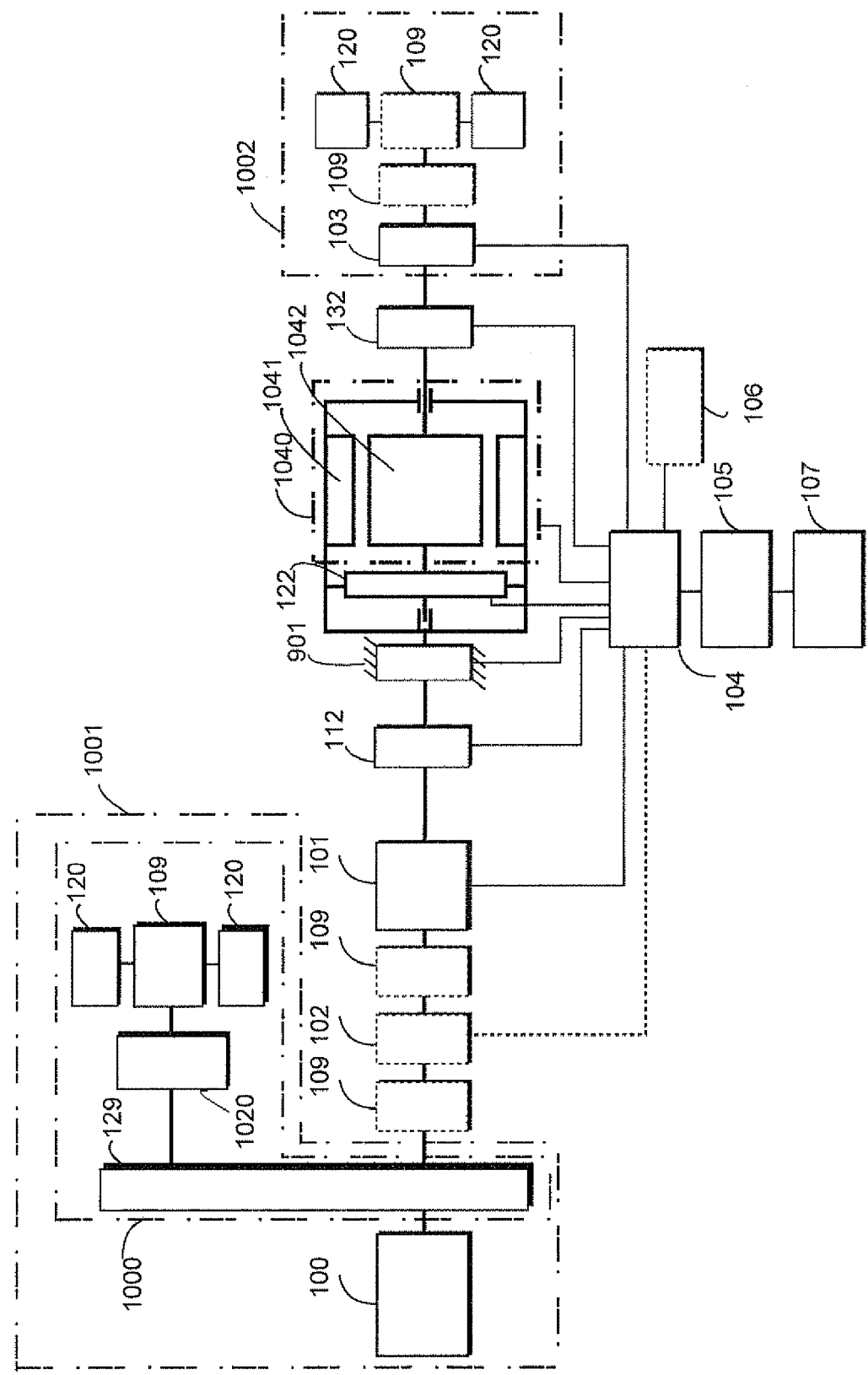
FIG. 50 is the seventeenth block diagram showing that a pilot drive unit is provided to the output terminal of the active rotational power source of the present invention.

FIG. 49 is the sixteenth block diagram showing that a pilot drive unit is provided to the output terminal of the active rotational power source of the present invention; and FIG. 50 is the seventeenth block diagram showing that a pilot drive unit is provided to the output terminal of the active rotational power source of the present invention. Both preferred embodiments respectively illustrated in FIGS. 49 and 50 are each comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled between the clutch 1020 and the load 120 may be comprised of the transmission unit 109 which provides the capability of controllable multi-stage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation Another output terminal of the transmission unit 129 drives the optionally provided clutch 102 and the transmission unit 109 coupled to the transmission unit 129 for driving the rotary part of the first dynamo-electrical unit 101. In the first drive system 1001, a dual motion dynamo-electrical unit 1040 made in the form of AC or DC, brush or brushless, synchronous or asynchronous is provided. The dual motion dynamo-electrical unit 1040 made in a cylinder, disk or cone shape is comprised of a first rotary part 1041 and a second rotary part 1042 with a controllable clutch 122 installed between the first and the second rotary parts 1041, 1042. The first rotary part 1041 is coupled to that of the brake 901, and further to that of the first dynamo-electrical unit 101 through the clutch 112. The stationary part of the brake 901 is locked to the frame. The second rotary part 1042 of the dual motion dynamo-electrical unit 1040 is coupled to the input terminal of the clutch 132 and another end of the clutch 132 is coupled to the rotary part of the second dynamo-electrical unit 103 adapted to the second drive system 1002, or coupled to the input terminal of the optionally provided transmission unit 109 adapted to the second drive system 1002. The clutch 132 is provided for the control of the transmission of the rotational kinetic energy between the first drive system 1001 and the second drive system 1002.

The second drive system 1002 is comprised with the second dynamo-electrical unit 103 as the power source as illustrated in FIG. 49 to be coupled to the optionally provided transmission unit 109 or any other transmission device to drive one or multiple load 120; or as illustrated in FIG. 50, having the rotary part of the optionally provided second dynamo-electrical unit 103 to be coupled to the input terminal of the differential transmission unit 109 for both differential output terminals of the differential transmission unit 109 to drive their respectively adapted loads 120.

As required by the construction, the clutch 102, the transmission unit 109, the first dynamo-electrical unit 101, the clutch 112, the brake 901, the dual motion dynamo-electrical unit 1040, the clutch 122, and the clutch 132 may be incorporated to the first drive system 1001, or to the second drive system 1002 or providing standalone operation.

In the system respectively illustrated in FIGS. 49 and 50, while driving the pilot drive unit 1000, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator with the power generated to recharge the rechargeable device 106 or to supply power to other electrical power driven load 130 (including any externally connected unspecified load).

When the first dynamo-electrical unit 101 operates as a generator, the power generated and that from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load; or the rotational kinetic energy produced by the second dynamo-electrical unit 103 in the second drive system 1002 as driven by the power from the rechargeable device 106 drive the load jointly with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 to be engaged or disengaged status to operate in System Functions 1 through 80.

Figure 51:
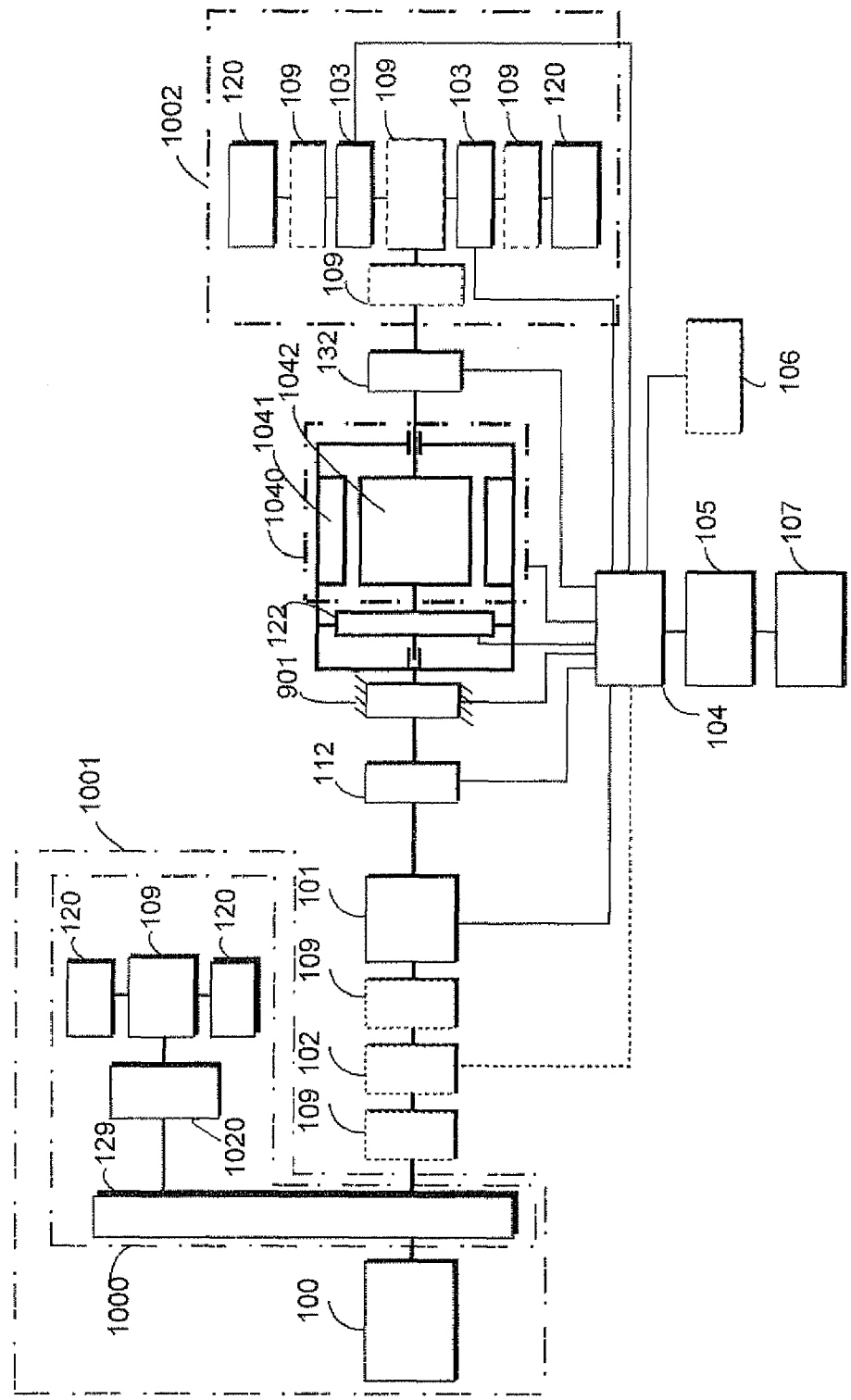
FIG. 51 is the eighteenth block diagram showing that a pilot drive unit is provided to the output terminal of the active rotational power source of the present invention.

FIG. 51 is the eighteenth block diagram showing that a pilot drive unit is provided to the output terminal of the active rotational power source of the present invention. The preferred embodiment illustrated in FIG. 51 is comprised of the first drive system 1001 and the second drive system 1002. The construction of the first drive system 1001 includes the pilot drive unit 1000 comprised with the output shaft of the active rotational power source 100 coupled to the additionally provided transmission unit 129, and further to the auxiliary clutch 1020 and the optionally provided transmission unit 109 of the prior art to drive the load 120, and the active rotational power source 100.

The input terminal of the clutch 1020 in the pilot drive unit 1000 is coupled to the output terminal of the transmission unit 129 driven by the active rotational power source 100, or to another output terminal of the active rotational power source 100. The transmission unit 109 coupled at where between the clutch 1020 and the load 120 may be comprised of the transmission unit 109 which provides the capability of controllable multistage transmission, continuously variable transmission, reversing or idling function or may be comprised of the transmission unit 109 which provides the capability of controllable multistage transmission, continuously variable transmission, reversing or idling function and multiple shafts for the operation of differential output to drive the loads 120 respectively adapted to each differential output terminal for differential operation.

Another output terminal of the transmission unit 129 drives the optionally provided clutch 102 and the transmission unit 109 coupled to the transmission unit 129 for driving the rotary part of the first dynamo-electrical unit 101. In the first drive system 1001, a dual motion dynamo-electrical unit 1040 made in the form of AC or DC, brush or brushless, synchronous or asynchronous is provided. The dual motion dynamo-electric unit 1040 made in a cylinder, disk or cone shape is comprised of a first rotary part 1041 and a second rotary part 1042 with a controllable clutch 122 installed between the first and the second rotary parts 1041, 1042. The first rotary part 1041 is coupled to that of the brake 901, and further to that of the first dynamo-electrical unit 101 through the clutch 112. The stationary part of the brake 901 is locked to the frame. The second rotary part 1042 of the dual motion dynamo-electrical unit 1040 is coupled to the input terminal of the clutch 132 and another end of the clutch 132 is coupled to the rotary part of the second dynamo-electrical unit 103 adapted to the second drive system 1002, or coupled to the input terminal of the optionally provided transmission unit 109 adapted to the second drive system 1002. The clutch 132 is provided for the control of the transmission of the rotational kinetic energy between the first drive system 1001 and the second drive system 1002.

The second drive system 1002 is comprised with multiple second dynamo-electrical units 103 as the power source respectively coupled to the optionally provided transmission unit 109 or any other transmission device to drive one or multiple load 120.

As required by the construction, the clutch 102, the transmission unit 109, the first dynamo-electrical unit 101, the clutch 112, the brake 901, the dual motion dynamo-electrical unit 1040, the clutch 122, and the clutch 132 may be incorporated to the first drive system 1001, or to the second drive system 1002 or providing standalone operation.

In the system illustrated in FIG. 51, while driving the pilot drive unit 1000 with the clutch 132 disengaged, the operation of the active rotational power source 100 may further drive the first dynamo-electrical unit 101 by the active rotational power source 100 to operate as a generator with the power generated to drive two or multiple second dynamo-electrical units 103 in the second drive system 1002 to produce the rotational kinetic energy to drive the load 120 for the system to provide the serial hybrid power transmission.

When the rechargeable device 106 is provided to the system, the active rotational power source 100 drives the first dynamo-electrical unit 101 to operate as a generator with the power generated to recharge the rechargeable device 106 or supply power to any other electrical power driven load 130 (including any externally connected unspecified load), and drive two or multiple second dynamo-electrical units 103 in the second drive system 1002 to produce rotational kinetic energy for driving the load 120.

When the system is provided with the rechargeable device 106, the active rotational power source 100 drives the first dynamo-electrical unit 101 to operate as a generator to recharge the rechargeable device 106 or to supply power to other electrical power driven load 130 (including any externally connected unspecified load).

When the first dynamo-electrical unit 101 operates as a generator, the power generated and that from the rechargeable device 106 jointly drive the second dynamo-electrical unit 103 to produce the rotational kinetic energy to drive the load 120 or supply power to any other electrical power driven load 130 (including any externally connected unspecified load).

The power from the rechargeable device 106 drives alone the second dynamo-electrical unit 103 in the second drive system 1002 to produce the rotational kinetic energy for driving the load 120; or the rotational kinetic energy produced by the second dynamo-electrical unit 103 in the second drive system 1002 as driven by the power from the rechargeable device 106 drive the load 120 jointly with the power from the active rotational power source 100.

The regenerated power of feedback braking regeneration by the first dynamo-electrical unit 101 or the second dynamo-electrical unit 103 recharges the rechargeable device 106 or supply power to any other electrical power driven load 130 (including any externally connected unspecified load); or the transmission status of the rotational kinetic energy between the first drive system 1001 and the second drive system 1002 is regulated by switching the clutch 132 to be engaged or disengaged status to operate in System Functions 1 through 80.

Those preferred embodiments of the split serial-parallel hybrid dual-power drive system illustrated in FIGS. 1 through 51 provide partial or all those functions described in System Functions 1 through 80. When the system is provided with multiple second drive systems 1002, a clutch 132 may be optionally provided between any two second drive systems 1002 as required by the application for the control of the transmission of the rotational kinetic energy. The clutch 132 may be comprised of one that operates by manual, mechanical force, eccentric force, air pressure, or hydraulic pressure, or electro-magnetic force, or a single way clutch to transmit or interrupt the transmission of the mechanical rotational kinetic energy so that when the clutch 132 is engaged, it allows the incorporation of the drive units provided at its both ends; or when disengaged, individual operation of both drive units provided at its both ends. Furthermore, for the split serial-parallel hybrid dual-power drive system, one or multiple first drive system 1001, and one or multiple second drive system 1002 may be provided as required by the system.

Accordingly, the split serial-parallel hybrid dual-power drive system is innovative in that it may be controlled to provide the serial hybrid power drive operation or the parallel hybrid power drive operation; and provide the serial hybrid power drive operation or the parallel hybrid power drive operation between both independently provided first and second drive systems. Furthermore, a controllable clutch is provided to control the status of mutual transmission of the rotational kinetic energy between two units for the system to give more types of drive features depending on the load to be driven.

Furthermore, in order to reduce the friction loss from off-lined first dynamo-electrical unit 101 or off-lined second dynamo-electrical unit 103, the structure of those preferred embodiments of present invention: "The separated series-parallel hybrid twin-power driving system", is identical as prior art, which further equipped with clutch 102, 112, 122 or 132 and the transmission unit 119, or transmission unit 129, or speed-variable transmission unit 109, between the shaft of electrical machinery and the engine-driven shaft. While the function of first dynamo-electrical unit 101 or second dynamo-electrical unit 103 is not required, by disengaging the clutch 102, 112, 122 or 132, the first dynamo-electrical unit 101 or second dynamo-electrical unit 103 could be isolated without influencing the driving operation of system.

The split serial-parallel hybrid dual-power drive system allowing the operation in the better brake specific fuel consumption (BSFC) status when applied in lower power output, such as in a car driving in downtown area, to correct the defectives of lower efficiency and higher pollution found with the internal combustion engine running at lower rpm or for a light load provides specific innovative functions. Therefore this application for a patent is duly filed accordingly.

What is claimed is:

1. A split series-parallel hybrid dual-power drive system operable alternatively as a series power drive system or a parallel power drive system, comprising:
    a first drive system for driving a first load, the first drive system including an engine and a first dynamo-electric unit, the engine having a rotary part coupled to the first dynamo-electric unit directly or through a first transmission unit and coupled to the first load directly or through a second transmission unit;
    a second drive system for driving a second load, the second drive system including a second dynamo-electric unit, the second load being coupled to the second dynamo-electric unit directly or through the first transmission unit or through at least one of a fourth clutch and a fourth transmission unit;
    a control interface for receiving at least one of a manual input and an input of a control signal to control the operation of the system;
    a redundant rechargeable device controlled by a start switch to drive a starter motor that is coupled to the engine;
    a second clutch provided between and coupled to the engine and the first dynamo-electric unit;
    a drive control unit for controlling the first drive system, the second drive system, and the second clutches; and
    wherein when the system operates as the series power drive system, a portion of a rotational kinetic energy from the engine drives the first load through a transmission unit, another portion of the rotational kinetic energy from the engine drives the first dynamo-electric unit to operate as a generator, and power from the first dynamo-electric unit drives the second dynamo-electric unit through a control unit to function as a motor for driving the second load.

2. A split series-parallel hybrid dual-power drive system operable alternatively as a series power drive system or a parallel power drive system, comprising:
    a first drive system for driving a first load, the first drive system including an engine and a first dynamo-electric unit, the engine having a rotary part coupled to the first dynamo-electric unit directly or through a first transmission unit and coupled to the first load directly or through a second transmission unit;
    a second drive system for driving a second load; the second drive system including a second dynamo-electric unit, the second load being coupled to the second dynamo-electric unit directly or through the first transmission unit or through at least one of a fourth clutch and a fourth transmission unit;
    wherein when the system operates as the series power drive system, a portion of a rotational kinetic energy from the engine drives the first load through a transmission unit, another portion of the rotational kinetic energy from the engine drives the first dynamo-electric unit to operate as a generator, and power from the first dynamo-electric unit drives the second dynamo-electric unit through a control unit to function as a motor for driving the second load;
    wherein the first drive system further includes a third dynamo-electric unit between the first dynamo-electric unit and the first load;
    wherein the first dynamo-electric unit functions as the generator for driving the third dynamo-electric unit;
    wherein the third dynamo-electric unit functions as a motor for driving the first load;
    wherein the first dynamo-electric unit includes a rotary part coupled to the third dynamo-electric unit either directly or through at least one of a fifth clutch and a fifth transmission unit;
    wherein the third dynamo-electric unit includes a rotary part coupled to the first load either directly or though at least one of a sixth clutch and a sixth transmission unit; and
    wherein the split series-parallel hybrid dual-power drive system further comprises
        a drive control unit for controlling the first drive system, the second drive system, and the second, third, fourth, fifth and sixth clutches,
        a control interface for receiving at least one of a manual input and an input of a control signal to control the operation of the system, and
        a redundant rechargeable device controlled by a start switch to drive a starter motor that is coupled to the engine.

3. The split series-parallel hybrid dual-power drive system of claim 2, wherein:

at least one of the first and second loads is used to inversely drive at least one of the first and second dynamo-electric units to function as the generator either for recharging a rechargeable device or for driving a third load.

4. The split series-parallel hybrid dual-power drive system of claim 2, wherein:

the engine has a damper for acting as a brake on the first load; and when the engine puts a brake on the at least one of the first and second loads, at least one of the first and second dynamo-electric units operates as the generator either for recharging a rechargeable device or for driving a third load.

5. The split series-parallel hybrid dual-power drive system of claim 2, further comprising a redundant rechargeable device controlled by a start switch to drive a starter motor that is coupled to the engine.

6. The split series-parallel hybrid dual-power drive system of claim 1, wherein:

at least one of the first and second loads is used to inversely drive at least one of the first and second dynamo-electric units to function as the generator either for recharging a rechargeable device or for driving a third load.

7. The split series-parallel hybrid dual-power drive system of claim 1, wherein:

the engine has a damper for acting as a brake on the first load; and when the engine puts a brake on the at least one of the first and second loads, at least one of the first and second dynamo-electric units operates as the generator either for recharging a rechargeable device or for driving a third load.

8. The split series-parallel hybrid dual-power drive system of claim 1, further comprising a redundant rechargeable device controlled by a start switch to drive a starter motor that is coupled to the engine.

\* \* \* \* \*